(12) United States Patent
Zhang

(10) Patent No.: US 11,595,616 B1
(45) Date of Patent: *Feb. 28, 2023

(54) METHODS AND SYSTEMS FOR FACILITATING A COLLABORATIVE WORK ENVIRONMENT

(71) Applicant: Lemon Inc., Grand Cayman (KY)

(72) Inventor: Yuhui Zhang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,078

(22) Filed: Nov. 15, 2021

(51) Int. Cl.
*G06F 15/16* (2006.01)
*H04N 7/15* (2006.01)
*H04L 12/18* (2006.01)

(52) U.S. Cl.
CPC ......... *H04N 7/157* (2013.01); *H04L 12/1818* (2013.01); *H04L 12/1822* (2013.01); *H04L 12/1831* (2013.01)

(58) Field of Classification Search
None
See application file for complete search history.

(56) References Cited

U.S. PATENT DOCUMENTS

| | | | |
|---|---|---|---|
| 9,882,846 B1 | 1/2018 | Cohen et al. | |
| 9,955,318 B1 | 4/2018 | Scheper et al. | |
| 10,157,358 B1 | 12/2018 | Brisebois et al. | |
| 10,958,600 B1 * | 3/2021 | Annadata | H04L 51/02 |
| 11,323,493 B1 * | 5/2022 | Xi | H04L 65/403 |
| 11,349,890 B2 | 5/2022 | Spencer et al. | |
| 11,381,411 B1 | 7/2022 | Gale et al. | |
| 11,394,924 B1 | 7/2022 | Maxim | |
| 2009/0222742 A1 | 9/2009 | Pelton et al. | |
| 2009/0251457 A1 | 10/2009 | Walker et al. | |
| 2012/0290950 A1 | 11/2012 | Rapaport et al. | |
| 2012/0331401 A1 * | 12/2012 | Tipirneni | G06F 16/951 715/753 |

(Continued)

FOREIGN PATENT DOCUMENTS

| | | | |
|---|---|---|---|
| WO | WO 2015/041417 A1 | 3/2015 | |
| WO | WO 2015/164521 A1 | 10/2015 | |
| WO | WO-2021154651 A1 * | 8/2021 | H04L 51/32 |

OTHER PUBLICATIONS

U.S. Appl. No. 17/527,041, filed Nov. 15, 2021, Zhang.
U.S. Appl. No. 17/527,088, filed Nov. 15, 2021, Zhang.
U.S. Appl. No. 17/527,066, filed Nov. 15, 2021, Zhang.

*Primary Examiner* — Phyllis A Book
(74) *Attorney, Agent, or Firm* — BakerHostetler

(57) ABSTRACT

The present disclosure describes techniques for facilitating a collaborative work environment. The techniques comprise creating at least one virtual room accessible by the plurality of users, wherein at least one subset of users are associated with the at least one virtual room, the at least one virtual room enables real-time communications among the at least one subset of users, and the at least one subset of users communicate with each other in the at least one virtual room through a first communication channel; receiving a request from a first user to communicate with at least a second user separately from the first communication channel; and establishing a first sub-communication channel between the first user and the at least a second user while the first communication channel remains accessible to the first user and the at least a second user.

19 Claims, 49 Drawing Sheets

(56) References Cited

U.S. PATENT DOCUMENTS

| | | |
|---|---|---|
| 2013/0212494 A1 | 8/2013 | Heiferman et al. |
| 2014/0229866 A1* | 8/2014 | Gottlieb ................ G06F 3/0486 |
| | | 709/204 |
| 2014/0278977 A1* | 9/2014 | Newton ............. G06Q 30/0255 |
| | | 705/14.53 |
| 2015/0135300 A1 | 5/2015 | Ford |
| 2016/0309116 A1 | 10/2016 | Gottlieb |
| 2019/0279522 A1 | 9/2019 | Jafari |
| 2020/0036667 A1 | 1/2020 | Talton et al. |
| 2020/0076746 A1 | 3/2020 | Penrose et al. |
| 2020/0100074 A1* | 3/2020 | Purohit ................. H04W 4/023 |
| 2020/0169559 A1* | 5/2020 | Jones .................... H04L 63/102 |
| 2020/0328908 A1* | 10/2020 | Howland ............. H04L 67/131 |
| 2021/0081897 A1 | 3/2021 | Culver et al. |
| 2021/0096695 A1* | 4/2021 | Zhang ................. G06F 3/04186 |
| 2021/0224765 A1 | 7/2021 | Siddique et al. |
| 2021/0319408 A1 | 10/2021 | Jorasch et al. |
| 2021/0342785 A1 | 11/2021 | Mann et al. |
| 2021/0360073 A1* | 11/2021 | Rodgers ................ H04L 67/306 |
| 2021/0400093 A1* | 12/2021 | Ashkenazi ............. H04L 65/75 |
| 2022/0027021 A1 | 1/2022 | Bliss et al. |
| 2022/0070013 A1* | 3/2022 | Barzilay ............. H04L 12/1827 |
| 2022/0070232 A1 | 3/2022 | Young |

\* cited by examiner

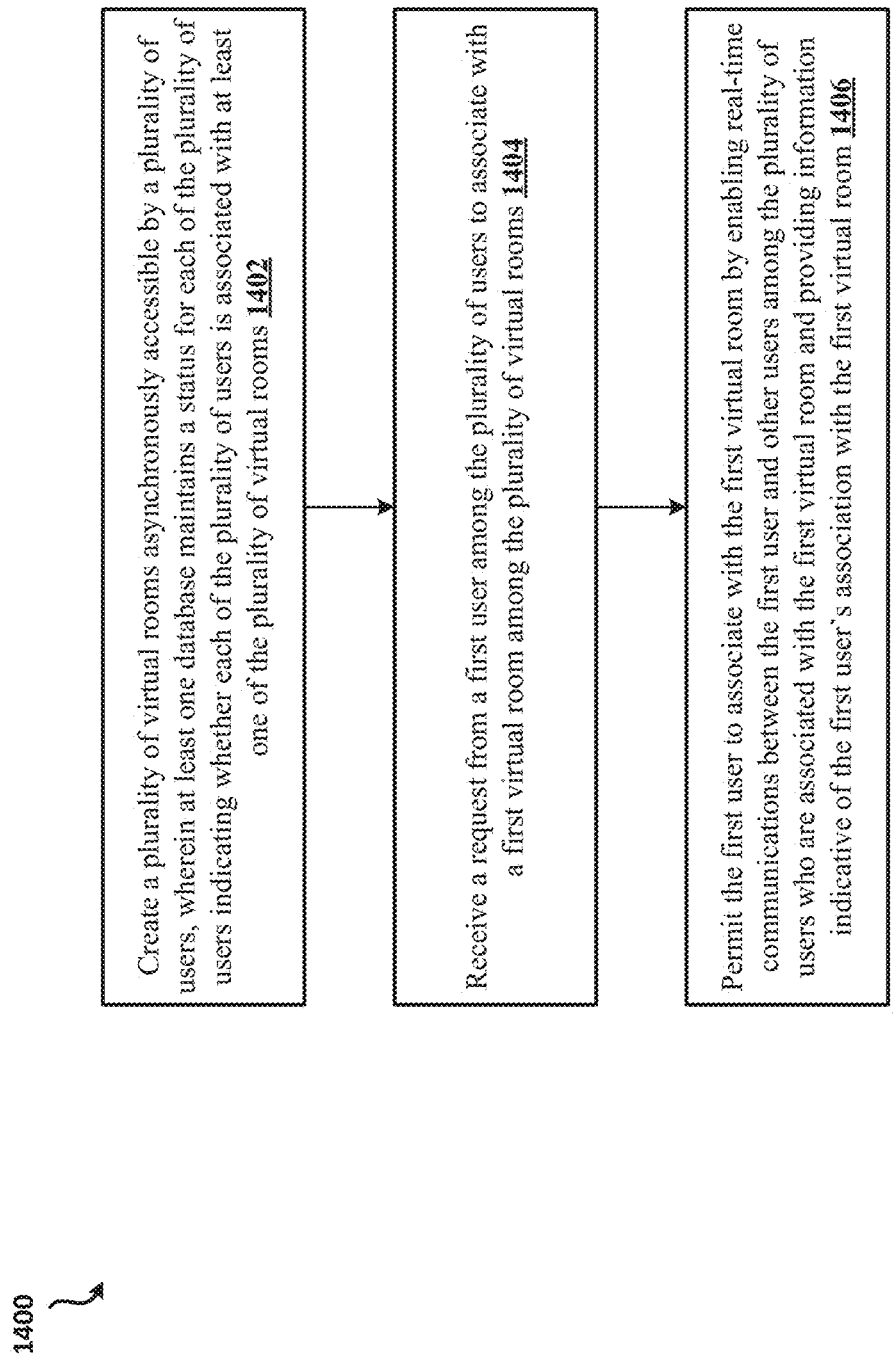

1500

```
┌─────────────────────────────────────────────────────────────────┐
│ Create a plurality of virtual rooms asynchronously accessible    │
│ by a plurality of users, wherein at least one database           │
│ maintains a status for each of the plurality of users            │
│ indicating whether each of the plurality of users is             │
│ associated with at least one of the plurality of virtual         │
│ rooms 1502                                                       │
└─────────────────────────────────────────────────────────────────┘
                              │
                              ▼
┌─────────────────────────────────────────────────────────────────┐
│ Transmit information to a plurality of client computing devices  │
│ associated with the plurality of users for display of status     │
│ information for the plurality of virtual rooms comprising        │
│ information indicative of whether any user among the plurality   │
│ of users is associated with any of the plurality of virtual      │
│ rooms 1504                                                       │
└─────────────────────────────────────────────────────────────────┘
                              │
                              ▼
┌─────────────────────────────────────────────────────────────────┐
│ Receive a request from a first user among the plurality of users │
│ to associate with a first virtual room among the plurality of    │
│ virtual rooms 1506                                               │
└─────────────────────────────────────────────────────────────────┘
                              │
                              ▼
┌─────────────────────────────────────────────────────────────────┐
│ Permit the first user to associate with the first virtual room   │
│ by enabling real-time communication between the first user and   │
│ other users among the plurality of users who are associated      │
│ with the first virtual room and providing information            │
│ indicative of the first user's association with the first        │
│ virtual room 1508                                                │
└─────────────────────────────────────────────────────────────────┘
                              │
                              ▼
┌─────────────────────────────────────────────────────────────────┐
│ Transmit information to a plurality of client computing devices  │
│ associated with the plurality of users for display of status     │
│ information indicative of the first user's association with the  │
│ first virtual room 1510                                          │
└─────────────────────────────────────────────────────────────────┘
                              │
                              ▼
┌─────────────────────────────────────────────────────────────────┐
│ Provide status information indicative of the first user's        │
│ availability to communicate with at least one second user among  │
│ the plurality of users, wherein the at least one second user is  │
│ not associated with the first virtual room 1512                  │
└─────────────────────────────────────────────────────────────────┘
```

Create at least one virtual room accessible by a plurality of users, wherein a subset of users among the plurality of users are associated with the at least one virtual room, the at least one virtual room enables real-time communication among the subset of users, and the subset of users communicate with each other in the at least one room through a first communication channel  2602

Receive a request from a first user in the subset of users to communicate with at least a second user in the subset of users separately from the first communication channel  2604

Establish a first sub-communication channel between the first user and the at least a second user while the first communication channel remains accessible to the first user and the at least a second user  2606

```
┌─────────────────────────────────────────────────────────────────────┐
│ Create at least one virtual room accessible by a plurality of users,│
│ wherein a subset of users among the plurality of users are          │
│ associated with the at least one virtual room, the at least one     │
│ virtual room enables real-time communication among the subset of    │
│ users, and the subset of users communicate with each other in the   │
│ at least one room through a first communication channel 2702        │
└─────────────────────────────────────────────────────────────────────┘
                                  │
                                  ▼
┌─────────────────────────────────────────────────────────────────────┐
│ Receive a request from a first user in the subset of users to       │
│ communicate with at least a second user in the subset of users      │
│ separately from the first communication channel 2704                │
└─────────────────────────────────────────────────────────────────────┘
                                  │
                                  ▼
┌─────────────────────────────────────────────────────────────────────┐
│ Establish a first sub-communication channel between the first user  │
│ and the at least a second user while the first communication        │
│ channel remains accessible to the first user and the at least a     │
│ second user 2706                                                    │
└─────────────────────────────────────────────────────────────────────┘
                                  │
                                  ▼
┌─────────────────────────────────────────────────────────────────────┐
│ Provide an indication to other users in the subset of users that    │
│ the first user and the at least a second user have established the  │
│ first sub-communication channel 2708                                │
└─────────────────────────────────────────────────────────────────────┘
                                  │
                                  ▼
┌─────────────────────────────────────────────────────────────────────┐
│ Establish a second sub-communication channel between a third user   │
│ and at least a fourth user to communicate separately from the first │
│ communication channel and the first sub-communication channel 2710  │
└─────────────────────────────────────────────────────────────────────┘
```

Receive a request from a first client computing device associated with a first user in the plurality of users to establish a communication with a second user in the plurality of users, the request specifying information associated wtih the communication 3402

Generate and transmit data to a second client computing device associated with the second user for display of a user interface on the second client computing device, wherein the user interface indicates an invite of communication from the first user, and the user interface comprises information about the first user, the information associated with the communication, and selectable interface elements for accepting or declining the invite 3404

In response to receiving an indication of acceptance by the second user, establish a communication channel between the first user and the second user 3406

```
┌─────────────────────────────────────────────────────────────────────┐
│ Provide status information indicating availability of each of a     │
│ plurality of users to communicate with another in the plurality of  │
│ users 3602                                                          │
└─────────────────────────────────────────────────────────────────────┘
                                   │
                                   ▼
┌─────────────────────────────────────────────────────────────────────┐
│ Receive a request from a first client computing device associated   │
│ with a first user in the plurality of users to establish a          │
│ communication with a second user in the plurality of users, the     │
│ request specifying an expected communication time length and a      │
│ purpose for the communication 3604                                  │
└─────────────────────────────────────────────────────────────────────┘
                                   │
                                   ▼
┌─────────────────────────────────────────────────────────────────────┐
│ Generate and transmit data to a second client computing device      │
│ associated with the second user for display a user interface on the │
│ second client computing device, wherein the user interface          │
│ indicates an invite of communication from the first user, and the   │
│ user interface comprises information about the first user, the      │
│ expected communication time length, the purpose for the             │
│ communication, and selectable interface elements for accepting or   │
│ declining the invite 3606                                           │
└─────────────────────────────────────────────────────────────────────┘
                                   │
                                   ▼
┌─────────────────────────────────────────────────────────────────────┐
│ Receive, from the second computing device associated with the       │
│ second user, information indicative of a communicable state 3608    │
└─────────────────────────────────────────────────────────────────────┘
                                   │
                                   ▼
┌─────────────────────────────────────────────────────────────────────┐
│ Establish a communication channel between the first user and the    │
│ second user in response to receiving an indication of acceptance    │
│ and the information from the second user 3610                       │
└─────────────────────────────────────────────────────────────────────┘
```

METHODS AND SYSTEMS FOR FACILITATING A COLLABORATIVE WORK ENVIRONMENT

BACKGROUND

Communication is increasingly being conducted using Internet-based tools. The Internet-based tools may be any software or platform. Existing communication platforms enable users to communicate with each other by sharing text, images, videos, and other information via app or web pages. People continue to desire new ways for communication via Internet-based tools.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 14 shows an example process for facilitating communication, which may be performed by a communication system in accordance with the present disclosure.

FIG. 15 shows an example process for facilitating communication, which may be performed by a communication system in accordance with the present disclosure.

FIG. 19 shows another example user interface for facilitating communication in accordance with the present disclosure.

FIG. 26 shows an example process for facilitating communication, which may be performed by a communication system in accordance with the present disclosure.

FIG. 27 shows an example process for facilitating communication, which may be performed by a communication system in accordance with the present disclosure.

FIG. 34 shows an example process for facilitating communication, which may be performed by a communication system in accordance with the present disclosure.

FIG. 36 shows an example process for facilitating communication, which may be performed by a communication system in accordance with the present disclosure.

FIG. 42 shows another example user interface for facilitating communication in accordance with the present disclosure.

DETAILED DESCRIPTION OF ILLUSTRATIVE EMBODIMENTS

Figure 1:
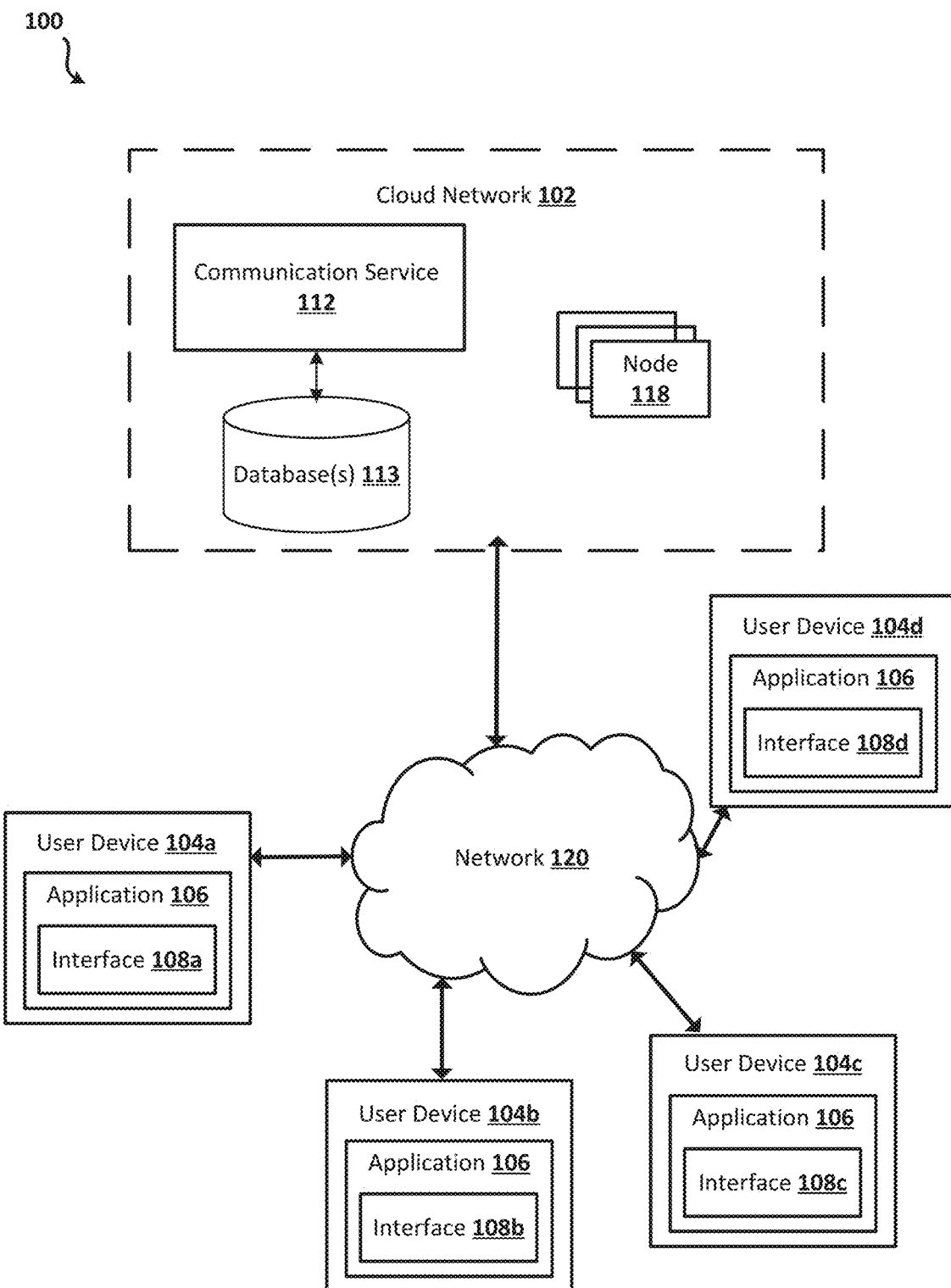
FIG. 1 shows an example system for facilitating communication in accordance with the present disclosure.

Existing internet-based communication tools may facilitate communication between two or more people, such as two or more co-workers. For example, existing internet-based communication tools may facilitate a video conference between two or more people. Likewise, existing internet-based communication tools may facilitate a text messaging and/or instant messaging exchange between two or more people. However, such existing internet-based communication tools have shortcomings. These shortcomings result in a less than ideal user experience.

First, existing communication tools place a rigid separation between asynchronous communication and synchronous communication. Asynchronous communication is any type of communication where one person provides information, and then there is a time lag before the recipients take in the information and offer their responses. In other words, asynchronous communication is communication that does not happen in real-time (e.g., on the phone, in-person, or during a live video conferencing meeting). For example, text messaging, instant messaging, and posting comments related to previously shared content are all forms of asynchronous communication. Conversely, synchronous communication is communication that happens in real-time (e.g., on the phone, in-person, or during a live video conferencing meeting).

Some existing communication tools facilitate asynchronous communication between users, some existing communication tools facilitate synchronous communication between users, and some existing communication tools facilitate both asynchronous communication and synchronous communication. Those tools that only facilitate asynchronous communication or synchronous communication limit the forms of communication available to users, thus hindering effective and efficient communication.

Even those tools that facilitate both asynchronous communication and synchronous communication do so in a limited way. For example, a user may use such a tool to participate in a synchronous communication session (such as a video conference) with a group of other users. However, if the user is unable to join the synchronous communication session or needs to leave the synchronous communication session before it is terminated, the user will not be able to receive the information that is being communicated during the synchronous communication session and the user will not be able to provide input or comments on the information that is being communicated during the synchronous communication session. Moreover, such tools generally impose limitations on how users can join such communications, primarily by requiring an explicit invitation each time two users want to collaborate. Therefore, a communication tool that eliminates the rigid separation between asynchronous communication and synchronous communication is desired.

Second, existing communication tools focus simply on facilitating communication, but do not foster deep or meaningful collaboration between the users of the communication tool and have shortcomings in fostering a collaborative work environment. For example, existing communication tools may be utilized by co-workers to video conference and/or to chat. However, such existing communication tools do not provide the users with any insight into their co-workers—the users are not provided with insight regarding what their co-worker what they are working on, how busy their co-workers are, relevant past experiences of their co-workers, or personal details about their co-workers. Such tools that do not provide the users with any insight into their co-workers fail to foster integrated, tightly knit teams. Therefore, a communication tool that fosters deep and meaningful collaborative working relationships between the users of the communication tool is desired. The co-working experience is not limited to people in the same organization, it also applies to joint development environments or other collaborative work environments.

Additionally, existing tools provide for screen sharing and some even allow users to collaboratively edit documents. However, such tools lose the context in which a document was edited or the discussion around development of collaborative ides.

Third, existing communication tools do not provide sufficient insight into the availability of users. For example, some existing communication tools assign a color (red=busy, yellow=idle/away, green=available) to indicate the availability of each user to the other users. However, simply assigning a color to indicate the availability of each user fails to provide the other users with other relevant details regarding the availability of each user. For example, assigning a color does not alert the other users when a red/busy user will become available. Likewise, assigning a color to each user does not alert the other users as to whether a particular user is interested in communicating about a particular topic or as to the location of a particular user. Therefore, a communication tool that provides greater insight as to the availability of the users of the communication tool is desired.

An improved internet-based communication tool is described herein. Such an improved internet-based communication tool addresses the shortcomings of existing internet-based communication tools. First, the improved internet-based communication tool described herein eliminates the rigid separation between asynchronous communication and synchronous communication. As a result, users may seamlessly transition between different types of communication while still preserving the context of the conversation which helps to provide organization to collaborative work communications. Second, the improved internet-based communication tool described herein fosters deep and meaningful relationships between the users of the communication tool by providing insight into what each user is working on, how busy each user is, relevant past work experiences of each user, and personal details about each user. Third, the improved internet-based communication tool described herein provides greater insight as to the availability of the users. As a result, users may have a strong understanding of others' availability and/or status.

Such an improved internet-based communication tool may be utilized as a part of the example system 100 illustrated in FIG. 1. The system 100 may comprise a cloud network 102 and a plurality of user devices 104*a-d*. The cloud network 102 and the plurality of user devices 104*a-d* may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 may comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a communication service 112. The plurality of computing nodes 118 may process tasks associated with the communication service 112.

The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the communication service 112 facilitates communication (e.g., synchronous communication and asynchronous communication) between users associated with the plurality of user devices 104*a-d*. The communication service 112 may address the shortcomings of existing internet-based communication tools. First, the communication service 112 eliminates the rigid separation between asynchronous communication and synchronous communication is desired. As a result, users may seamlessly transition between different types of communication while preserving the context of the conversation. Second, the communication service 112 fosters deep and meaningful relationships between the users of the communication tool by providing insight into what each user is working on, how busy each user is, relevant past work experiences of each user, and personal details about each user. Third, the communication service 112 provides greater insight as to the availability of the users. As a result, users may have a strong understanding of others' availability and/or status.

Various features of the communication service 112 are discussed below in more detail with regard to FIGS. 3-30. Each of the features discussed below with regard to FIGS. 3-30 contribute to the ability of the communication service 112 to facilitate effective and efficient communication and/or interpersonal relationship building.

In an embodiment, the plurality of user devices 104 are configured to access the communication service 112. For example, one or more of the user devices 104 may send, to the communication service 112, a connection request. The connection requests may comprise requests from the user devices 104*a-d* to connect to the communication service 112.

A user device 104*a-d* may comprise an application 106. The application 106 outputs (e.g., display, render, present) user interface(s) of the communication service 112 via an interface 108*a-d*. The users associated with the user devices 104*a-d* may interact with the user interface(s) of the communication service 112 to communicate with and/or build relationships with the other users of the communication service 112. For example, the user associated with the user device 104*a* may interact with the user interface(s) of the communication service 112 to communicate with and/or build relationships with one or more of the users associated with the user devices 104*b-d*.

The plurality of user devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like.

The plurality of user devices 104 may be associated with one or more users. For example, the one or more users may be co-workers or colleagues. As another example, the one or more users may be friends, students, or any other group of people that want to or need to communicate with one another. A single user may use one or more of the user devices 104 to access the cloud network 102. The plurality of user devices 104 may travel to a variety of locations and use different networks to access the cloud network 102.

The communication service 112 may be configured to store data associated with the communication service 112, such as in one or more databases 113. The one or more databases 113 may be configured to store data associated with the users of the communication service 112 and/or data associated with past, current, or future scheduled communication amongst the users of the communication service 112. The one or more databases 113 and the data stored within the one or more databases 113 are discussed below in more detail with regard to FIG. 2.

Figure 2:
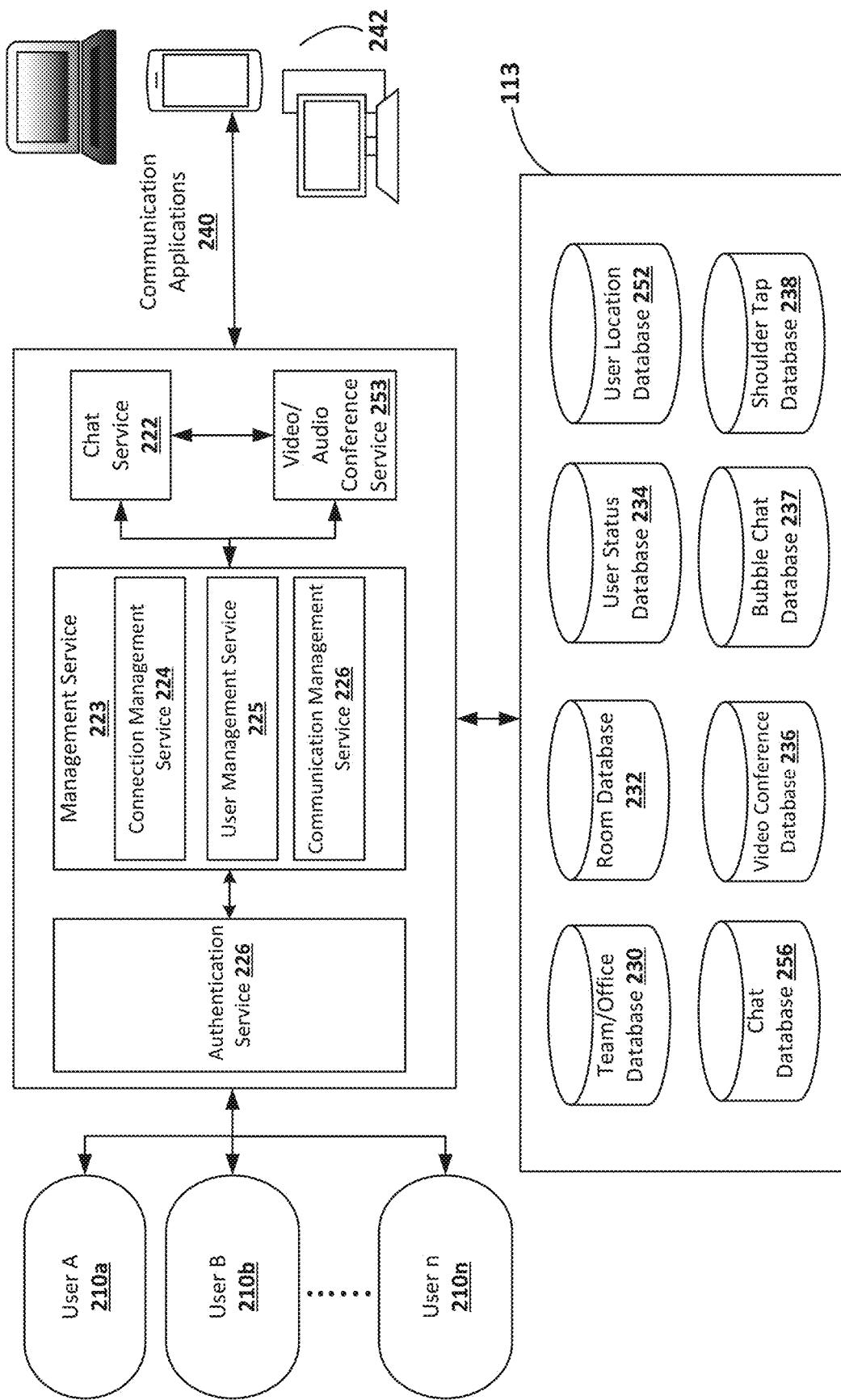
FIG. 2 shows an example system for facilitating communication in accordance with the present disclosure.

FIG. 2 shows an example system 200 for communication. The system 200 includes the communication service 112 described above with regard to FIG. 1. By way of example and without limitation, the communication service 112 may run on the cloud network 102 in FIG. 1. The communication service 112 may include a combination of cloud network devices and local devices. The communication service 112 may facilitate communication amongst the users 210*a-n*.

The communication service 112 may include an authentication service 226. The authentication service 226 may authorize and verify access to the other services provided by the communication service 112. The authentication service 226 may grant users access to the communication service 112. For instance, the authentication service 226 may receive connection requests from the users 210a-n. The connection requests may be requests to connect to the communication service 226. The authentication service 226 may, in response to such connection requests, grant or deny access to users.

The communication service 112 may include a management service 223. The management service 223 may manage communication amongst users 210a-n that have been connected to the communication service 112. For example, the management service 223 may manage communication amongst users 210a-n that have been granted access to the communication service 112 by the authentication service 226. The management service 223 may include a connection management service 224, a user management service 225, and/or a communication management service 226.

In an embodiment, each of the users 210a-n may be associated with (e.g., belong to, be assigned to) one or more teams (e.g., offices). A team may comprise a group of users of the communication service 112 that share one or more common features and/or frequently communicate with each other regarding one or more topics. For example, a team may comprise a group of users of the communication service 112 that are co-workers assigned to the same project. The co-workers may need to frequently communicate with each other regarding the project.

The connection management service 224 may connect one or more users 210a-n to a particular team. For example, when a user 210a-n becomes connected to the communication service 112, the connection management service 224 may retrieve, from a team/office database 230, data indicative of one or more teams that a particular user 210a-n is associated with. The connection management service 224 may retrieve, from the team/office database 230, data indicative of a team identification number (team ID) associated with the one or more teams that the user 210a-n is associated with. The connection management service 224 may utilize said data to connect a particular user 210a-n to a team that the user is associated with, and/or to ensure that the user does not get connected to a team that the user is not associated with. After connecting a user to a team, the connection management service 224 may store, in the team/office database 230, data indicating that that particular user has been connected to that particular team.

In an embodiment, each team may comprise one or more virtual rooms (e.g., groups, etc.). Each virtual room may be associated with a particular topic of discussion or a particular type of information sharing. For example, if a team is associated with a group of co-workers, each virtual room in the team may be associated with a different project or discussion topic related to that group of co-workers. Such a discussion could involve not only a verbal exchange of information but also the ability to share documents and other information related to the discussion. A user that is connected to a team may join a virtual room associated with that team if that virtual room is associated with a project/discussion topic of interest. A user may join one virtual room at a time, or multiple virtual rooms at a time. At any given time, zero, one, or multiple users that belong to a team may be present in any given virtual room.

The connection management service 224 may connect one or more users 210a-n to a particular virtual room. For example, when a user 210a-n becomes connected to a team, the user may request to join a virtual room. The connection management service 224 may receive such requests and, in response, may retrieve, from a virtual room database 232, data indicative of a virtual room identification number (team ID) associated with the requested virtual room. The connection management service 224 may utilize said data to connect a particular user 210a-n to the requested virtual room, and/or to ensure that the user does not get connected to a virtual room that the user did not request. After connecting a user to a virtual room, the connection management service 224 may store, in the virtual room database 232, data indicating that that particular user has been connected to that particular virtual room.

In an embodiment, each of the users 210a-n may be associated with a status. The status may indicate the availability of the users 210a-n. For example, other users may see the status of a particular user and may gain an understanding of that user's availability. A user's status may indicate that they are available, idle/away, busy, or do not want to be disturbed. Each user 210a-n may set his or her own status. Additionally, or alternatively, the user management service 225 may automatically update a user's status, such as after a particular period of time.

In an embodiment, in addition to indicating whether a user is available, idle/away, busy, or does not want to be disturbed, the user's status may indicate a period of time for which that status is applicable. For example, a user's status may indicate that they are busy for the next two hours, or a user's status may indicate that they are available for the next 20 minutes, etc. Each user 210a-n may adjust this time period manually. Additionally, or alternatively, the user management system may automatically populate this time period based on, for example, a calendar associated with the user.

In an embodiment, in addition to indicating whether a user is available, idle/away, busy, or does not want to be disturbed, the user's status may indicate a location associated with that user. As discussed above, a user may be in a virtual room. For example, a user may be in a virtual room associated with a particular project. That user's status may indicate that they are available to communicate and that they are in that virtual room. Likewise, a user's status may indicate that they are in a meeting in a particular virtual room, etc. Other users may see this location indication and may use it to initiate communication with that user. For example, if user 210a wants to communicate with user 210b, and sees that user 210b is available and in a particular virtual room, user 210a may join that virtual room and initiate a chat or video conference with the user 210b. In some embodiments, the virtual room is more than a mechanism to facilitate real-time communications such as video conference, rather it can function as a repository of information and communications related to a particular topic and provide a history of the development of ideas. For example, the room may store the entire history of all of the forms of communication that occurred in the room, including text messages, videos, documents, uniform resource locator exchanges, and so on.

In embodiments, any user given access to the room, would have the ability to review the history of communications that occurred in the room. For example, a new user who was invited to join a team could peruse the history of communications and from that gain an understanding of the development of a project over time without the need to review a document archive that would otherwise lack context. In that sense, the virtual room becomes a way of organization information exchange while preserving the historical context around particular documents and decisions.

The user management service 225 may store, in a user status database 234, data indicative of the status of each user 210*a-n*. The user management service 225 may update/modify such data if/when a user changes his or her status. Additionally, or alternatively, the user management service 225 may update/modify such data if/when the user management service 225 automatically updates a user's status. Likewise, the user management service 225 may store, in the user status database 234, data indicative of the time period associated with the status of each user 210*a-n*. The user management service 225 may update/modify such data if/when the user updates the time period or if the user management service 225 automatically updates the time period. The user management service 225 may store, in a user location database 252, data indicative of the location of each user 210*a-n*. The user management service 225 may update/modify, in the user location database 252, the data indicative of the location of each user 210*a-n* when the user's location changes (e.g., the user checks into a different virtual room, etc.).

In an embodiment, the users 210*a-n* may communicate asynchronously with each other via the communication service 112. For example, the users 210*a-n* may text message and/or instant message each other and/or may post comments related to content previously shared by other users. The communication management service 226 facilitates such asynchronous communication amongst users 210*a-n*. For example, the communication management service 226 may initiate a communication channel between two users via a chat service 222 so that they may participate in asynchronous communication with each other. For example, the communication management service 226 may initiate a communication channel between two users via the chat service 222 in response to receiving a request to start a chat. The chat service 222 may be a device and/or a program running on a device of the communication service 112.

The chat service 222 may be configured to receive inputs from users 210. The users 210 may be users of a communication application 240 operating on user devices 242. The user inputs may include text messages and/or instant messages. Participants of an asynchronous communication may comprise any users 210*a-n* who are allowed to participant in the asynchronous communication in any manner.

The chat service 222 may manage the asynchronous communication. For instance, the chat service 222 may categorize the conversations. The chat service 222 may store the conversations, any associations with the conversation, and/or conversation metadata in one or more databases 113, such as a chat database 256. The chat service 222 may update, in the chat database 256, the data when a new asynchronous communication between the users 210*a-n* occurs.

In an embodiment, the users 210*a-n* may communicate synchronously with each other via the communication service 112. For example, the users 210*a-n* may video and/or audio conference with each other. The communication management service 226 facilitates such synchronous communication amongst users 210*a-n*. For example, the communication management service 226 may initiate a communication channel between two users via a video/audio conference service 253 so that they may participate in synchronous communication with each other. For example, the communication management service 226 may initiate a communication channel via the video/audio conference service 253 between two users via the video/audio conference service 253 in response to receiving a request to start a video/audio conference. The video/audio conference service 253 may be a device and/or a program running on a device of the communication service 112.

The video/audio conference service 253 may be configured to receive inputs from users 210. The users 210 may be users of a communication application 240 operating on user devices 242. The user inputs may include live video and/or audio feed. Participants of a synchronous communication may comprise any users 210*a-n* who are allowed to participant in the synchronous communication in any manner.

The video/audio conference service 253 may manage the synchronous communication. For instance, the video/audio conference service 253 may categorize the conversations. The video/audio conference service 253 may store the conversations, any associations with the conversation, and/or conversation metadata in one or more databases 113, such as a video conference database 236. The video/audio conference service 253 may update, in the video conference database 236, the data when a new synchronous communication between the users 210*a-n* occurs.

In an embodiment, one or more users 210*a-n* that are not a party to a synchronous communication (e.g., a live video and/or audio conference) are able to passively view the synchronous communication and/or asynchronously communicate with the parties to the synchronous communication. For example, a user 210*a* may view a live video call without joining the video call. Likewise, a user 210*b* may comment his or her thoughts on a live video call without joining the video call. The communication management service 226 facilitates such communication amongst users 210*a-n*. In this manner, any rigid separation between asynchronous communication and synchronous communication is eliminated.

It should be appreciated that the communication service 112 in FIG. 2 is merely illustrative and other implementations might be utilized. It should also be appreciated that the functionality disclosed herein may be implemented by one or more servers or computing devices. Additionally, it should be appreciated that the functionality disclosed herein might be implemented in software, hardware or a combination of software and hardware.

Figure 3:
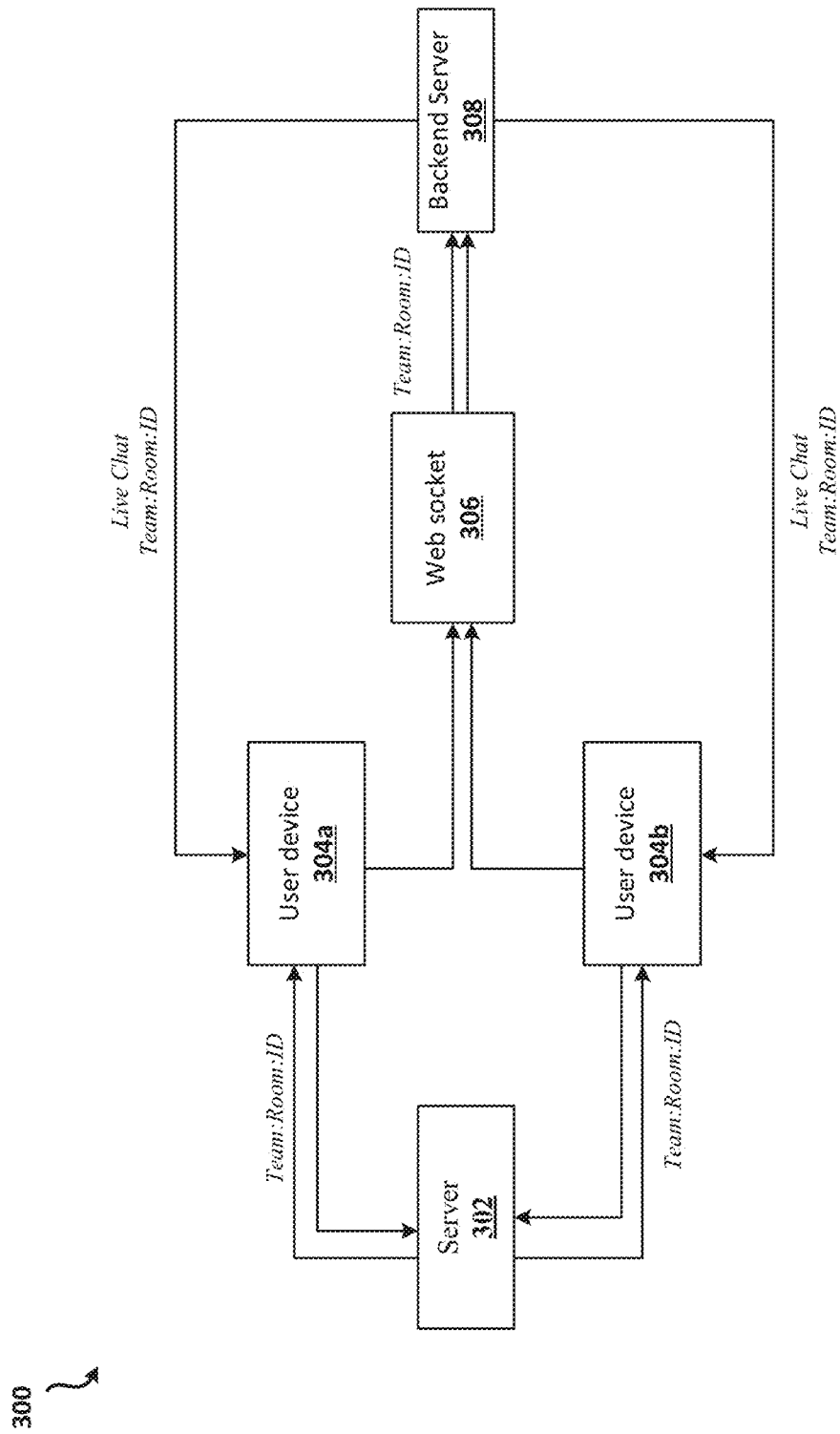
FIG. 3 shows an example system for facilitating communication in accordance with the present disclosure.

FIG. 3 illustrates a block diagram 300 depicting two users of a communication service (e.g., communication service 112) being connected to a virtual room. As discussed above, each of the users of the communication service may be associated with (e.g., belong to, be assigned to) one or more teams (e.g., offices). A team may comprise a group of users of the communication service that share one or more common features and/or frequently communicate with each other regarding one or more topics. For example, a team may comprise a group of co-workers assigned to the same project. The co-workers may need to frequently communicate with each other regarding the project. A particular user may belong to more than one team. Such a user may be able to connect to each of the teams that the user belongs to. In an embodiment, a user may be able to connect to only one team at a time.

Each team may comprise one or more virtual rooms (e.g., groups, etc.). Each virtual room may be associated with a particular topic of conversation or a particular type of conversation. For example, if a team is associated with a group of co-workers, each virtual room in the team may be associated with a different project or conversational topic related to that group of co-workers. A user that is connected to a team may join a virtual room associated with that team if that virtual room is associated with a project/conversational topic of interest. A user may join (e.g., become connected to) one virtual room at a time, or multiple virtual rooms at a time. At any given time, zero, one, or multiple users that belong to a team may be present in any given virtual room.

Two user devices 304a-b may send a request, to a server 308, to join a particular virtual room. The two user devices 304a-b may both be associated with users associated with a particular team. That team may be associated with that virtual room that the users want to join. The server 308 may receive the requests. In response to receiving the requests, the server 308 may, in response to receiving the request, prepare an identification number and/or a token associated with that particular virtual room within that particular team. The server 308 may send the identification number and/or token back to the user devices 304a-b. The user devices 304a-b may utilize such identification number(s) or tokens to connect to the virtual room.

For example, the user devices 304a-b may send, to a server 302, the identification number and/or token. The server 302 may utilize the identification number and/or token to connect the two user devices 304a-b to the virtual room. For example, a web socket 306 may receive, from each of the user devices 304a-b, a web socket request. The web socket requests may comprise the identification number and/or token associated with that particular virtual room within that particular team. The web socket 306 may, in response to receiving the web socket requests, send back to each of the user devices 304a-b a web socket response. In this manner, the user devices 304a-b may both be connected to the server 302 associated with the communication service.

The web socket 306 may forward, to the server 302, the identification number and/or token associated with that particular virtual room within that particular team. In response, the server 302 may initiate a communication channel associated with that virtual room. The user devices 304a-b may utilize the communication channel to communicate with one another, such as in real-time or non-real time (and any other users already connected to that communication channel within that virtual room).

Figure 4:
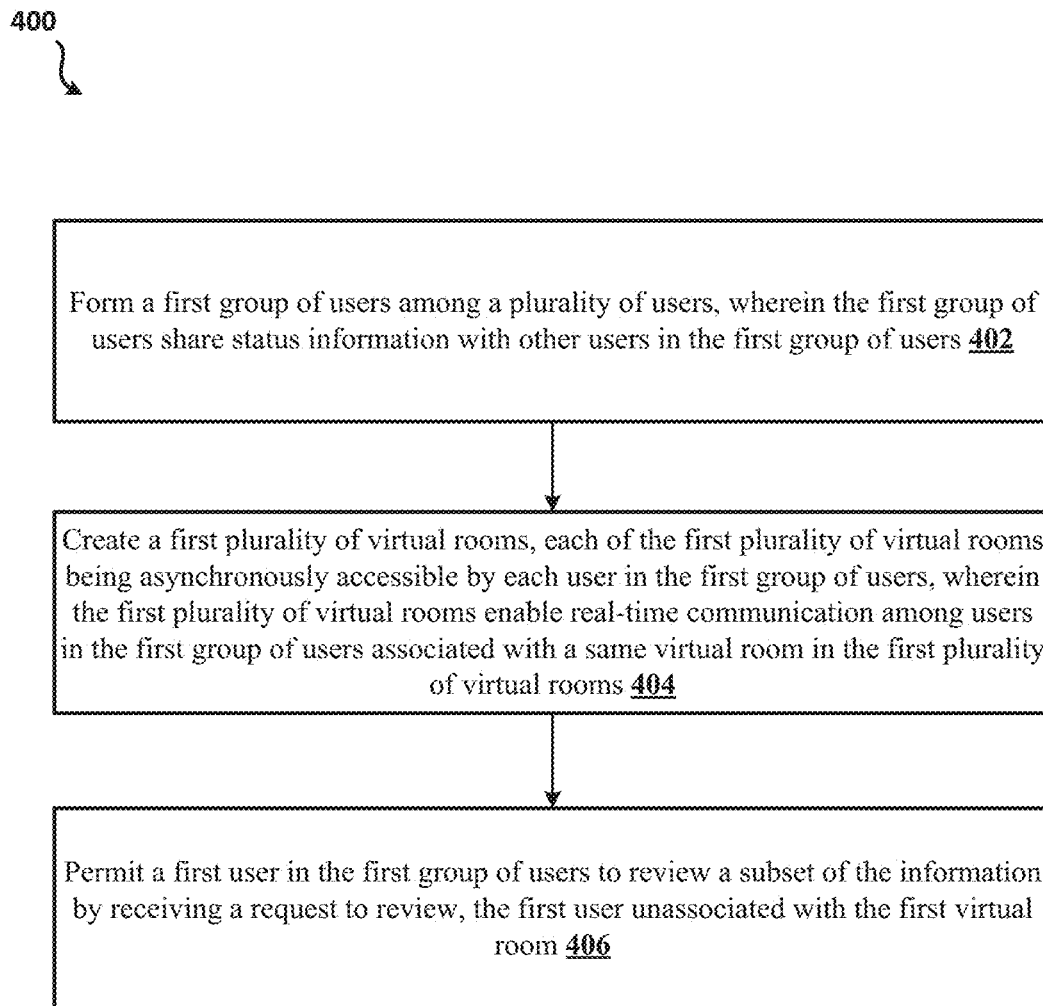
FIG. 4 shows an example process for facilitating communication, which may be performed by a communication system in accordance with the present disclosure.

FIG. 4 illustrates an example process 400 for facilitating communication, which may be performed by a communication service (e.g., communication service 112) in accordance with the present disclosure. For example, the process 400 may be utilized to facilitate a collaborative and/or a group-based communication environment. Although depicted as a sequence of operations in FIG. 4, those of ordinary skill in the art will appreciate that various embodiments may add, remove, reorder, or modify the depicted operations.

As discussed above, each user of the communication service may be associated with (e.g., belong to, be assigned to) one or more teams (e.g., offices). At 402, a first group of users (e.g., a first team) among a plurality of users may be formed. The plurality of users may include all or some of the users of the communication service. For example, each team may comprise a group of users that share one or more common features and/or frequently communicate with each other regarding one or more topics, such as a group of co-workers. The co-workers may need to frequently communicate with each other regarding the project. A particular user may belong to more than one group of users (e.g., more than one team). For example, a particular user may belong to the first group of users, as well as one or more other groups of users. Such a user may be able to connect to each of the teams that the user belongs to. In an embodiment, a user may be able to connect to only one team at a time.

The first group of users may share status information with other users in the first group of users. The status information associated with a particular user may indicate the availability of that user. For example, other users in the first group of users may see the status of the user and may gain an understanding of that user's availability. The status information associated with a particular user may indicate that they are available, idle/away, busy, or do not want to be disturbed. Each user in the first group of users may set his or her own status. Additionally, or alternatively, the communication service may automatically update a user's status, such as after a particular period of time.

In an embodiment, in addition to indicating whether a user is available, idle/away, busy, or does not want to be disturbed, the status information associated with a particular user may indicate a period of time for which that status is applicable. For example, a user's status may indicate that they are busy for the next two hours, or a user's status may indicate that they are available for the next 20 minutes, etc. Each user in the first group of users may adjust this time period manually. Additionally, or alternatively, the communication service may automatically populate this time period based on, for example, a calendar associated with the user.

The first group of users (e.g., the first team) may be associated with one or more virtual rooms. At 404, a first plurality of virtual rooms may be created. Each virtual room may be associated with a particular topic of conversation or a particular type of conversation. For example, if the first group of users includes a group of co-workers, each virtual room associated with the first group of users may be associated with a different project or conversational topic related to that group of co-workers.

Each of the first plurality of virtual rooms may be asynchronously accessible by each user in the first group of users. For example, any user that is connected to the first group of users may join a virtual room associated with the first group of users. The user may want to join a particular virtual room if that virtual room is associated with a project/conversational topic of interest. In an embodiment, a user may join (e.g., become connected to) only one virtual room at a time. In other embodiments, a user may join multiple virtual rooms at a time. At any given time, zero, one, or multiple users that belong to the first group of users may be present in any given virtual room associated with first group of users.

The first plurality of virtual rooms enable communication among users in the first group of users that are associated with the same virtual room in the first plurality of virtual rooms. For example, if one or more users in the first group of users join the same virtual room in the first plurality of virtual rooms, the one or more users may communicate via a communication channel associated with that particular virtual room.

For example, if two or more users in the first group of users join the same virtual room in the first plurality of virtual rooms, those users may communicate synchronously with each other via a communication channel associated with that particular virtual room. For example, the users may video and/or audio conference (e.g., communicate in real-time) with each other. As another example, if one or more users in the first group of users join a virtual room in the first plurality of virtual rooms, the one or more users may communicate asynchronously with each other via a communication channel associated with that particular virtual room. For example, one user may leave a text message, a document, a uniform resource locator, an image, or a video in the virtual room (regardless of whether other users are joined to the room). Additionally, or alternatively, two users may communicate via text messaging/instant messaging in the virtual room while both users are in the virtual room.

Data indicative of such communication may be stored. Data from a user in the first group of users may be stored in one or more databases (e.g., database(s) 113). The data may be indicative of information that is communicated by any user while the user is associated with a first virtual room. For example, the information may include a text message, a document, a uniform resource locator, an image, or a video that the first user sent to/left in the first virtual room. The information may additionally, or alternatively, include a conversation (recording of a live conversation or a text messaging/instant messaging conversation) that the user previously had with one or more other users in the first virtual room.

A first user in the first group of users may or may not want to join the first virtual room. Regardless of whether the first user joins the first virtual room, the first user may review a subset of aspects of the information from the user. At 406, a first user in the first group of users may be permitted to review a subset of the information by receiving a request to review. The first user may send such a request without associating with (e.g., joining, connecting to) the first virtual room. For example, the first user may send such a request by selecting the first virtual room (e.g., clicking on the first virtual room) via an interface of a user device associated with the second user.

In an embodiment, the subset of the information may include any text messages, documents, uniform resource locators, images, or videos that the first user sent to/left in the first virtual room. In other embodiments, the subset of the information may include a subset of text messages, documents, uniform resource locators, images, or videos that the first user sent to/left in the first virtual room. In some embodiments, the subset of the information may not include any information related to synchronous communications that the first user had in the first virtual room.

By selecting or clicking on the first virtual room, the second user is not automatically connected to the first virtual room. Rather, the second user may simply review the subset of the information from the first user without being associated with the first virtual room. The second user may later send a second request to join the first virtual room if he or she wants to join the room. For example, the second user may decide that he or she wants to join the first virtual room based on the subset of the information from the first user that the second user reviewed. Alternatively, the second user may simply review the subset of the information from the first user without ever joining the room. In some embodiments, the second user may be able to send information to and/or participate in non-real time communication within the first virtual room without ever joining the room. For example, the second user may be able to send a text message, a document, a uniform resource locator, an image, or a video without ever joining the room.

Figure 5:
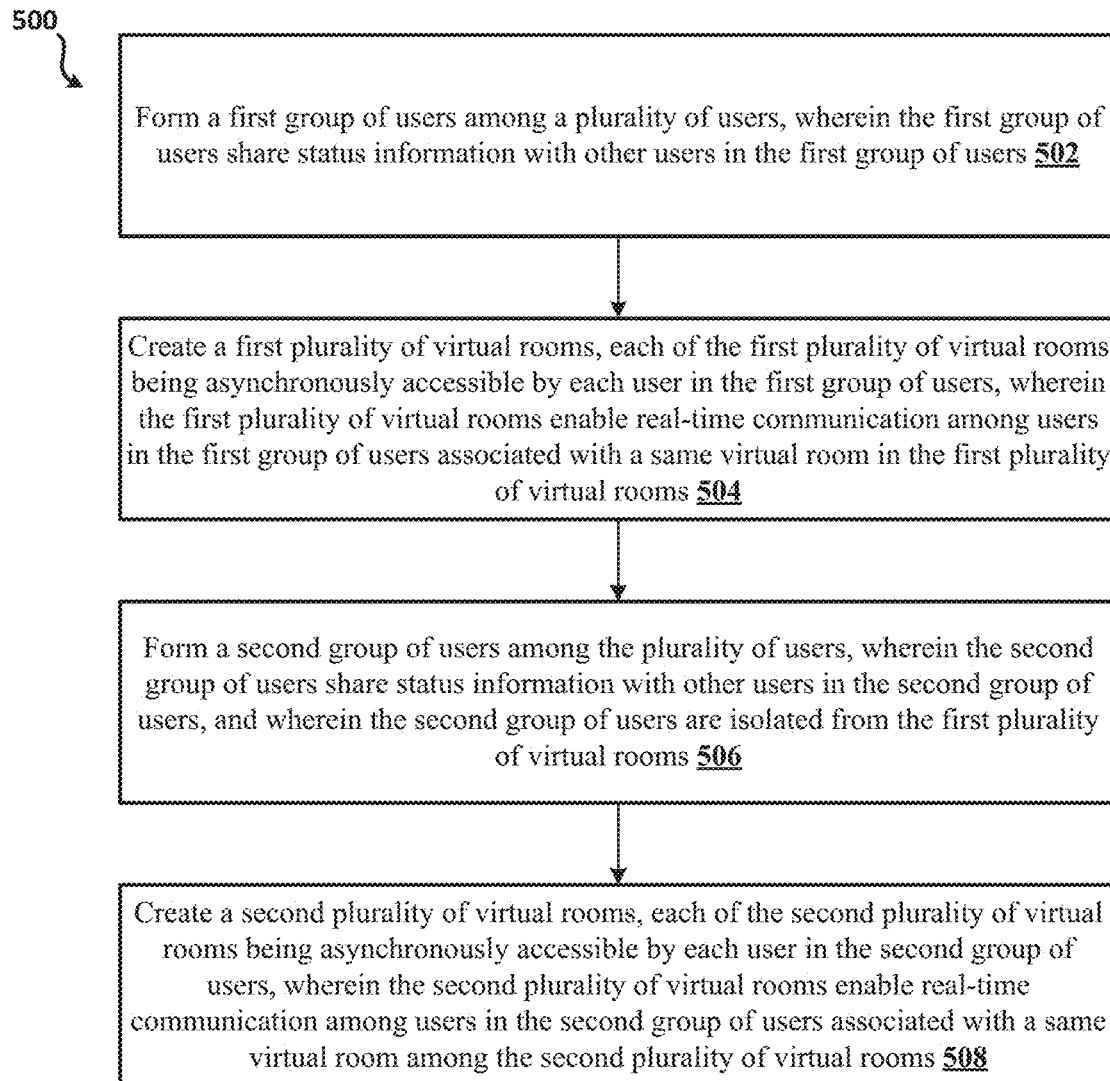
FIG. 5 shows an example process for facilitating communication, which may be performed by a communication system in accordance with the present disclosure.

FIG. 5 illustrates an example process 500 for facilitating communication, which may be performed by a communication service (e.g., communication service 112) in accordance with the present disclosure. For example, the process 500 may be utilized to facilitate a collaborative and/or a group-based communication environment. Although depicted as a sequence of operations in FIG. 5, those of ordinary skill in the art will appreciate that various embodiments may add, remove, reorder, or modify the depicted operations.

As discussed above, each user of the communication service may be associated with (e.g., belong to, be assigned to) one or more teams (e.g., offices). At 502, a first group of users (e.g., a first team) among a plurality of users may be formed. The plurality of users may include all or some of the users of the communication service. For example, the first group of users may comprise a group of users that share one or more common features and/or frequently communicate with each other regarding one or more topics, such as a group of co-workers. The co-workers may need to frequently communicate with each other regarding the project. A particular user may belong to more than one group of users (e.g., more than one team). For example, a particular user may belong to the first group of users, as well as one or more other groups of users. Such a user may be able to connect to each of the teams that the user belongs to. In an embodiment, a user may be able to connect to only one team at a time.

The first group of users may share status information with other users in the first group of users. The status information associated with a particular user may indicate the availability of that user. For example, other users in the first group of users may see the status of the user and may gain an understanding of that user's availability. The status information associated with a particular user may indicate that they are available, idle/away, busy, or do not want to be disturbed. Each user in the first group of users may set his or her own status. Additionally, or alternatively, the communication service may automatically update a user's status, such as after a particular period of time.

In an embodiment, in addition to indicating whether a user is available, idle/away, busy, or does not want to be disturbed, the status information associated with a particular user may indicate a location of that user and/or a period of time for which that status is applicable. For example, a user's status may indicate that they are busy for the next two hours, or a user's status may indicate that they are available for the next 20 minutes, etc. Each user in the first group of users may adjust this time period manually. Additionally, or alternatively, the communication service may automatically populate this time period based on, for example, a calendar associated with the user.

The first group of users (e.g., the first team) may be associated with one or more virtual rooms. At 504, a first plurality of virtual rooms may be created. Each virtual room may be associated with a particular topic of conversation or a particular type of conversation. For example, if the first group of users includes a group of co-workers, each virtual room associated with the first group of users may be associated with a different project or conversational topic related to that group of co-workers.

Each of the first plurality of virtual rooms may be asynchronously accessible by each user in the first group of users. For example, any user that is connected to the first group of users may join a virtual room of the first plurality of virtual rooms. The user may want to join a particular virtual room if that virtual room is associated with a project/conversational topic of interest. In an embodiment, a user may join (e.g., become connected to) only one virtual room at a time. In other embodiments, a user may join multiple virtual rooms at a time. At any given time, zero, one, or multiple users that belong to the first group of users may be present in any given virtual room of the first plurality of virtual rooms.

The first plurality of virtual rooms enable communication among users in the first group of users that are associated with the same virtual room in the first plurality of virtual rooms. For example, if one or more users in the first group of users join the same virtual room in the first plurality of virtual rooms, the one or more users may communicate via a communication channel associated with (e.g., established within) that particular virtual room.

For example, if two or more users in the first group of users join the same virtual room in the first plurality of virtual rooms, those users may communicate synchronously with each other via a communication channel associated with that particular virtual room. For example, the users may video and/or audio conference (e.g., communicate in real-time) with each other. As another example, if one or more users in the first group of users join a first virtual room in the first plurality of virtual rooms, the one or more users may communicate asynchronously with each other via a communication channel associated with the first virtual room. For example, one user may leave a text message, a document, a uniform resource locator, an image, or a video in the virtual room (regardless of whether other users are joined to the room). Additionally, or alternatively, two users may communicate via text messaging/instant messaging in the virtual room while both users are in the virtual room.

At 506, a second group of users (e.g., a second team) among a plurality of users may be formed. For example, the second group of users may comprise a group of users that share one or more common features and/or frequently communicate with each other regarding one or more topics, such as a group of co-workers. The co-workers may need to frequently communicate with each other regarding the project. A particular user may belong to more than one group of users (e.g., more than one team). For example, a particular user may belong to the first group of users and the second group of others. However, a user that belongs to the first group of users does not necessarily belong to the second group of users (and vice versa). In this manner, one or more of the users in the second group of users may not belong to the first group of users, and/or one or more of the users in the first group of users may not belong to the second group of users.

A user may be able to connect to each of the teams that the user belongs to. For example, if a user belongs to the first group of users and the second group of users, that user may connect to either the first group of users or the second group of users. If a different user belongs to the first group of users but not the second group of users, then the different user may connect to the first group of users but not the second group of users. In an embodiment, a user may be able to connect to only one team at a time. For example, if a user belongs to the first group of users and the second group of users, that user may connect to either the first group of users or the second group of users but may be connected to both groups of users at the same time.

The second group of users may share status information with other users in the second group of users. The status information associated with a particular user may indicate the availability of that user. For example, other users in the second group of users may see the status of the user and may gain an understanding of that user's availability. The status information associated with a particular user may indicate that they are available, idle/away, busy, or do not want to be disturbed. Each user in the second group of users may set his or her own status. Additionally, or alternatively, the communication service may automatically update a user's status, such as after a particular period of time.

In an embodiment, in addition to indicating whether a user is available, idle/away, busy, or does not want to be disturbed, the status information associated with a particular user may indicate a location of the user and/or a period of time for which that status is applicable. For example, a user's status may indicate that they are busy for the next two hours, or a user's status may indicate that they are available for the next 20 minutes, etc. Each user in the second group of users may adjust this time period manually. Additionally, or alternatively, the communication service may automatically populate this time period based on, for example, a calendar associated with the user.

In an embodiment, the first group of users and the second group of users share no status information. For example, a user connected to the first group of users cannot see status information associated with a user connected to the second group of users. Likewise, a user connected to the second group of users cannot see status information associated with a user connected to the first group of users. The second group of users may be isolated from the first plurality of virtual rooms.

Each user in the first group of users may be associated with a first identifier indicative of association with the first group of users. Likewise, each user in the second group of users may be associated with a second identifier indicative of association with the second group of users. If a user is in the first group of users and the second group of users, that user may be associated with a first identifier and a second identifier.

The second group of users (e.g., the second team) may be associated with one or more virtual rooms. At 508, a second plurality of virtual rooms may be created. Each virtual room may be associated with a particular topic of conversation or a particular type of conversation. For example, if the second group of users includes a group of co-workers, each virtual room associated with the first group of users may be associated with a different project or conversational topic related to that group of co-workers. The first group of users may be isolated from the second plurality of virtual rooms. Each of the first plurality of virtual rooms may be associated with the first identifier and each of a second plurality of virtual rooms may be associated with the second identifier.

Each of the second plurality of virtual rooms may be asynchronously accessible by each user in the second group of users. For example, any user that is connected to the second group of users may join a virtual room of the second plurality of virtual rooms. The user may want to join a particular virtual room if that virtual room is associated with a project/conversational topic of interest. In an embodiment, a user may join (e.g., become connected to) only one virtual room at a time. In other embodiments, a user may join multiple virtual rooms at a time. At any given time, zero, one, or multiple users that belong to the second group of users may be present in any given virtual room of the second plurality of virtual rooms.

The second plurality of virtual rooms enable real-time communication among users in the second group of users that are associated with the same virtual room in the second plurality of virtual rooms. For example, if one or more users in the second group of users joins the same virtual room in the second plurality of virtual rooms, the one or more users may communicate via a communication channel associated with that virtual room.

For example, if two or more users in the second group of users join the same virtual room in the second plurality of virtual rooms, those users may communicate synchronously with each other via a communication channel associated with the second virtual room. For example, the users may video and/or audio conference with each other. As another example, if one or more users in the second group of users join the second virtual room, the one or more users may communicate asynchronously with each other via a communication channel associated with the second virtual room. For example, one user may leave a text message, a document, a uniform resource locator, an image, or a video in the second virtual room (regardless of whether other users are joined to the second virtual room). Additionally, or alternatively, two users may communicate via text messaging/instant messaging in the second virtual room while both users are in the second virtual room.

Figure 6:
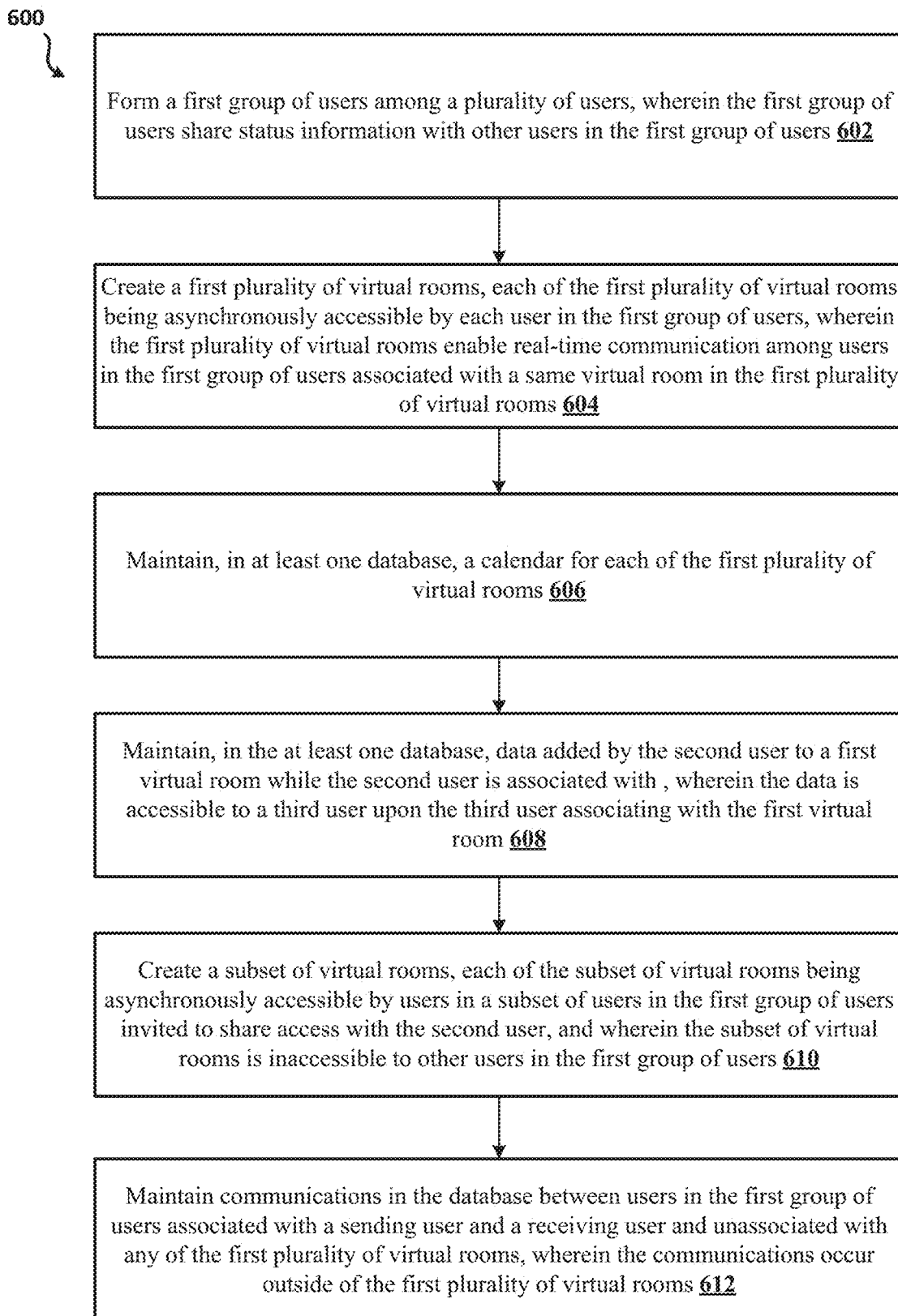
FIG. 6 shows an example process for facilitating communication, which may be performed by a communication system in accordance with the present disclosure.

FIG. 6 illustrates an example process 600 for facilitating communication, which may be performed by a communication service (e.g., communication service 112) in accordance with the present disclosure. For example, the process 600 may be utilized to facilitate a collaborative and/or a group-based communication environment. Although depicted as a sequence of operations in FIG. 6, those of ordinary skill in the art will appreciate that various embodiments may add, remove, reorder, or modify the depicted operations.

As discussed above, each user of the communication service may be associated with (e.g., belong to, be assigned to) one or more teams (e.g., offices). At 602, a first group of users (e.g., a first team) among a plurality of users may be formed. The plurality of users may include all or some of the users of the communication service. For example, the first group of users may comprise a group of users that share one or more common features and/or frequently communicate with each other regarding one or more topics, such as a group of co-workers. The co-workers may need to frequently communicate with each other regarding the project. A particular user may belong to more than one group of users (e.g., more than one team). For example, a particular user may belong to the first group of users, as well as one or more other groups of users. Such a user may be able to connect to each of the teams that the user belongs to. In an embodiment, a user may be able to connect to only one team at a time.

The first group of users may share status information with other users in the first group of users. The status information associated with a particular user may indicate the availability of that user. For example, other users in the first group of users may see the status of the user and may gain an understanding of that user's availability. The status information associated with a particular user may indicate that they are available, idle/away, busy, or do not want to be disturbed. Each user in the first group of users may set his or her own status. Additionally, or alternatively, the communication service may automatically update a user's status, such as after a particular period of time.

In an embodiment, in addition to indicating whether a user is available, idle/away, busy, or does not want to be disturbed, the status information associated with a particular user may indicate a location of that user and/or a period of time for which that status is applicable. For example, a user's status may indicate that they are busy for the next two hours, or a user's status may indicate that they are available for the next 20 minutes, etc. Each user in the first group of users may adjust this time period manually. Additionally, or alternatively, the communication service may automatically populate this time period based on, for example, a calendar associated with the user.

The first group of users (e.g., the first team) may be associated with one or more virtual rooms. At 604, a first plurality of virtual rooms may be created. Each virtual room may be associated with a particular topic of conversation or a particular type of conversation. For example, if the first group of users includes a group of co-workers, each virtual room associated with the first group of users may be associated with a different project or conversational topic related to that group of co-workers.

Each of the first plurality of virtual rooms may be asynchronously accessible by each user in the first group of users. For example, any user that is connected to the first group of users may join a virtual room of the first plurality of virtual rooms. The user may want to join a particular virtual room if that virtual room is associated with a project/conversational topic of interest. In an embodiment, a user may join (e.g., become connected to) only one virtual room at a time. In other embodiments, a user may join multiple virtual rooms at a time. At any given time, zero, one, or multiple users that belong to the first group of users may be present in any given virtual room of the first plurality of virtual rooms.

The first plurality of virtual rooms enable communication among users in the first group of users that are associated with the same virtual room in the first plurality of virtual rooms. For example, if one or more users in the first group of users join the same virtual room in the first plurality of virtual rooms, the one or more users may communicate via a communication channel associated with that particular virtual room.

For example, if two or more users in the first group of users join the same virtual room in the first plurality of virtual rooms, those users may communicate synchronously with each other via a communication channel associated with that particular virtual room. For example, the users may video and/or audio conference (e.g., communicate in real-time) with each other. As another example, if one or more users in the first group of users join a first virtual room in the first plurality of virtual rooms, the one or more users may communicate asynchronously with each other via a communication channel associated with the first virtual room. For example, one user may leave a text message, a document, a uniform resource locator, an image, or a video in the virtual room (regardless of whether other users are joined to the room). Additionally, or alternatively, two users may communicate via text messaging/instant messaging in the virtual room while both users are in the virtual room.

At 606, a calendar may be maintained, in a database (e.g., database(s) 113) for each of the first plurality of virtual rooms. The calendar associated with a particular virtual room may indicate event information associated with that virtual room. The event information may indicate, for example, any meetings that are scheduled for that virtual room and times at which those meetings are scheduled to occur.

The first plurality of virtual rooms enable real-time communication among users in the first group of users that are associated with at least a first virtual room in the first plurality of virtual rooms. For example, if one or more users in the first group of users join a virtual room in the first plurality of virtual rooms, the one or more users may communicate via a communication channel associated with that particular virtual room.

For example, if two or more users in the first group of users join the same virtual room in the first plurality of virtual rooms, those users may communicate synchronously with each other via a communication channel associated with that particular virtual room. For example, the users may video and/or audio conference with each other. As another example, if one or more users in the first group of users join a virtual room in the first plurality of virtual rooms, the one or more users may communicate asynchronously with each other via a communication channel associated with that particular virtual room. For example, one user may leave a text message, a document, a uniform resource locator, an image, or a video in the virtual room (regardless of whether other users are joined to the room). Additionally, or alternatively, two users may communicate via text messaging/instant messaging in the virtual room while both users are in the virtual room.

Data indicative of such information and/or communication may be stored. At 608, data added by a second user to a first virtual room may be maintained in at least one database. The data may be accessible to a third user upon the third user associating with the first virtual room. The information may be information that is communicated by the second user while the first user is associated with the first virtual room. For example, the information may include, a document, a uniform resource locator, an image, or a video that the first user sent to/left in the first virtual room. The information may additionally, or alternatively, include a conversation (recording of a live conversation or a text messaging/instant messaging conversation) that the first user previously had with one or more other users in the first virtual room.

Each of the first plurality of virtual rooms may be private or public. A public virtual room may be a virtual room that any user associated with the first group of users may view and/or join. Conversely, a private virtual room may be a virtual room that has restrictions on which users associated with the first group of users may view and/or join the virtual room. For example, a private virtual room may be restricted to those users who are participating in a particular meeting. A public virtual room may be changed to a private virtual room, and vice versa.

At 610, a subset of virtual rooms of the first plurality of virtual rooms may be created. The subset of virtual rooms may, for example, be private virtual rooms. Each of the subset of virtual rooms may be asynchronously accessible by users in a subset of users in the first group of users. For example, the subset of users may be invited to share access with the second user. The subset of virtual rooms may be inaccessible to other users in the first group of users. For example, the subset of virtual rooms may be inaccessible to users in the first group of users that have not been given access to the subset of virtual rooms.

While users that have joined a virtual room may communicate within that virtual room, users in the first group of users may additionally, or alternatively, communicate with each other outside of the virtual room. For example, the users may directly chat and/or video/audio call each other without joining a virtual room. At 612, communications may be maintained in the database. The communications may include communications between users in the first group of users associated with a sending user and a receiving user. The communications may be unassociated with any of the first plurality of virtual rooms. For example, the communications may occur outside of the first plurality of virtual rooms.

Figure 7:
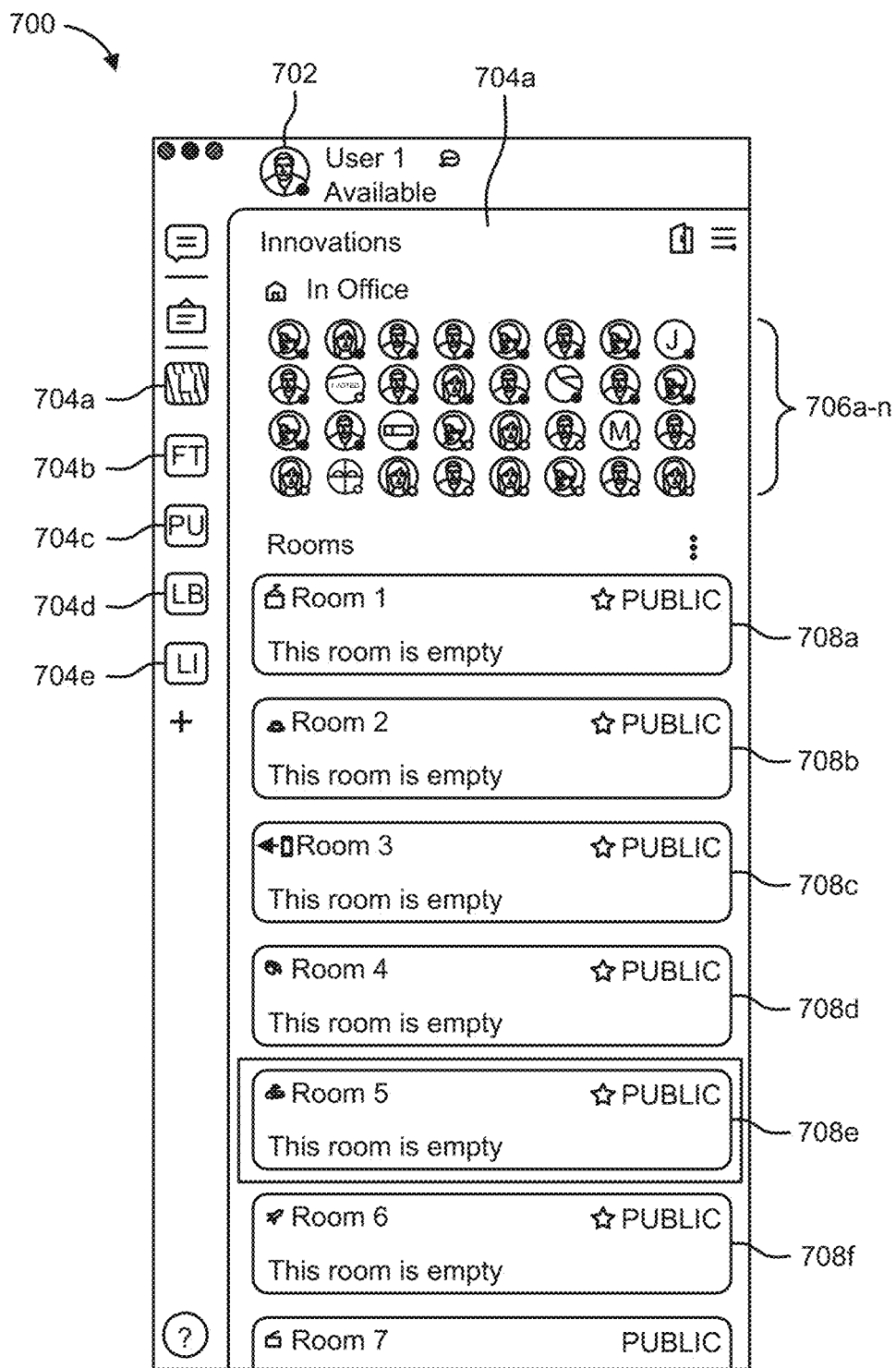
FIG. 7 shows an example user interface for facilitating communication in accordance with the present disclosure.

FIG. 7 illustrates a UI 700 depicting various virtual rooms associated with a team. The UI 700 may, for example, be displayed on a user device belonging to a user associated with the user information 702. The user information 702 indicates one or more of a name, a status/availability, and a photo of the user. Each team that the user is associated with (e.g., belongs to) may correspond to an icon 704a-e on the UI 700. The user may select a particular icon 704a-e to view information associated with the corresponding team.

The UI 700 depicts the icon 704a as being selected. The other users associated with (e.g., belonging to) the team corresponding to the icon 704a are displayed on the UI 700. The other users associated with the team corresponding to the icon 704a are each associated with a particular profile icon 706a-n. For example, the profile icon 706a may correspond to a first user associated with the team corresponding to the icon 704a, the profile icon 706b may correspond to a second user associated with the team corresponding to the icon 704a, etc. If the user associated with the user information 702 hovers over a profile icon 706a-n, additional details associated with the user corresponding to that particular profile icon may be displayed on the UI 700. For example, one or more of a status, username, photo, etc. associated with the corresponding user may be displayed on the UI 700.

The profile icons 706a-n may be arranged on the UI 700 in an order that is based on the availability of the users associated with the profile icons 706a-n. For example, some of the users associated with the profile icons 706a-n may be "available," some of the users associated with the profile icons 706a-n may be "in a meeting," some of the users associated with the profile icons 706a-n may be "do not disturb," and/or some of the users associated with the profile icons 706a-n may be "offline." In certain embodiments, the profile icons 706a-n may be arranged on the UI 700 so that the profile icons 706a-n associated with "available" users are listed first, the profile icons 706a-n associated with "in a meeting" users are listed second, the profile icons 706a-n associated with "do not disturb" users are listed third, and the profile icons 706a-n associated with "offline" users are listed last. However, it should be appreciated that in other embodiments the profile icons 706a-n can be listed in any other order.

Each of the profile icons 706a-n may, if selected by the user associated with the user information 702, direct the user associated with the user information 702 to a profile associated with the selected profile icon 706a-n. For example, if the user associated with the user information 702 selects the profile icon 706a, the user associated with the user information 702 may be directed to a UI displaying the profile associated with the profile icon 706a. User profiles are discussed below in more detail with regard to FIGS. 45-47.

The virtual rooms associated with the team corresponding to the icon 704a are displayed on the UI 700. For example, the virtual rooms may each be represented by a particular room card 708a-f. The user may select any one of the virtual room cards 708a-f to view information associated with the corresponding virtual room. For example, the user may see that one of the virtual room cards 708a-f corresponds to a virtual room that has a name that is of interest to the user, and/or the user may see, via the virtual room cards 708a-f, that a person of interest is in one of the virtual rooms. The user may select that virtual room card, such as by clicking on that virtual room card.

For example, the user may select the virtual room card 708e. The virtual room corresponding to the virtual room card 708e may be of interest to the user for any number of reasons. For example, the virtual room may be associated with subject matter that is of interest to the user or other users that are of interest to the user may already be in the virtual room. If the user selects the virtual room card 708e, the user may see additional information associated with the virtual room corresponding to the virtual room card 708e.

As depicted by the UI 700, the virtual rooms corresponding to the virtual room cards 708a-f are all public virtual rooms. A public virtual room may be a virtual room that any user associated with the team may view and/or join. In other embodiments, one or more virtual rooms may be private virtual rooms. A private virtual room may be a virtual room that has restrictions on which users associated with the team may view and/or join the virtual room. For example, a private virtual room may be restricted to those users who are participating in a particular meeting. A public virtual room may be changed to a private virtual room, and vice versa.

Figure 8:
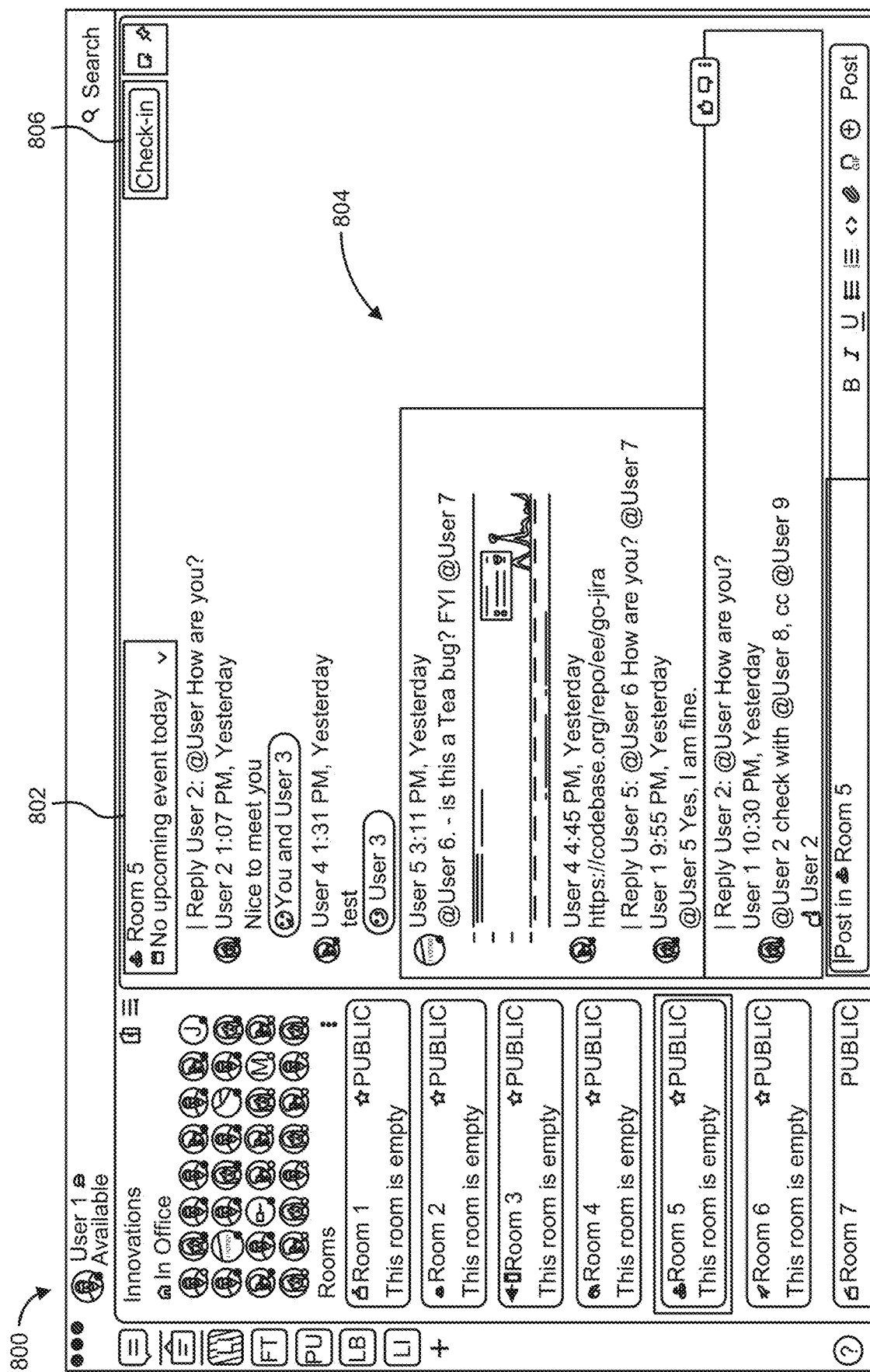
FIG. 8 shows another example user interface for facilitating communication in accordance with the present disclosure.

FIG. 8 illustrates a UI 800 depicting additional information associated with the virtual room corresponding to the virtual room card 708e. A header 802 on the UI 800 indicates the name of the virtual room and/or event information associated with the virtual room. Event information may indicate, for example, whether any meetings that are scheduled for that virtual room are upcoming. A chat 804 associated with the virtual room may be depicted on the UI 800. The user may, before joining the virtual room, be able to view the information that has already been sent to the chat 804 by those users that used to be in the virtual room and/or are currently in the virtual room. The information may include, for example, one or more of a text message, a document, uniform resource locator, image, or a video. Additionally, or alternatively, in some embodiments, the user may be able to send information to the virtual room without ever joining the virtual room.

Figure 9:
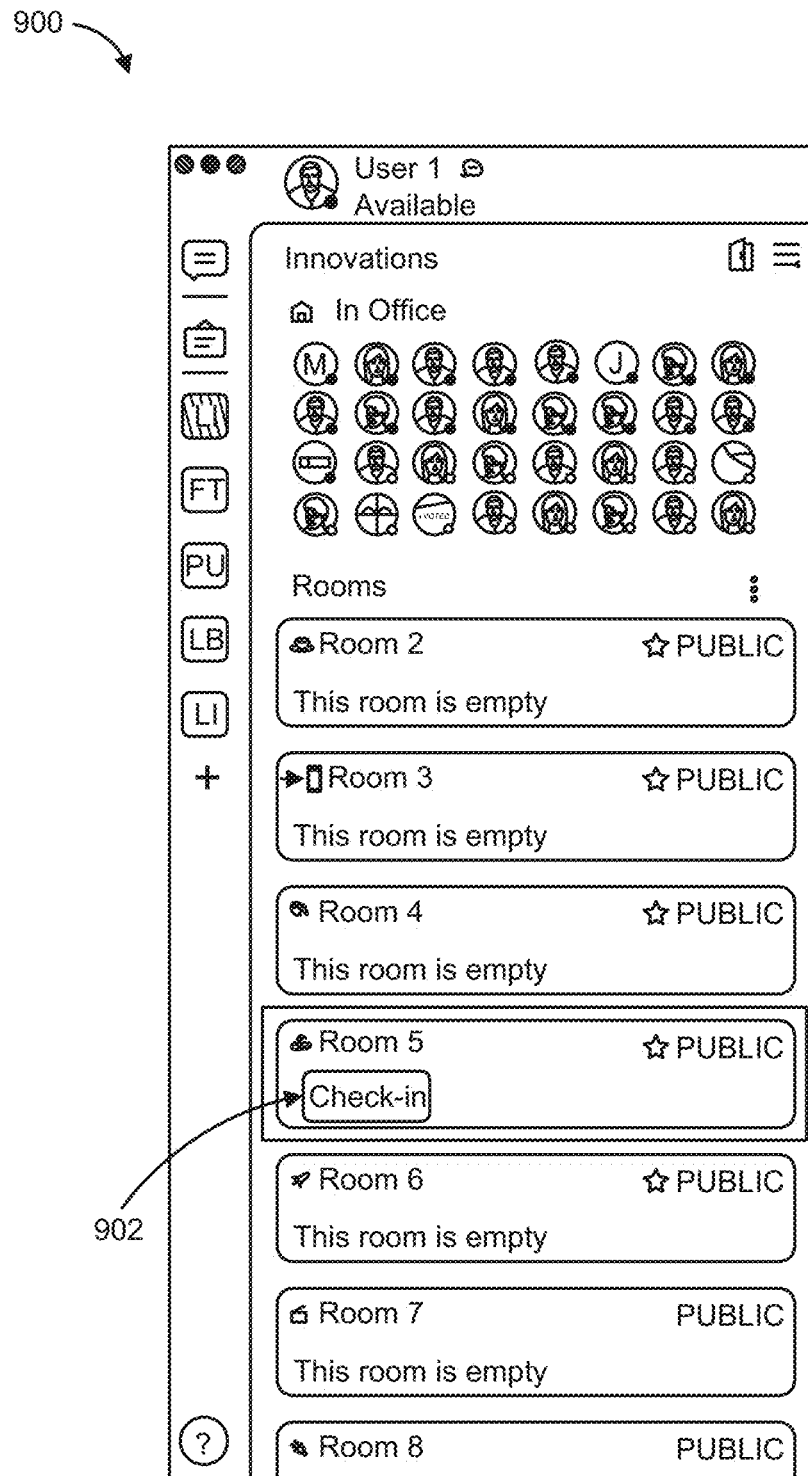
FIG. 9 shows another example user interface for facilitating communication in accordance with the present disclosure.

The user may decide to join the virtual room corresponding to the virtual room card 708e. For example, the user may decide that he or she wants to participate in the chat 804 (e.g., send information to the chat 804). To join the virtual room corresponding to the virtual room card 708e, the user may select the button 806. If the user selects the button 806, the user may be connected to (e.g., be checked-into) the virtual room and may be connected to the communication channel associated with the chat 804. Alternatively, the user may select a button on the virtual room card 708e corresponding to the virtual room that the user wants to join. FIG. 9 illustrates a UI 900 depicting a button 902 on the virtual room card 708e that the user can select to join (e.g., check-into) the virtual room corresponding to the virtual room card 708e.

Figure 10:
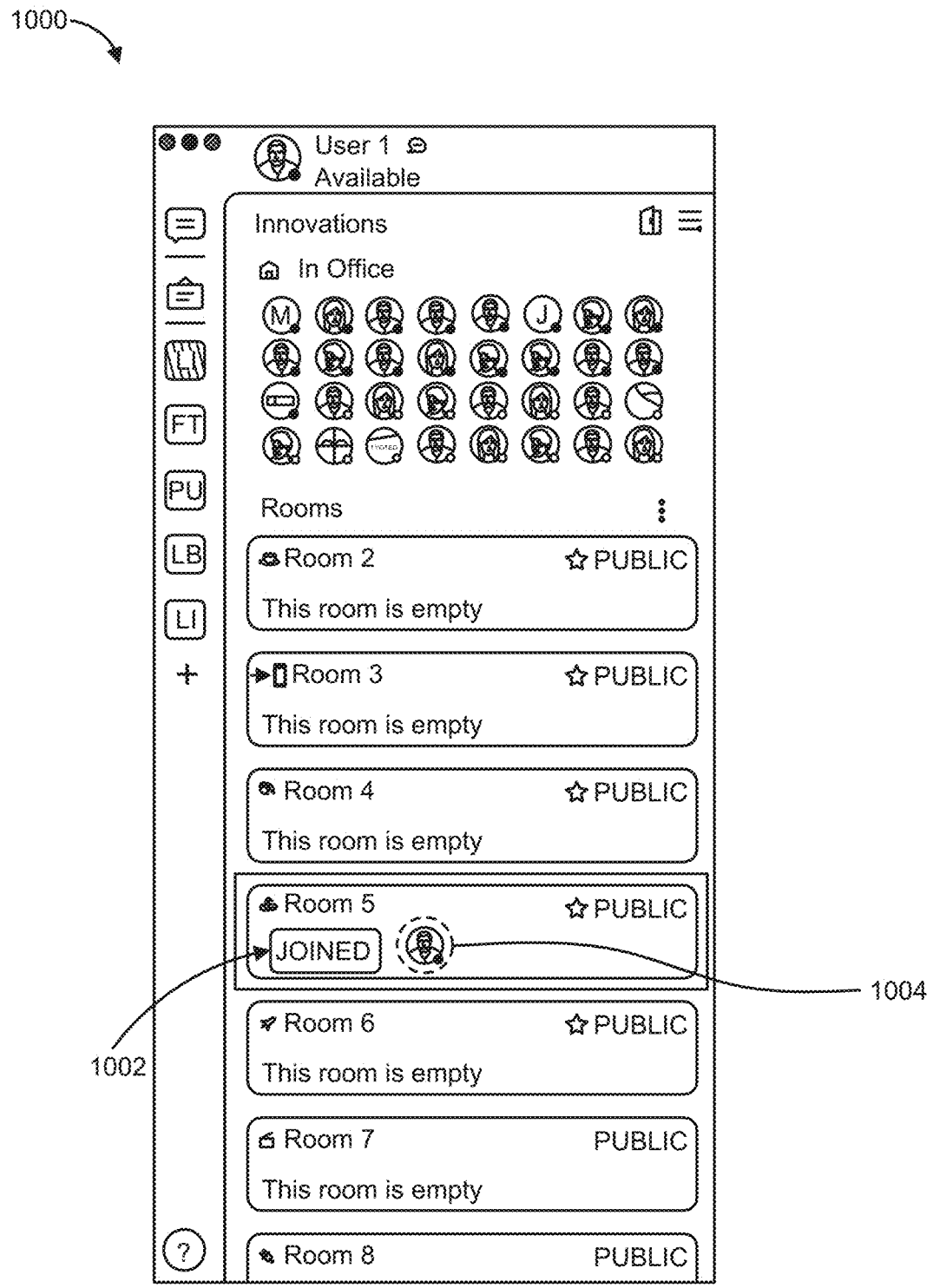
FIG. 10 shows another example user interface for facilitating communication in accordance with the present disclosure.

If the user becomes connected to the virtual room, either by selecting the button 806 or the button 902, an indication 1002 that the user has joined the virtual room may be displayed, as depicted in the UI 1000 shown in FIG. 10. The user may also be able to see an indication 1004 of all users in the virtual room corresponding to the virtual room card 708e. The indication 1004 may include avatars or profile icons associated with some or all users in the virtual room. Additionally, or alternatively, the indication 1004 may include live video associated with some or all users in the virtual room. As depicted in the UI 1000, there is only one user currently in the virtual room corresponding to the virtual room card 708e (e.g., the user that just joined the virtual room).

Once the user has joined the virtual room corresponding to the virtual room card 708e, the user may be able to participate in real-time communicate within the virtual room. The user was not able to participate in both real-time communication and non-real time communication within the virtual room before checking into the virtual room. By contrast, the user may have been able to participate in non-real time communication (but not real-time communication) within the virtual room before joining the virtual room. While the checked-in user is participating in real-time communication in the virtual room, the user and/or other users can participate in non-real-time communication in the virtual room and/or other virtual rooms associated with the team.

Figure 11:
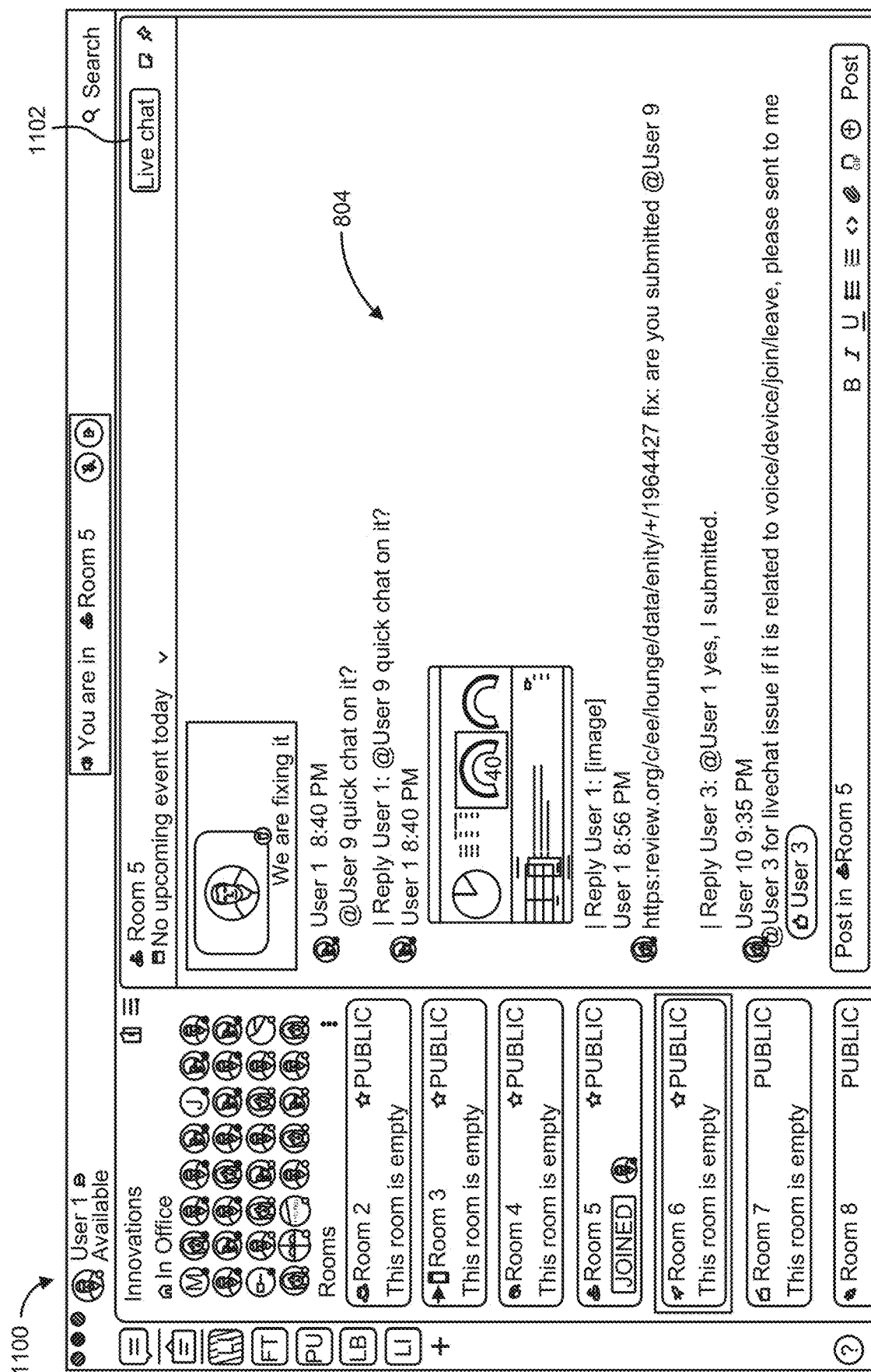
FIG. 11 shows another example user interface for facilitating communication in accordance with the present disclosure.
Figure 12:
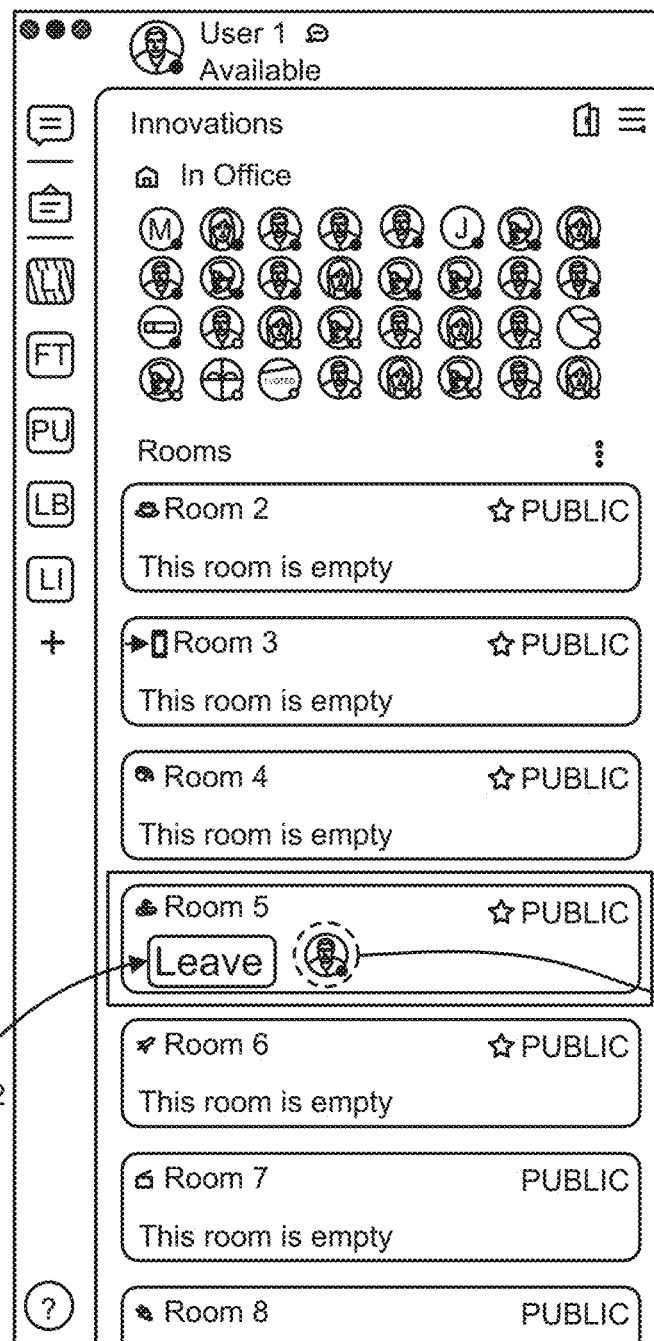
FIG. 12 shows another example user interface for facilitating communication in accordance with the present disclosure.

FIG. 11 illustrates a UI 1100 depicting communication options that a user has after joining a virtual room. For example, if other users are in the virtual room, the user may be able to communicate with those users in real-time (such as via a live video/audio conference). To communicate synchronously, the user may select the button 1102. However, since there is currently only one user in the virtual room, the user may not want to select the button 1102 as there are no other users to communicate synchronously with. If users later join the virtual room, the user may want to select the button 1102 at that time or after that time so that the user may live-chat with the users that have joined the virtual room. The user may additionally, or alternatively, be able to participate in the asynchronous chat 804 within the virtual room. For example, the user may send information, such as text messages, documents, uniform resource locators, images, or videos, to the chat 804.

After the user has joined the virtual room corresponding to the virtual room card 708e, the user may want to leave the virtual room. To do so, the user may select a button 1202 on the virtual room card 708e, as displayed on the UI 1200 of FIG. 12. For example, the indication 1002 that the user has joined the virtual room may transform into the button 1202 after the user has been checked into the virtual room for a certain amount of time.

Figure 13:
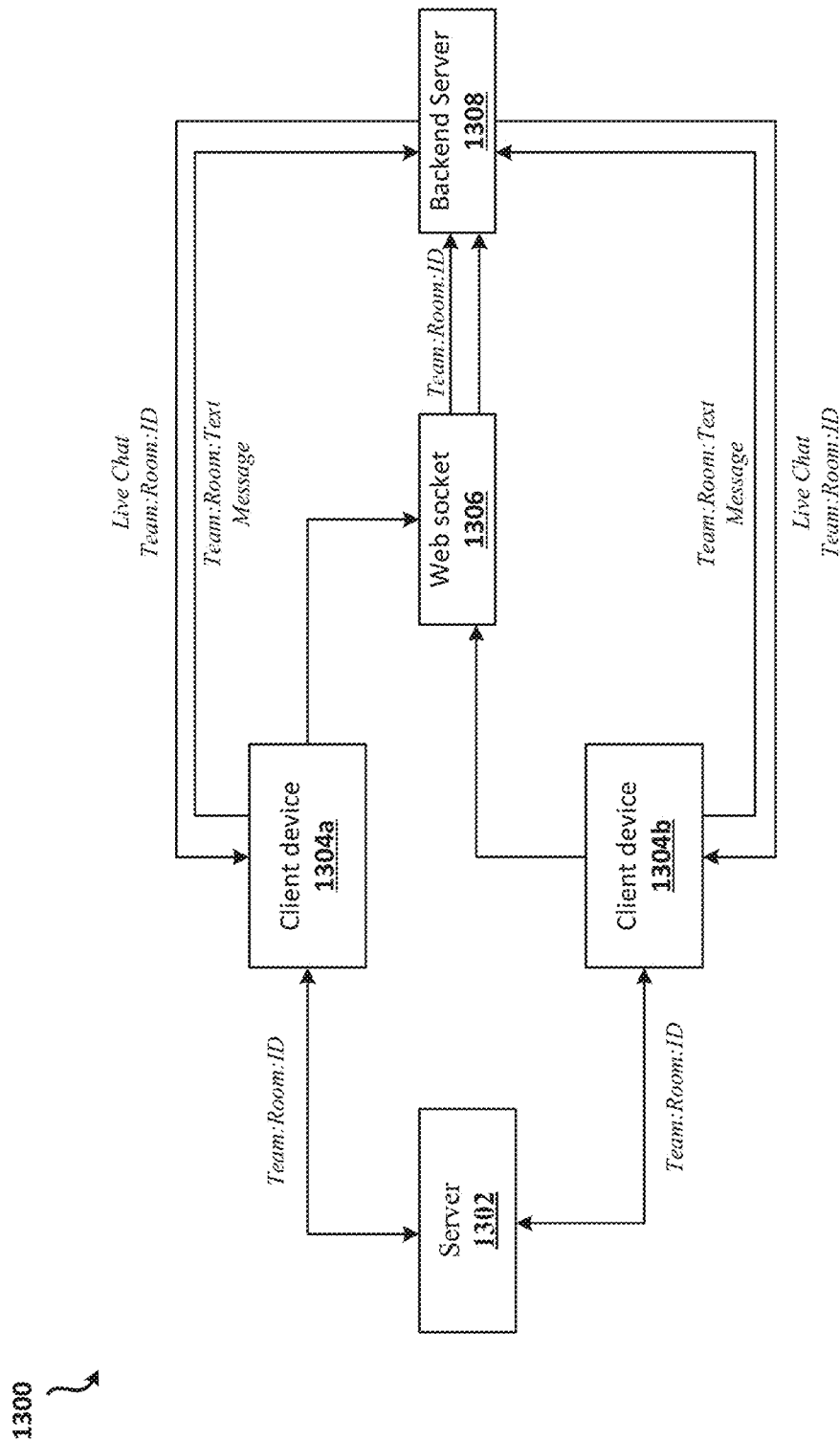
FIG. 13 shows an example system for facilitating communication.

FIG. 13 illustrates a block diagram 1300 depicting two users of a communication service (e.g., communication service 112) being connected to a virtual room and communicating within that virtual room. As discussed above, each of the users of the communication service may be associated with (e.g., belong to, be assigned to) one or more teams (e.g., offices). A team may comprise a group of users of the communication service that share one or more common features and/or frequently communicate with each other regarding one or more topics. For example, a team may comprise a group of co-workers assigned to the same project. The co-workers may need to frequently communicate with each other regarding the project. A particular user may belong to more than one team. Such a user may be able to connect to each of the teams that the user belongs to. In an embodiment, a user may be able to connect to only one team at a time.

Each team may comprise one or more virtual rooms (e.g., groups, etc.). Each virtual room may be associated with a particular topic of conversation or a particular type of conversation. For example, if a team is associated with a group of co-workers, each virtual room in the team may be associated with a different project or conversational topic related to that group of co-workers. A user that is connected to a team may join a virtual room associated with that team if that virtual room is associated with a project/conversational topic of interest. A user may join (e.g., become connected to) one virtual room at a time, or multiple virtual rooms at a time. At any given time, zero, one, or multiple users that belong to a team may be present in any given virtual room.

Two user devices 1304a-b may send a request, to a server 1308, to join a particular virtual room. The two user devices 1304a-b may both be associated with users associated with a particular team. That team may be associated with that virtual room that the users want to join. The server 1308 may receive the requests. In response to receiving the requests, the server 1308 may, in response to receiving the request, prepare an identification number and/or a token associated with that particular virtual room within that particular team. The server 1308 may send the identification number and/or token back to the user devices 1304a-b. The user devices 1304a-b may utilize such identification number(s) or tokens to connect to the virtual room.

For example, the user devices 1304a-b may send, to a server 1302, the identification number and/or token. The server 1302 may utilize the identification number and/or token to connect the two user devices 1304a-b to the virtual room. For example, a web socket 1306 may receive, from each of the user devices 1304a-b, a web socket request. The web socket requests may comprise the identification number and/or token associated with that particular virtual room within that particular team. The web socket 1306 may, in response to receiving the web socket requests, send back to each of the user devices 1304a-b a web socket response. In this manner, the user devices 1304a-b may both be connected to the server 1302 associated with the communication service.

The web socket 1306 may forward, to the server 1302, the identification number and/or token associated with that particular virtual room within that particular team. In response, the server 1302 may initiate a communication channel associated with that virtual room. The user devices 1304a-b may utilize the communication channel to communicate with one another, such as in real-time or non-real time (and any other users already connected to that communication channel within that virtual room).

FIG. 14 illustrates an example process 1400 for facilitating communication, which may be performed by a communication service (e.g., communication service 112) in accordance with the present disclosure. For example, the process 1400 may be utilized to facilitate a collaborative and/or a group-based communication environment. Although depicted as a sequence of operations in FIG. 14, those of ordinary skill in the art will appreciate that various embodiments may add, remove, reorder, or modify the depicted operations.

As discussed above, each user of the communication service may be associated with (e.g., belong to, be assigned to) one or more teams (e.g., offices). A first group of users (e.g., a first team) among a plurality of users may be formed. The first group of users (e.g., the first team) may be associated with one or more virtual rooms. At 1402, a plurality of virtual rooms may be created. Each virtual room may be associated with a particular topic of conversation or a particular type of conversation. For example, if the first group of users includes a group of co-workers, each virtual room associated with the first group of users may be associated with a different project or conversational topic related to that group of co-workers.

Each of the plurality of virtual rooms may be asynchronously accessible by each user in the first group of users. Any user that is connected to the first group of users may join a virtual room associated with the first group of users. The user may want to join a particular virtual room if that virtual room is associated with a project/conversational topic of interest. In an embodiment, a user may join (e.g., become connected to) only one virtual room at a time. In other embodiments, a user may join multiple virtual rooms at a time. At any given time, zero, one, or multiple users that belong to the first group of users may be present in any given virtual room associated with first group of users.

In an embodiment, at least one database (e.g., database(s) 113) maintains a status for each of the plurality of users indicating whether each of the plurality of users is associated with at least one of the plurality of virtual rooms. For example, if one or more users of the plurality of users has connected to (e.g., joined) a virtual room of the plurality of virtual rooms, data indicating that the user(s) have connected to that particular virtual room may be stored in the at least one database.

The plurality of virtual rooms enable communication among users in the first group of users that are associated with at least a first virtual room in the first plurality of virtual rooms. For example, if one or more users in the first group of users join a virtual room in the first plurality of virtual rooms, the one or more users may communicate via a communication channel associated with that particular virtual room. At 1404, a request from a first user among the plurality of users may be received. The request may be a request to associate with (e.g., join, be connected to) a first virtual room among the plurality of virtual rooms. At 1406, the first user may be permitted to associate with the first virtual room by enabling real-time communication between the first user and other users among the plurality of users who are associated with the first virtual room and providing information indicative of the first user's association with the first virtual room. The information indicative of the first user's associated with the first virtual room may indicate, to other users among the plurality of users, that the first user is associated with the first virtual room. The other users may utilize this information to decide if they want to join the first virtual room. For example, if another user wants to communicate with the first user, the another user may request to associate with the first virtual room so that he or she can communicate with the first user inside of the first virtual room.

If two or more users in the first group of users join the first virtual, those users may communicate synchronously with each other via a communication channel associated with the first virtual room. For example, the users may video and/or audio conference with each other. As another example, if one or more users in the first group of users join the first virtual room, the one or more users may communicate asynchronously with each other via a communication channel associated with the first virtual room. For example, one user may leave a text message, a document, a uniform resource locator, an image, or a video in the virtual room (regardless of whether other users are joined to the room). Additionally, or alternatively, two users may communicate via text messaging/instant messaging in the first virtual room while both users are in the virtual room.

FIG. 15 illustrates an example process 1500 for facilitating communication, which may be performed by a communication service (e.g., communication service 112) in accordance with the present disclosure. For example, the process 1500 may be utilized to facilitate a collaborative and/or a group-based communication environment. Although depicted as a sequence of operations in FIG. 15, those of ordinary skill in the art will appreciate that various embodiments may add, remove, reorder, or modify the depicted operations.

As discussed above, each user of the communication service may be associated with (e.g., belong to, be assigned to) one or more teams (e.g., offices). A first group of users (e.g., a first team) among a plurality of users may be formed. The first group of users (e.g., the first team) may be associated with one or more virtual rooms. At 1502, a plurality of virtual rooms may be created. Each virtual room may be associated with a particular topic of conversation or a particular type of conversation. For example, if the first group of users includes a group of co-workers, each virtual room associated with the first group of users may be associated with a different project or conversational topic related to that group of co-workers.

Each of the plurality of virtual rooms may be asynchronously accessible by each user in the first group of users. Any user that is connected to the first group of users may join a virtual room associated with the first group of users. The user may want to join a particular virtual room if that virtual room is associated with a project/conversational topic of interest. In an embodiment, a user may join (e.g., become connected to) only one virtual room at a time. In other embodiments, a user may join multiple virtual rooms at a time. At any given time, zero, one, or multiple users that belong to the first group of users may be present in any given virtual room associated with first group of users.

In an embodiment, at least one database (e.g., database(s) 113) maintains a status for each of the plurality of users indicating whether each of the plurality of users is associated with at least one of the plurality of virtual rooms. For example, if one or more users of the plurality of users has connected to (e.g., joined, is associated with) a virtual room of the plurality of virtual rooms, data indicating that the user(s) have connected to that particular virtual room may be stored in the at least one database. At 1504, information may be transmitted to a plurality of client computing devices associated with the plurality of users for display of status information for the plurality of virtual rooms. The information may comprise information indicative of whether any user among the plurality of users is associated with any of the plurality of virtual rooms. For example, the information may comprise information indicative of the data stored in the at least one database.

The plurality of virtual rooms enable real-time communication among users in the first group of users that are associated with at least a first virtual room in the first plurality of virtual rooms. For example, if one or more users in the first group of users join a virtual room in the first plurality of virtual rooms, the one or more users may communicate via a communication channel associated with (e.g., establishing within) that particular virtual room. The communication channel may comprise a web-socket, as shown in FIG. 13. At least some communications made by any user among the plurality of users in association with any one of the plurality of virtual rooms may be stored in the at least one database (e.g., database(s) 113) in association with a corresponding virtual room.

At 1506, a request from a first user among the plurality of users may be received. The request may be a request to associate with (e.g., join, be connected to) a first virtual room among the plurality of virtual rooms. For example, the first user may have sent the request to join based on viewing the information displaying the status information for the plurality of rooms. For example, the first user may have seen that a second user was in the first virtual room, and the first user may have sent the request to join the first virtual room in order to initiate real-time communication with the second user in the first virtual room.

At 1508, the first user may be permitted to associate with the first virtual room by enabling real-time communication between the first user and other users (such as the second user) among the plurality of users who are associated with the first virtual room and providing information indicative of the first user's association with the first virtual room. The information indicative of the first user's associated with the first virtual room may indicate, to other users among the plurality of users, that the first user is associated with the first virtual room. The other users may utilize this information to decide if they want to join the first virtual room. For example, if a third user wants to communicate with the first user, the third user may request to associate with the first virtual room so that he or she can communicate with the first user inside of the first virtual room.

If two or more users in the first group of users join the first virtual, those users may communicate synchronously with each other via a communication channel associated with the first virtual room. For example, the users may video and/or audio conference with each other. As another example, if one or more users in the first group of users join the first virtual room, the one or more users may communicate asynchronously with each other via a communication channel associated what that the first virtual room. For example, one user may leave a text message, a document, a uniform resource locator, an image, or a video in the virtual room (regardless of whether other users are joined to the room). Additionally, or alternatively, two users may communicate via text messaging/instant messaging in the first virtual room while both users are in the virtual room.

At 1510, information may be transmitted to the plurality of client computing devices associated with the plurality of users for display of status information indicative of the first user's association with the first virtual room. The status information may indicate the availability of the first user. For example, other users in the plurality of users may see the status of the first user and may gain an understanding of the first user's availability. The status information associated with the first user may indicate that they are available, idle/away, busy, or do not want to be disturbed. The first user may set his or her own status. Additionally, or alternatively, the communication service may automatically update the first user's status, such as after a particular period of time.

In an embodiment, in addition to indicating whether a user is available, idle/away, busy, or does not want to be disturbed, the status information may indicate a period of time for which that status is applicable. For example, the first user's status may indicate that they are busy for the next two hours, or the first user's status may indicate that they are available for the next 20 minutes, etc. The first user may adjust this time period manually. Additionally, or alternatively, the communication system 112 may automatically populate this time period based on, for example, a calendar associated with the user.

Figure 16:
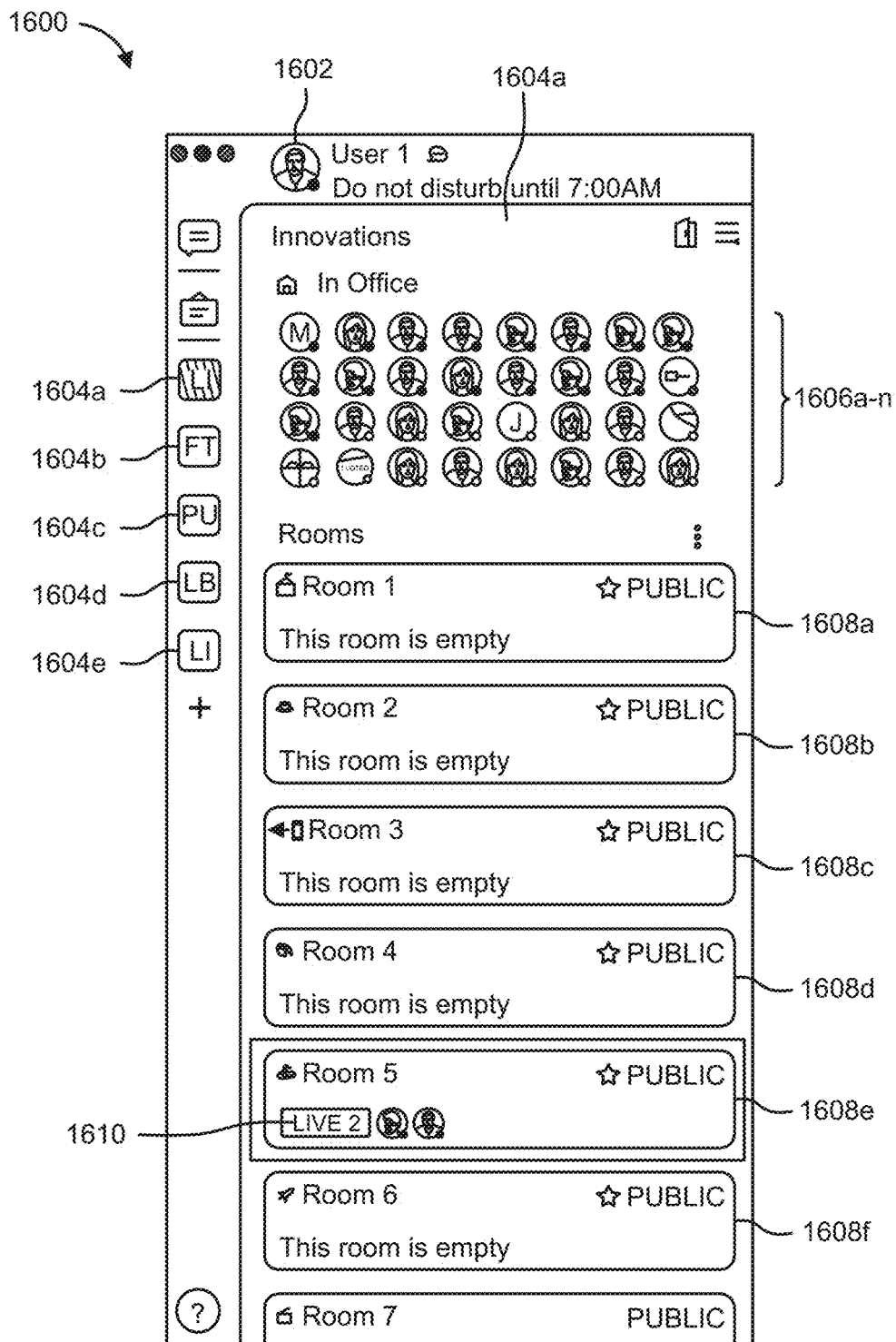
FIG. 16 shows another example user interface for facilitating communication in accordance with the present disclosure.

While users that have joined the first virtual room may communicate within the first virtual room, users in the first virtual room may additionally, or alternatively, communicate with users that are outside of the first virtual room. For example, the first user may directly chat and/or video/audio call with a second user that is not in the first virtual room. At 1512, status information indicative of the first user's availability to communicate with at least one second user among the plurality of users may be provided. In an embodiment, the at least one second user is not associated with the first virtual room. The first and second user may communicate, for example, via text messaging/direct messaging. The status information may indicate an availability, a time associated with that availability, and/or a location of the first user and/or the second user. FIG. 16 illustrates a UI 1600 depicting various virtual room cards associated with a team. The UI 1600 may, for example, be displayed on a user device belonging to a user associated with the user information 1602. The user information 1602 indicates one or more of a name, a status/availability, and a photo of the user. Whereas in FIG. 7, the UI 700 depicted the status/availability of the user as being "available," the UI 1600 depicts that the status/availability of the user is now "do not disturb"

until a particular time. In this manner, the communication service 112 provides detailed insight as to the availability of the user, and the other users associated with the profile icons 1606a-n may have a strong understanding of that user's availability and/or status.

Each team that the user is associated with (e.g., belongs to) may correspond to an icon 1604a-e. The user may select a particular icon 1604a-e to view information associated with the corresponding team. The UI 1600 depicts the icon 1604a as being selected. Accordingly, the virtual rooms corresponding to the virtual room cards 1608a-f associated with the team corresponding to the icon 1604a are displayed on the UI 1600. The user may select any one of the virtual room cards 1608a-f to view information associated with the corresponding virtual room. For example, the user may see that one of the virtual room cards 1608a-f is associated with a virtual room has a name that is of interest to the user, and/or the user may see that a person of interest is in one of the virtual rooms.

The UI 1600 depicts, via an indication 1610, that two users are currently communicating via a live (e.g., synchronous, real-time) communication in the virtual room corresponding to the virtual room card 1608e. The indication 1610 on the virtual room card 1608e may depict the number of room members if a user is not checked into the virtual room corresponding to the virtual room card 1608e. The UI 1600 also depicts that the virtual room corresponding to the virtual room card 1608e is public (e.g., other users are welcome to join). The user may view this information and decide that he or she does not want to participate in this real-time communication with those two users. In that case, the user would not request to join the virtual room corresponding to the virtual room card 1608e. Alternatively, the user may view this information and decide that he or she does want to view information associated with the virtual room corresponding to the virtual room card 1608e and/or participate in this real-time communication with those two users. In this case, the user may select (e.g., click on) the virtual room card 1608e. If the virtual room corresponding to the virtual room card 1608e were instead private, the user may not be able to view information associated with the virtual room and/or join the virtual room even if he or she wanted to. For example, the two users participating in the real-time communication in the virtual room corresponding to the virtual room card 1608-e may not want other users to join the communication, and therefore may have set the virtual room status as private.

Figure 17:
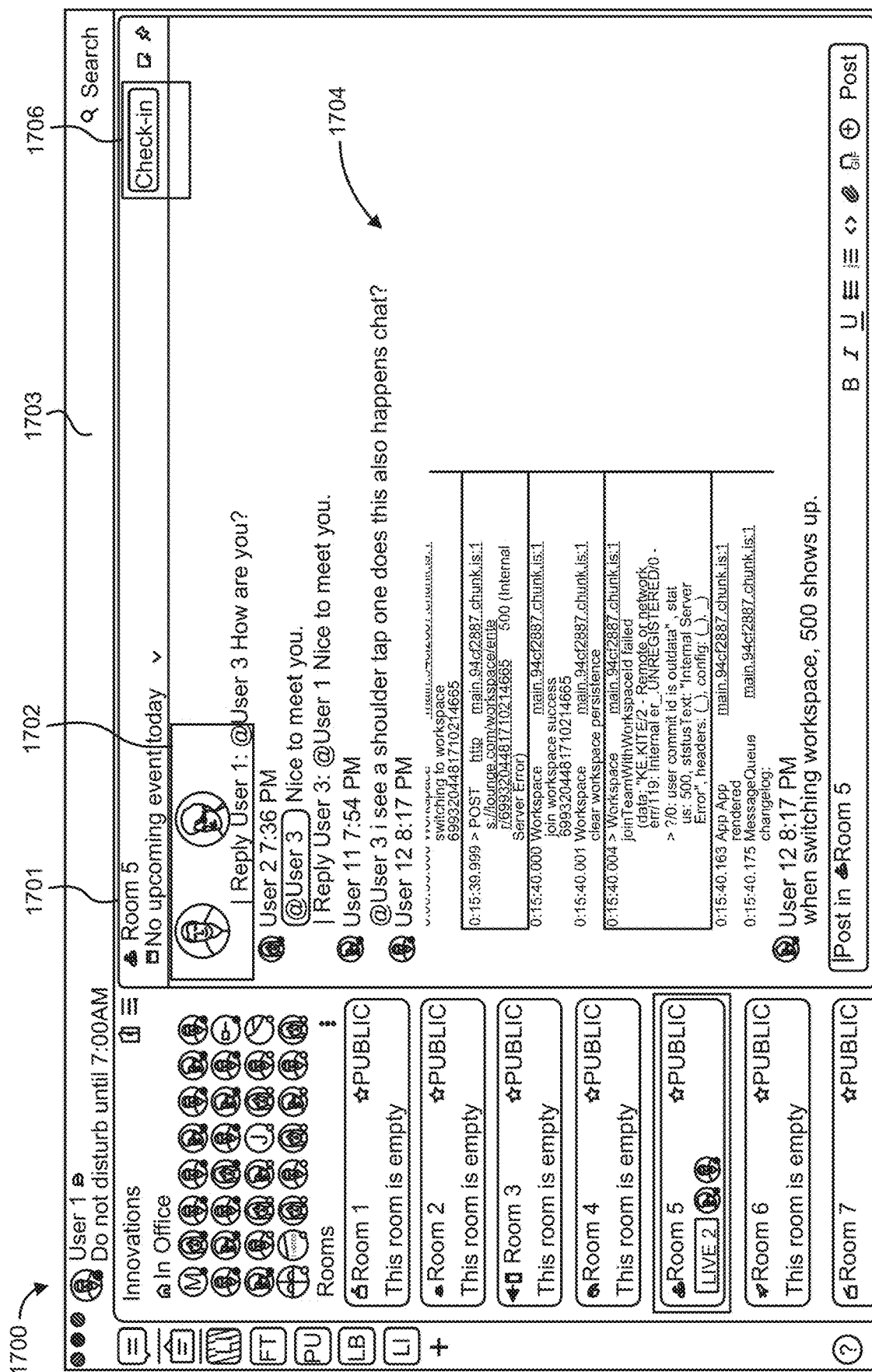
FIG. 17 shows another example user interface for facilitating communication in accordance with the present disclosure.

If the user selects the virtual room card 1608e, the user may view additional information associated with the virtual room before joining the virtual room. FIG. 17 illustrates a UI 1700 depicting additional information associated with the virtual room corresponding to the virtual room card 1608e. A header 1701 under a navigation bar 1703 on the UI 1700 indicates the name of the virtual room corresponding to the virtual room card 1608e and/or event information associated with the virtual room corresponding to the virtual room card 1608e. Event information may indicate, for example, whether any meetings that are scheduled for that virtual room are upcoming. A chat 1704 associated with the virtual room corresponding to the virtual room card 1608e may be depicting on the UI 1700.

The user may, before joining the virtual room corresponding to the virtual room card 1608e, be able to view the messages that have already been sent by those users that used to be checked-in the virtual room, and/or are currently in the virtual room. Additionally, or alternatively, the user may be able to send a message to the virtual room without ever joining the virtual room. The user may, before joining the virtual room corresponding to the virtual room card 1608e, be able to see which users are participating in a real-time communication within the virtual room. For example, a box 1702 on the UI 1700 may indicate which users/how many users are currently participating in a real-time communication within the virtual room. The box 1702 depicts that two users are currently participating in a real-time communication within the virtual room.

The user may decide to join the virtual room corresponding to the virtual room card 1608e. For example, the user may decide that he or she wants to participate in the chat 1704 and/or the user may device that he or she wants to participate in the real-time communication occurring between the two other users. To join the virtual room, the user may select the button 1706. If the user selects the button 1706, the user may be connected to the virtual room and may be connected to the communication channel associated with the chat 1704 and/or a different communication channel associated with the real-time communication.

Figure 18:
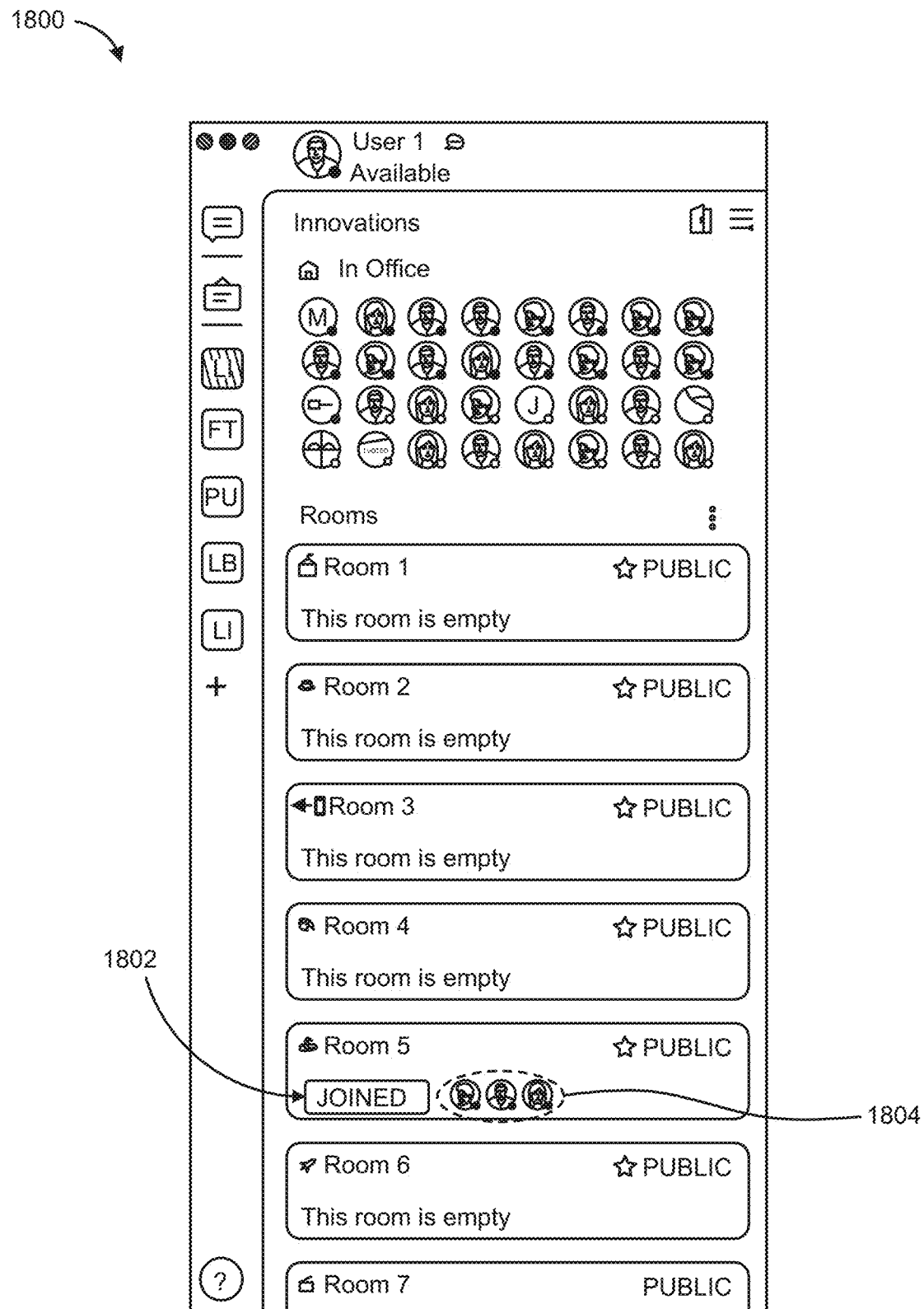
FIG. 18 shows another example user interface for facilitating communication in accordance with the present disclosure.

If the user becomes connected to the virtual room corresponding to the virtual room card 1608e, an indication that the user has joined the virtual room may be displayed. FIG. 18 illustrates a UI 1800 depicting an indication 1802 that the user has joined (e.g., checked-into) the virtual room corresponding to the virtual room card 1608e. The user may also be able to see an indication 1804 of all users in the virtual room. As depicted in the UI 1800, there are now currently three users in the virtual room corresponding to the virtual room card 1608e.

Figure 19:
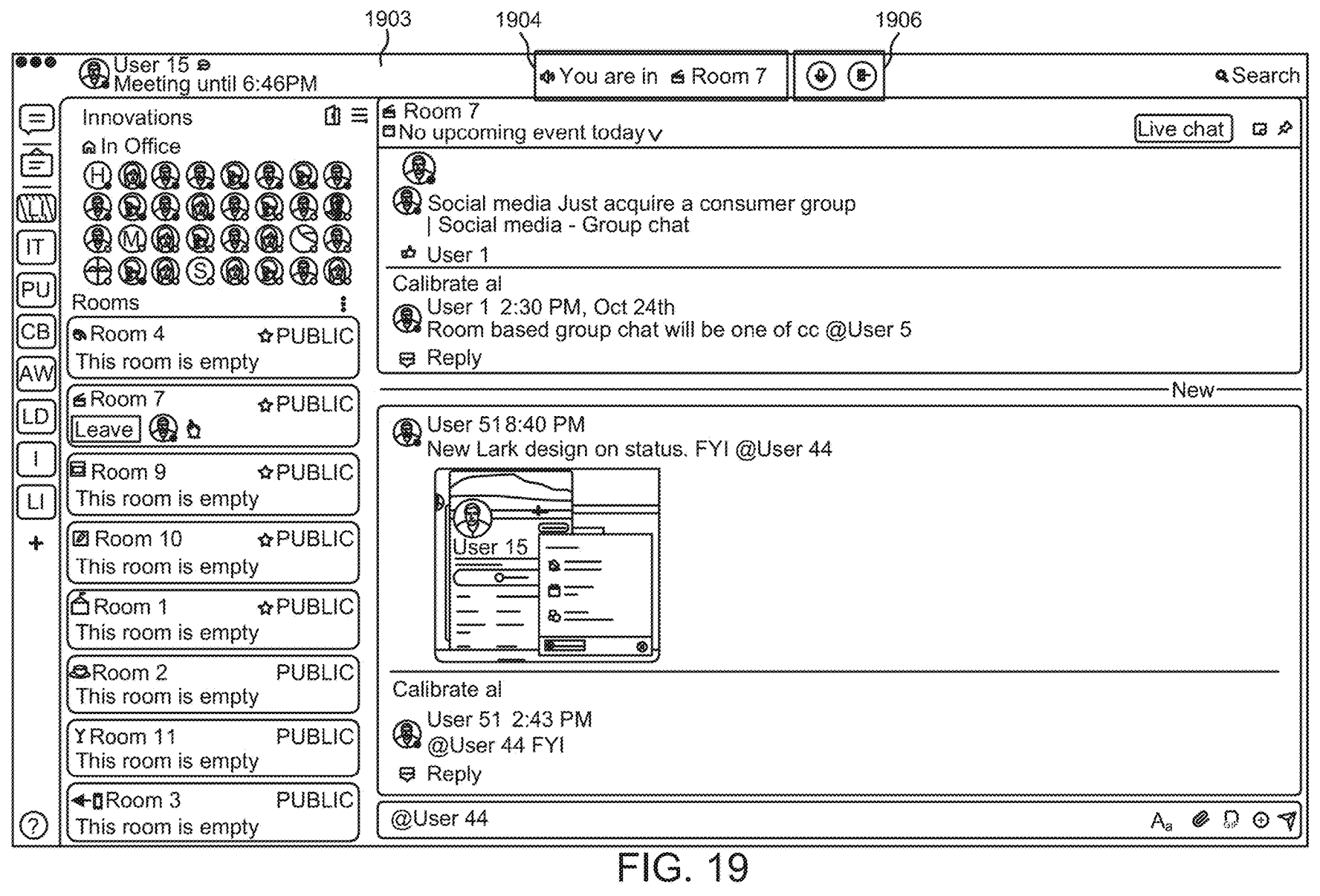

Once the user is connected to or checked-into the virtual room corresponding to the virtual room card 1608e, the UI 1900 as depicted in FIG. 19 may be displayed. The UI 1900 includes a box 1904 indicating a name of the virtual room. The UI 1900 includes a navigation bar 1903. The navigation bar 1903 may be a different color than the navigation bar 1703 (when the user was not checked into a virtual room). Additionally, or alternatively, the navigation bar 1903 may be a different shape than the navigation bar 1703. For example, a dynamic sound wave shape may be included in the navigation bar 1903 (but not included in the navigation bar 1703). In certain embodiments, the dynamic sound wave shape may be displayed regardless of whether the current interface is displaying the virtual room which the user has checked into. The UI 1900 includes a set of icons 1906. For example, the icons 1906 include a "mute" icon and a "leave" icon. By selecting the mute icon, the user may be able to mute any communications occurring in the virtual room. By selecting the leave icon, the user may be able to leave (e.g., un-check in from) the virtual room. The navigation bar 1903, the box 1904, and/or the set of icons 1906 may be displayed when the user has a checked-in status, regardless of whether the current interface is displaying the virtual room which the user has checked in to.

Figure 20:
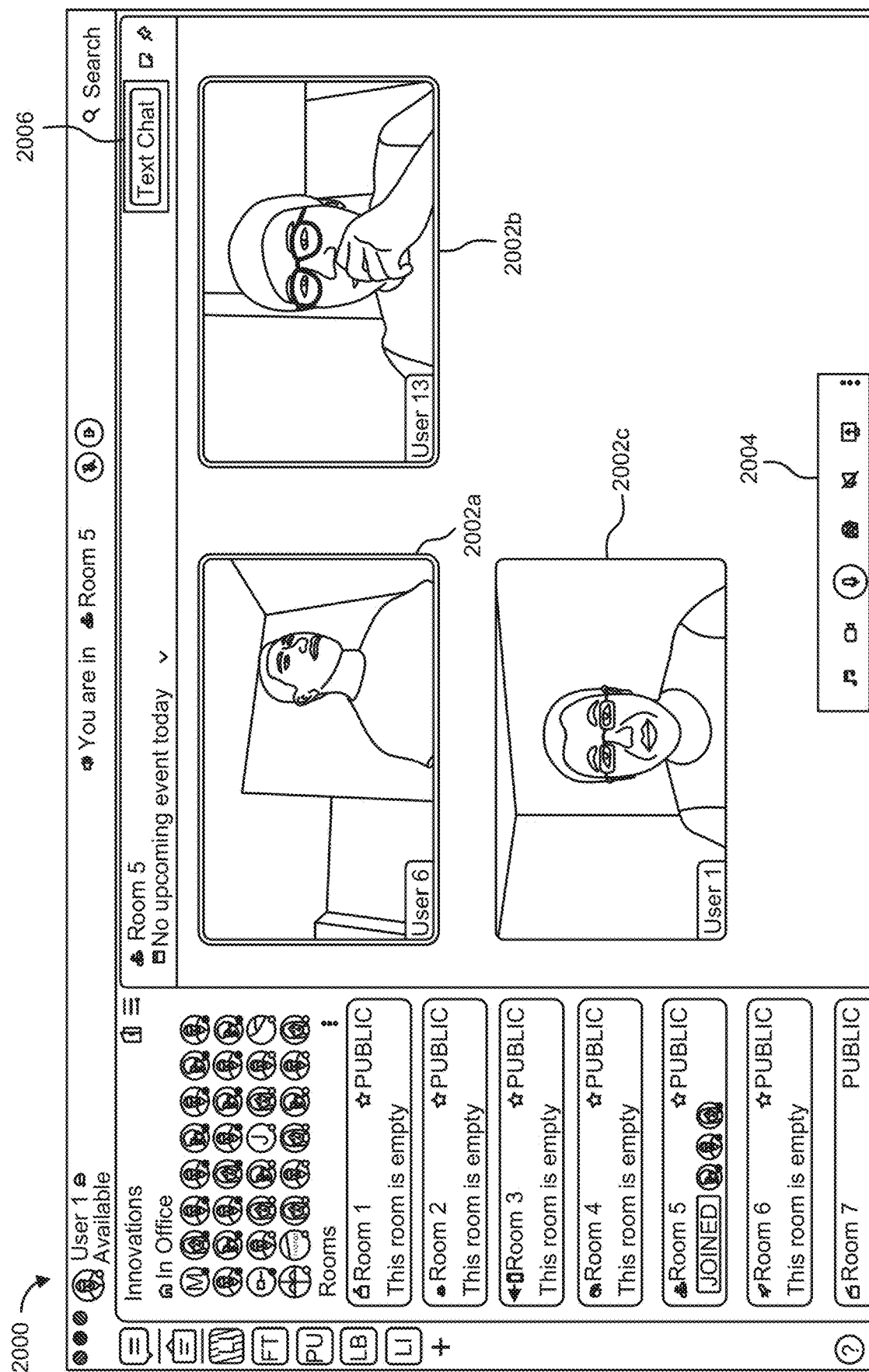
FIG. 20 shows another example user interface for facilitating communication in accordance with the present disclosure.
Figure 21:
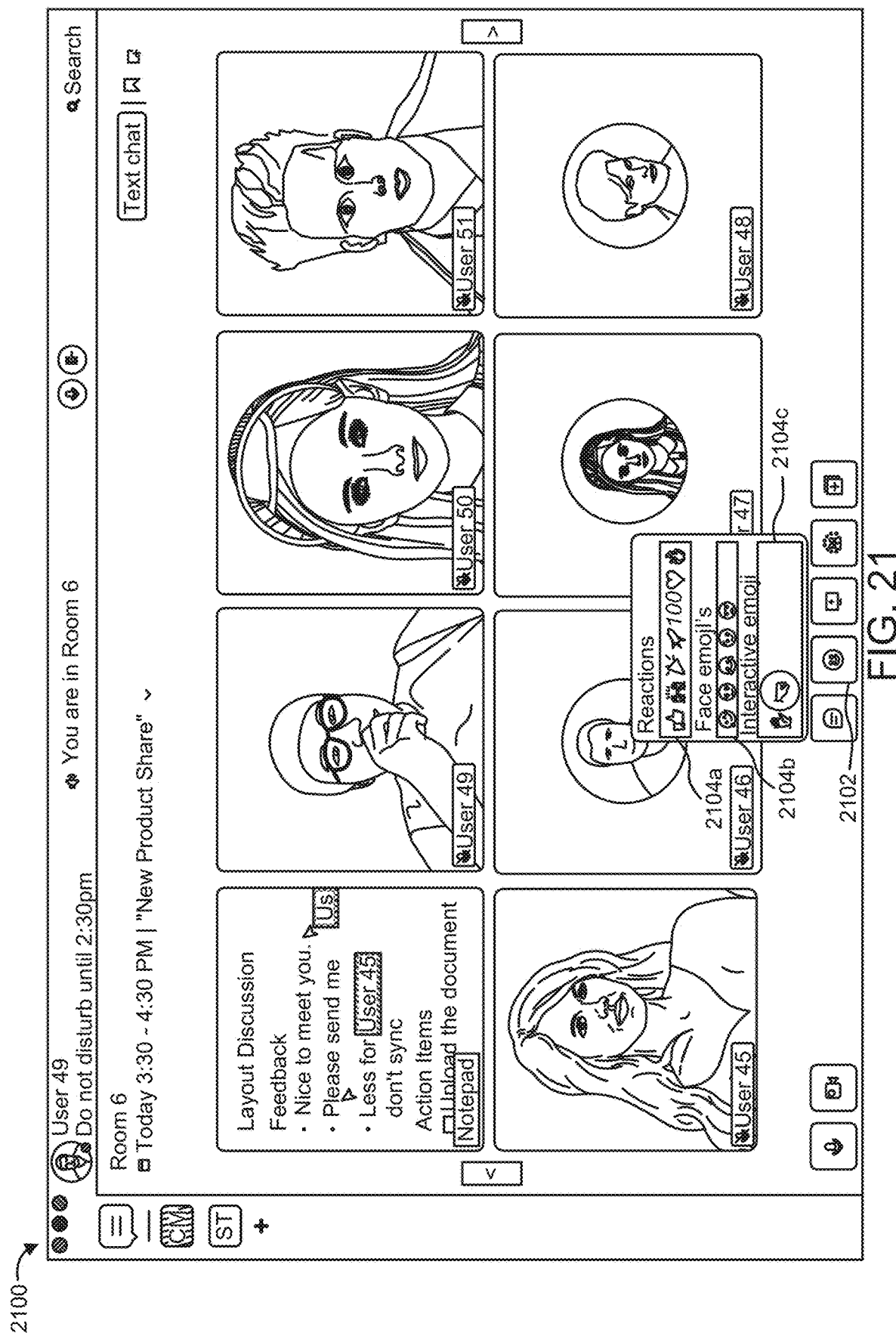
FIG. 21 shows another example user interface for facilitating communication in accordance with the present disclosure.
Figure 22:
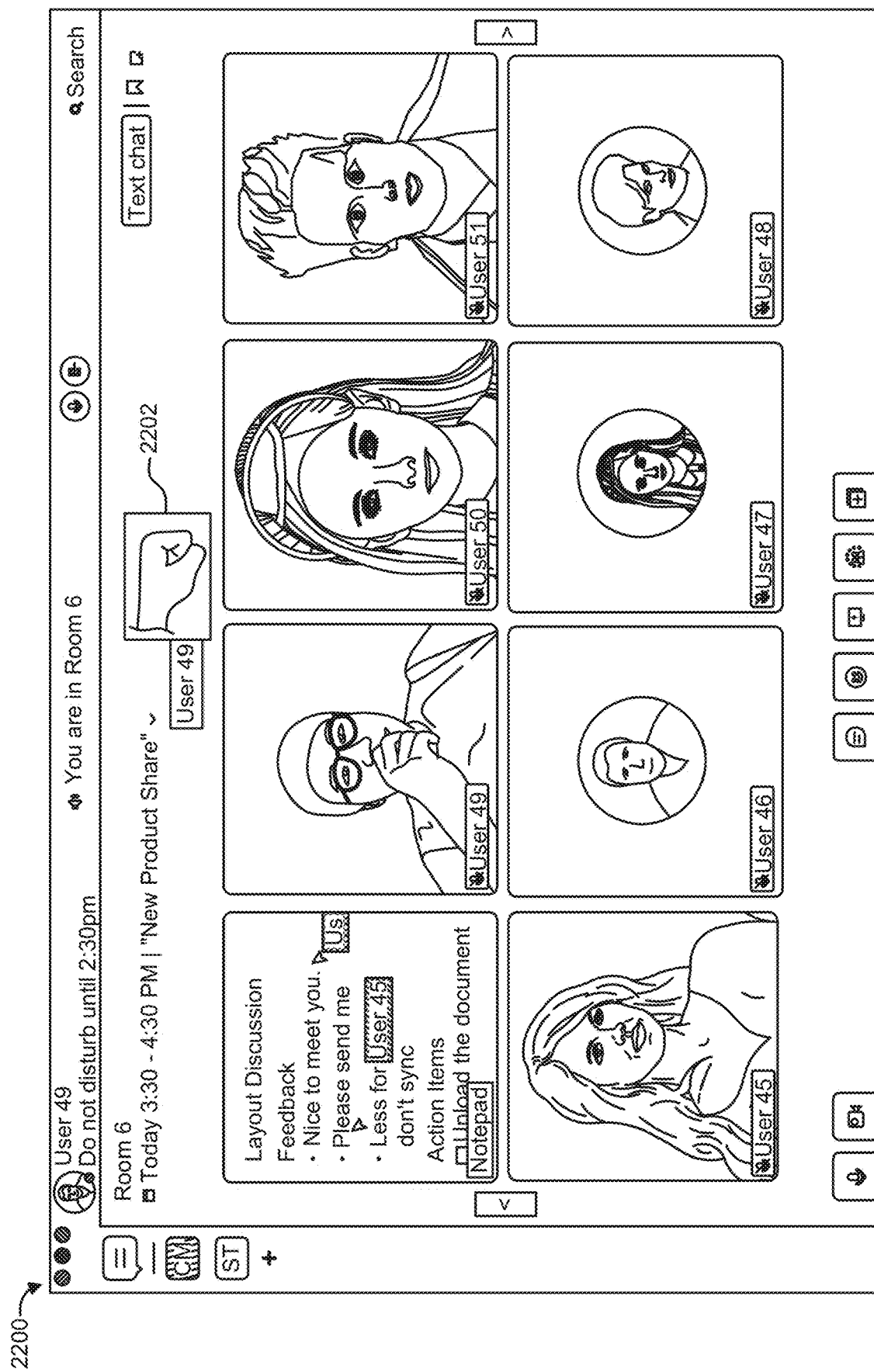
FIG. 22 shows another example user interface for facilitating communication in accordance with the present disclosure.
Figure 23:
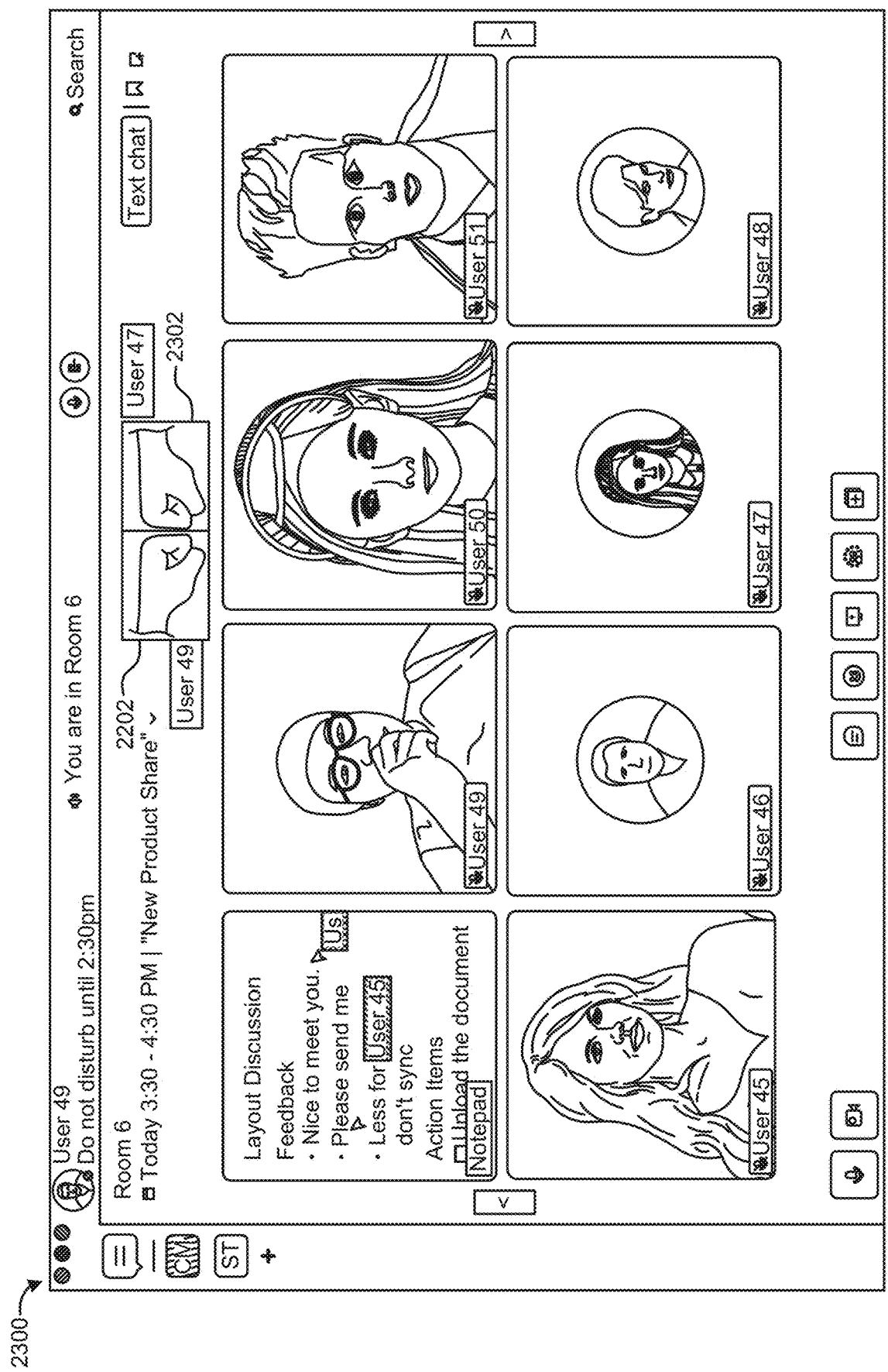
FIG. 23 shows another example user interface for facilitating communication in accordance with the present disclosure.
Figure 24:
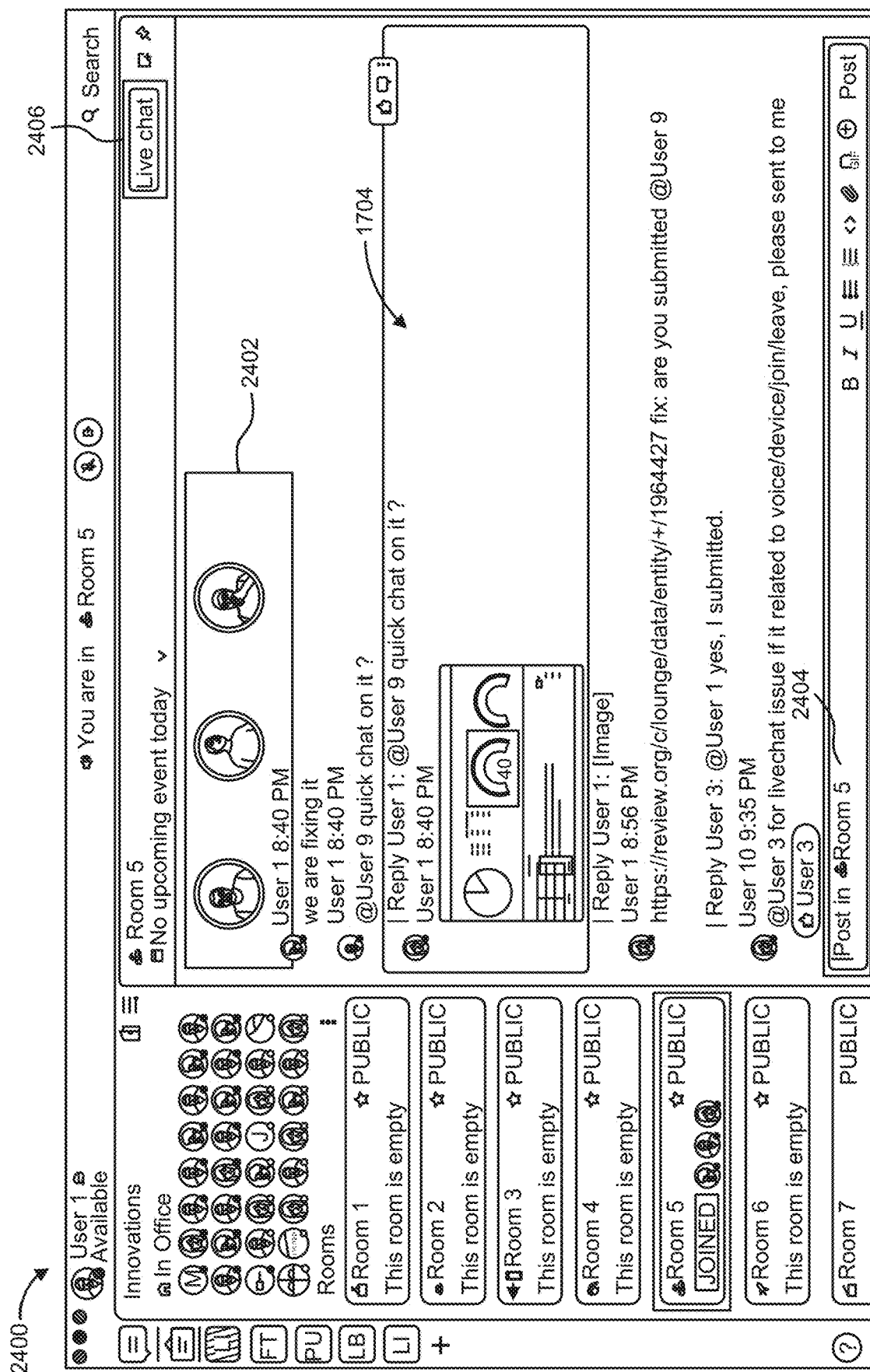
FIG. 24 shows another example user interface for facilitating communication in accordance with the present disclosure.

Once the user is connected to the virtual room corresponding to the virtual room card 1608e, the user may participate in the real-time communication between the other two users in the virtual room. FIG. 20 illustrates a UI 2000 depicting a real-time communication between the three users now in the virtual room. Each of the users is associated with one of the live video feed thumbnails 2002a-c. The order of the thumbnails 2002a-c is according to the order in which the users have joined the audio call. The user themselves may be the first participant.

Each other may view his or her own live video feed, as well as the video feeds of the other two users. The user may select a button from the buttons 2004. While a live video communication is depicted in FIG. 20, it should be appreciated that the real-time communication may alternatively be a live audio (no video) communication. Alternatively, some users may be participating in live video communication while others have turned off their video and are participating using only audio. Users that are participating using only audio may be represented by a static thumbnail instead of a live video feed thumbnail.

In an embodiment, two of the live video feeds 2002a-c 2 will be horizontally aligned, so that the live video feeds 2002a-c are displayed in a rectangular formation. For example, if another user joined the real-time communication depicted by the UI 2000, the additional user may be displayed to the right of the user 2002c so as to form a rectangular shape. If there are more than a certain number of participants (e.g., more than 16 participants, etc.), some participants may be shown on a different screen. If a participant on the different screen is speaking, their live video feed may appear on the first screen.

In an embodiment, the user can decide to choose any participant (including the participant himself) and enlarge/pin the live video feed associated with the chosen participant to the main screen. Only the user that chose to pin the participate can see the pinned user as pinned.

The user may select one or more of the buttons 2006 to adjust settings associated with the real-time communication. For example, the user may select one or more of the buttons to user mute/unmute microphone, push to talk, deafen/undeafen the audio. If the user has video on at this time, the video button may indicate that video is on.

In an embodiment, the user can select a button 2006 to share his or her screen with the other users participating in the real-time communication. The screenshare will allow the user to share applications open right now on the user's device (including browser) or the user's entire desktop. The user can simply turn-off screenshare by selecting the button 2006 associated with screensharing again. Only one user participating in the real-time communication may screenshare at a time. If a user is doing screenshare, others will not be able to screenshare at that time. Other users will see a notification that someone else is screensharing at this time. Once the user leaves the meeting, the screenshare may turn-off automatically. Screenshare may not be affected if the user turns off their video (e.g., an audio-only user may still be able to screenshare). The user screensharing may be the first participant in the meeting.

In embodiments, participants in the real-time communication may use emoji reactions to communicate with each other. As shown in the UI 2100 of FIG. 21, the participants may select a button 2102 to initiate the sending of an emoji reaction to the other participants in the real-time communication. After selecting the button 2102, the user can select a button 2104a to send an emoji reaction, the button 2104b to send a face emoji, or the button 2104c to send an interactive emoji. The emoji reactions and the face emojis are static emojis sent to the other participants in the real-time communication.

The interactive emojis may "interact" with other interactive emojis. For example, one participant in the real-time communication can send an interactive emoji 2202, as depicted in the UI 2200 of FIG. 22. A different particular in the real-time communication can send the same interactive emoji 2302, as depicted in the UI 2300 of FIG. 23. For example, when the first participant sends the interactive emoji 2202, if the different participant also sends the same interactive emoji (e.g., interactive emoji 2302) shortly afterwards (such as within a certain number of seconds and/or minutes), the two emojis 2202, 2302 may interact with each other. When the first participant sends the first interactive emoji 2202, the initial position of the first interactive emoji 2202 will be in the first participant's block. An identification number and/or name of the first participant sender will display aside the first interactive emoji 2202. When the second participant sends the second interactive emoji 2302, the initial position of the second interactive emoji 2302 will be in the second participant's block.

The two interactive emojis 2202, 2302 can move towards each other so that they can interact with each other. For example, the two interactive emojis 2202, 2302 can move towards the top of the real-time communication interface (or any other feasible area of the real-time communication interface). To interact, the two interactive emojis 2202, 2302 can "bump" into each other, or interact in any other feasible way. As an example, if the two interactive emojis 2202, 2302 are fists, the two interactive emojis 2202, 2302 can interact with each other by doing a "fist bump." As another example, if the two interactive emojis 2202, 2302 are hands, the two interactive emojis 2202, 2302 can interact with each other by doing a "high five."

After joining the real-time communication, the user may decide that he or she wants to view the text chat 1704 associated with the virtual room. In this case, the user may select the button 2006 to switch back to viewing the text chat 1704 associated with the virtual room. If the user selects the button 2006 to switch back to viewing the text chat 1704 associated with the virtual room, the user may still be able to view, listen, and participate in a smaller version of the real-time communication via a window 2402 on the UI 2400. While the user is viewing, listening, or participate in the real-time communication via the window 2402, the user may simultaneously enter a message via the text box 2404. In some embodiments, the window 2402 may be an indicator indicating users in the live chat (not in a small window). In some embodiments, the room card corresponding to a virtual room may depict the avatars or profile icons associated with the users in the virtual room. In other embodiments, the room card corresponding to a virtual room may depict live video associated with one or more users in the virtual room. For example, the room card corresponding to "Room 5" may depict the live video icons depicted in the window 2402. The message may be sent to the text chat 1704. The user can, at any time, switch back to viewing only the real-time communication by selecting the button 2406.

The users that have been connected to a particular virtual room may all want to participate in a live, synchronous communication with one another. However, in some instances, only a portion (e.g., subset) of the users that have been connected to a particular virtual room may want to participate in a live, synchronous communication with one another. For example, if three people are in a virtual room, two of the users may want to have a real-time communication with one another, without the third user. The two users may do so by participating in a live bubble chat. The two users may participate in real-time communication inside of the bubble. The bubble may include a communication channel that is not accessible to the third user that is not in the bubble. However, despite only the two users being in the bubble, they are still in the same virtual room as the third user. Therefore, all three users still may communicate via the communication channel associated with that virtual room. The communication channel associated with the bubble chat may be a sub-channel of the communication channel associated with the virtual room.

Figure 25:
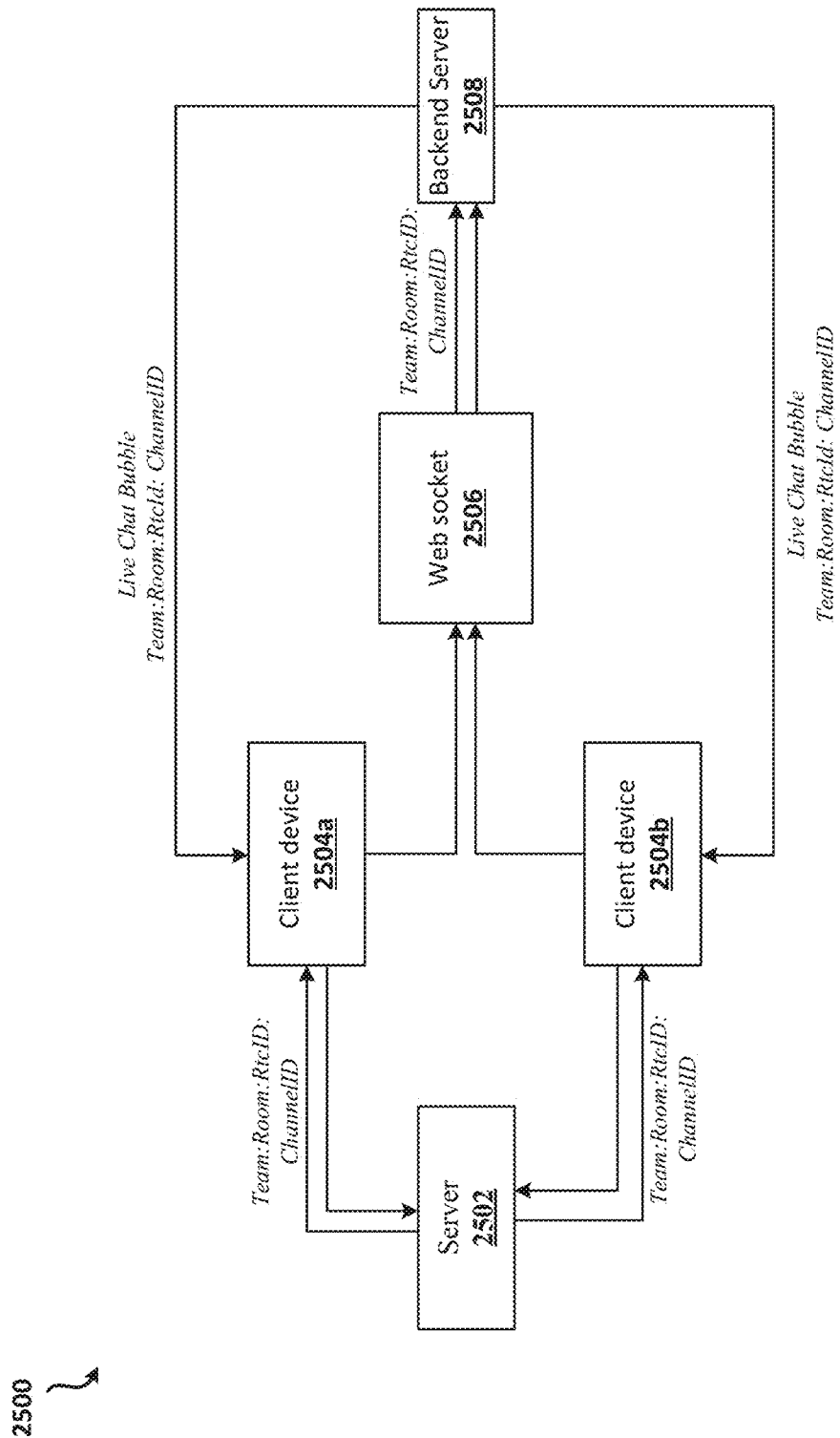
FIG. 25 shows an example system for facilitating communication.

FIG. 25 is a system block diagram 2500 depicting two users of a communication service (e.g., communication service 112) being connected to a bubble within a virtual room. As discussed above, each of the users of the communication service may be associated with (e.g., belong to, be assigned to) one or more teams (e.g., offices). A team may comprise a group of users of the communication service that share one or more common features and/or frequently communicate with each other regarding one or more topics. For example, a team may comprise a group of co-workers assigned to the same project. The co-workers may need to frequently communicate with each other regarding the project. A particular user may belong to more than one team. Such a user may be able to connect to each of the teams that the user belongs to. In an embodiment, a user may be able to connect to only one team at a time.

Each team may comprise one or more virtual rooms (e.g., groups, etc.). Each virtual room may be associated with a particular topic of conversation or a particular type of conversation. For example, if a team is associated with a group of co-workers, each virtual room in the team may be associated with a different project or conversational topic related to that group of co-workers. A user that is connected to a team may join a virtual room associated with that team if that virtual room is associated with a project/conversational topic of interest. A user may join (e.g., become connected to) one virtual room at a time, or multiple virtual rooms at a time. At any given time, zero, one, or multiple users that belong to a team may be present in any given virtual room. A user that is connected to a virtual room may join a bubble within that virtual room. When a user joins a bubble within the virtual room, the user may communicate with other users that are also in the bubble. Users that are in the virtual room, but not in the bubble, may not be able to participate in such communication.

Two user devices 2504a-b may send a request, to a server 2508, to join a particular virtual room. The two user devices 2504a-b may both be associated with users associated with a particular team. That team may be associated with that virtual room that the users want to join. The server 2508 may receive the requests. In response to receiving the requests, the server 2508 may, in response to receiving the request, prepare an identification number and/or a token associated with that particular virtual room within that particular team. The server 2508 may send the identification number and/or token back to the user devices 2504a-b. The user devices 2504a-b may utilize such identification number(s) or tokens to connect to the virtual room.

For example, the user devices 2504a-b may send, to a server 2502, the identification number and/or token. The server 2502 may utilize the identification number and/or token to connect the two user devices 2504a-b to the virtual room. For example, a web socket 2506 may receive, from each of the user devices 2504a-b, a web socket request. The web socket requests may comprise the identification number and/or token associated with that particular virtual room within that particular team. The web socket 2506 may, in response to receiving the web socket requests, send back to each of the user devices 2504a-b a web socket response. In this manner, the user devices 2504a-b may both be connected to the server 2502 associated with the communication service.

The web socket 2506 may forward, to the server 2502, the identification number and/or token associated with that particular virtual room within that particular team. In response, the server 2502 may initiate a communication channel associated with that virtual room. The user devices 2504a-b may utilize the communication channel to communicate with one another, such as in real-time or non-real time (and any other users already connected to that communication channel within that virtual room).

One of user devices 2504a-b may send, to the backend server 2508, a request to initiate a bubble within the virtual room. For example, the user device 2504a may send a request to participate in a bubble communication with the other user device 2504b. The user device 2504a may send such a request if the user associated with the user device 2504a wants to communicate with the user associated with the user device 2504b but does not want the other users within the virtual room to participate in the communication. The other user device 2504b may send an indication that the user associated with the user device 2504b has accepted the request.

In response to receiving the acceptance, the server 2508 may prepare an identification number and/or a token associated with a sub-communication channel within that particular virtual room. The server 2508 may send the identification number and/or token back to the user devices 2504a-b. The user devices 2504a-b may utilize such identification number(s) or tokens to connect to the sub-communication channel within the virtual room. For example, the user devices 2504a-b may send, to the server 2502, the identification number and/or token to connect to the sub-communication channel. The server 2502 may utilize the identification number and/or token to connect the two user devices 2504a-b to the sub-communication channel within the virtual room. The user devices 2504a-b may utilize the sub-communication channel to communicate with one another (but not with any other users connected to the primary communication channel within that virtual room).

FIG. 26 illustrates an example process 2600 for facilitating communication, which may be performed by a communication service (e.g., communication service 112) in accordance with the present disclosure. For example, the process 2600 may be utilized to facilitate a collaborative and/or a group-based communication environment. Although depicted as a sequence of operations in FIG. 26, those of ordinary skill in the art will appreciate that various embodiments may add, remove, reorder, or modify the depicted operations.

As discussed above, each user of the communication service may be associated with (e.g., belong to, be assigned to) one or more teams (e.g., offices). A plurality of users (e.g., a first team) may be formed. The plurality of users (e.g., the first team) may be associated with one or more virtual rooms. At 2602, at least one virtual room accessible by the plurality of users may be created. A subset of users among the plurality of users may be associated with the at least one virtual room. For example, a subset of users among the plurality of users may have requested to join the at least one virtual room. The subset of users may have been granted permission to access the at least one virtual room.

In an embodiment, at least one database (e.g., database(s) 113) maintains a status for each of the plurality of users indicating whether each of the plurality of users is associated with at least one of the plurality of virtual rooms. For example, if the subset of users has connected to (e.g., joined, is associated with) the at least one virtual room, data indicating that the subset of users have connected to the at least one virtual room may be stored in the at least one database.

The at least one virtual room may enable real time communication among the subset of users, and the subset of users may communicate with each other in the at least one room through a first communication channel. For example, if the subset of users join the at least one virtual room, the subset of users may communicate via a communication channel associated with (e.g., establishing within) the at least one virtual room. The communication channel may comprise a web-socket, as shown in FIG. 25. At least some communications made by any user among the subset of users in association with the at least one virtual room may be stored in the at least one database (e.g., database(s) 113) in association with a corresponding virtual room.

At 2604, a request from a first user in the subset of users may be received. The request may be a request to communicate with at least a second user in the subset of users separately from the first communication channel. For example, the request may be a request to communicate in a bubble with the second user in the subset of users. The first user may want to particulate in a real-time conversation with the second user, but the first user may not want the other users in the subset of users to be able to participate in the real-time conversation.

At 2606, a first sub-communication channel may be established between the first user and the at least a second user. The first sub-communication channel may be a sub-channel of the first communication channel. The first communication channel and the first sub-communication channel may be associated with different channel identifiers.

Only the first user and the at least a second user may have access to the first sub-communication channel. The first sub-communication channel communication between the first user and the at least a second user may not be accessible by other users in the subset of users. Communications by way of the first sub-communication channel may be transient and may not be stored in association with the at least one virtual room. By contrast, communications by way of the first communication channel may be stored in the at least one database in association with the at least one virtual room.

For example, the other users among the subset of users may not be able to hear, see, or speak to the first user or the at least a second user via the first sub-communication channel. In an embodiment, communication in the first communication channel between at least one of the first user or the at least a second user with others in the subset of users remains enabled while communication is also enabled between the first user and the at least a second user in the first sub-communication channel. For example, the first user and the at least a second user may still be able to hear, see, or speak to the other users among the subset of users, such as via the first communication channel. The first communication channel remains accessible to the first user and the at least a second user.

FIG. 27 illustrates an example process 2700 for facilitating communication, which may be performed by a communication service (e.g., communication service 112) in accordance with the present disclosure. For example, the process 2700 may be utilized to facilitate a collaborative and/or a group-based communication environment. Although depicted as a sequence of operations in FIG. 27, those of ordinary skill in the art will appreciate that various embodiments may add, remove, reorder, or modify the depicted operations.

As discussed above, each user of the communication service may be associated with (e.g., belong to, be assigned to) one or more teams (e.g., offices). A plurality of users (e.g., a first team) may be formed. The plurality of users (e.g., the first team) may be associated with one or more virtual rooms. At 2702, at least one virtual room accessible by the plurality of users may be created. A subset of users among the plurality of users may be associated with the at least one virtual room. For example, a subset of users among the plurality of users may have requested to join the at least one virtual room. The subset of users may have been granted permission to access the at least one virtual room.

In an embodiment, at least one database (e.g., database(s) 113) maintains a status for each of the plurality of users indicating whether each of the plurality of users is associated with at least one of the plurality of virtual rooms. For example, if the subset of users has connected to (e.g., joined, is associated with) the at least one virtual room, data indicating that the subset of users have connected to the at least one virtual room may be stored in the at least one database. Information associated with the at least one virtual room may be caused to be displayed on a plurality of client computing device associated with the plurality of users. The information comprises at least one of information indicative of whether any sub-communication channel has been established in the at least one virtual room, information indicative of a number of sub-communication channels in the at least one virtual room, or information indicative of any particular user in the at least one subset of users communicates with any other particular user in the at least one subset of users over any particular sub-communication channel.

The at least one virtual room may enable real time communication among the subset of users, and the subset of users may communicate with each other in the at least one room through a first communication channel. For example, if the subset of users join the at least one virtual room, the subset of users may communicate via a communication channel associated with (e.g., establishing within) the at least one virtual room. The communication channel may comprise a web-socket, as shown in FIG. 25. At least some communications made by any user among the subset of users in association with the at least one virtual room may be stored in the at least one database (e.g., database(s) 113) in association with a corresponding virtual room.

At 2704, a request from a first user in the subset of users may be received. The request may be a request to communicate with at least a second user in the subset of users separately from the first communication channel. For example, the request may be a request to communicate in a bubble with the second user in the subset of users. The first user may want to particulate in a real-time conversation with the second user, but the first user may not want the other users in the subset of users to be able to participate in the real-time conversation.

At 2706, a first sub-communication channel may be established between the first user and the at least a second user. The first sub-communication channel may be a sub-channel of the first communication channel. The first communication channel and the first sub-communication channel may be associated with different channel identifiers.

Only the first user and the at least a second user may have access to the first sub-communication channel. The first sub-communication channel communication between the first user and the at least a second user may not be accessible by other users in the subset of users. Communications by way of the first sub-communication channel may be transient and may not be stored in association with the at least one virtual room. By contrast, communications by way of the first communication channel may be stored in the at least one database in association with the at least one virtual room.

For example, the other users among the subset of users may not be able to hear, see, or speak to the first user or the at least a second user via the first sub-communication channel. In an embodiment, communication in the first communication channel between at least one of the first user or the at least a second user with others in the subset of users remains enabled while communication is also enabled between the first user and the at least a second user in the first sub-communication channel. For example, the first user and the at least a second user may still be able to hear, see, or speak to the other users among the subset of users, such as via the first communication channel. The first communication channel remains accessible to the first user and the at least a second user.

The other users in the room may be made aware that the first user and the second user are in a bubble. At 2708, an indication may be provided to other users in the subset of users that the first user and the at least a second user have established the first sub-communication channel. Providing the indication may prevent the other users in the subset of users from trying to interrupt the communication within the first sub-communication channel and/or from trying to get the attention of the first or second user while they are in the bubble.

More than one bubble may be established within the same room. At 2710, a second sub-communication channel may be established between a third user and at least a fourth user to communicate separately from the first communication channel and the first sub-communication channel. The second sub-communication channel may be a sub-channel of the first communication channel. The first communication channel and the second sub-communication channel may be associated with different channel identifiers.

Only the third user and the at least a fourth user may have access to the second sub-communication channel. The second sub-communication channel communication between the third user and the at least a fourth user may not be accessible by other users in the subset of users. For example, the second sub-communication channel communication between the third user and the at least a fourth user may not be accessible by the first or second user. Communications by way of the second sub-communication channel may be transient and may not be stored in association with the at least one virtual room. By contrast, communications by way of the first communication channel may be stored in the at least one database in association with the at least one virtual room.

For example, the other users among the subset of users may not be able to hear, see, or speak to the third user or the at least a fourth user via the second sub-communication channel. In an embodiment, communication in the first communication channel between at least one of the third user or the at least a fourth user with others in the subset of users remains enabled while communication is also enabled between the third user and the at least a fourth user in the second sub-communication channel. For example, the third user and the fourth user may still be able to hear, see, or speak to the other users among the subset of users, such as via the first communication channel. The first communication channel remains accessible to the third user and the fourth user.

Figure 28:
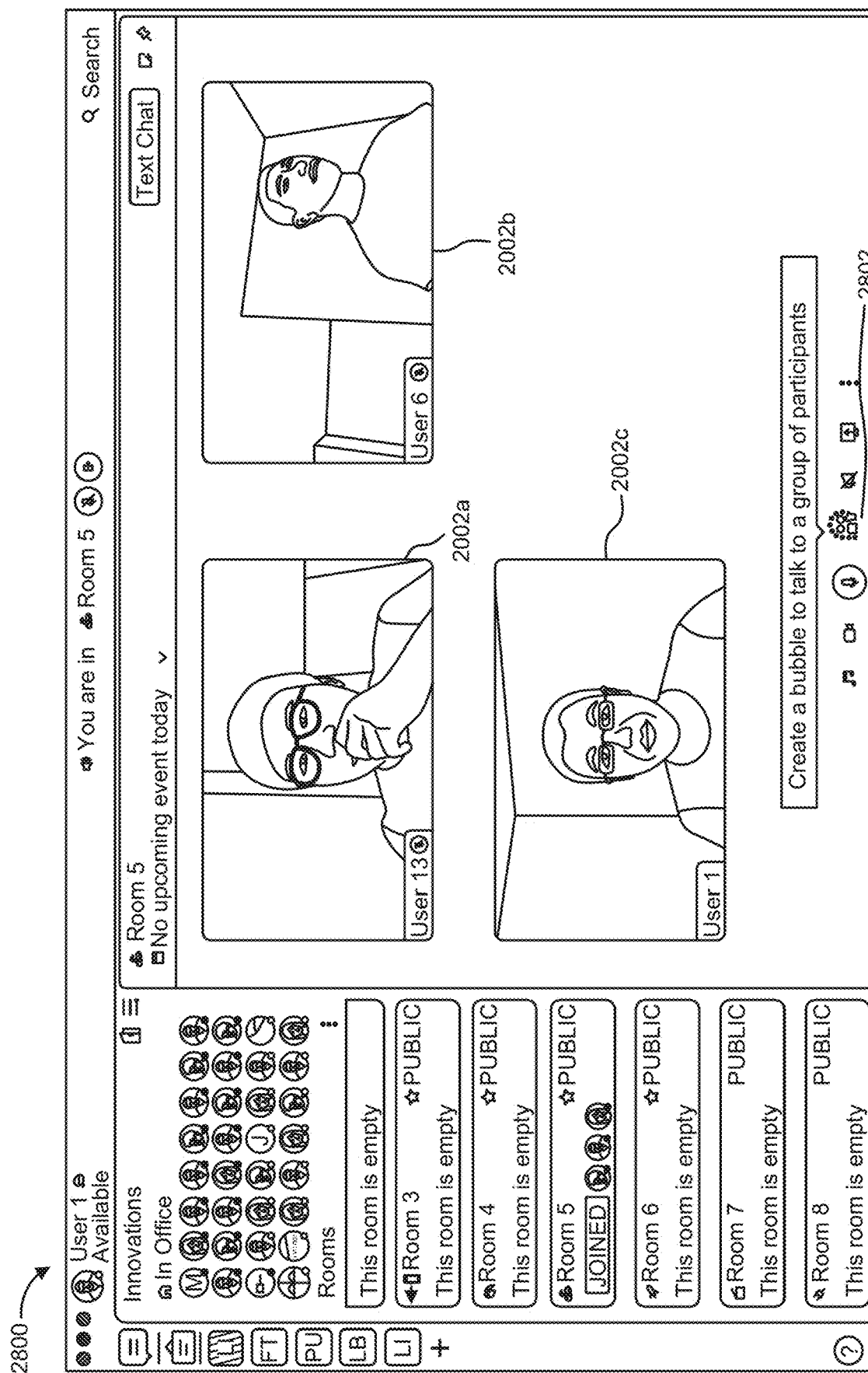
FIG. 28 shows another example user interface for facilitating communication in accordance with the present disclosure.

FIG. 28 illustrates a UI 2800 depicting the user associated with the thumbnail 2002c participating in a real-time communication with the users associated with the thumbnails 2002a-b. If the user associated with the thumbnail 2002c wants to participate in a real-time communication with only one of the other users, the user associated with the thumbnail 2002c may initiate a bubble chat between himself and the desired other user by selecting the button 2002. The other user (not included in the bubble chat) may not have access to the communication channel associated with the bubble chat, despite having access to the communication channel associated with the virtual room.

Alternatively, if the user associated with the thumbnail 2002c wants to participate in a real-time communication with both of the other users but does not want any users that later join the virtual room to participate in the real-time communication, the user associated with the thumbnail 2002c may initiate a bubble chat between all three of the users by selecting the button 2802. Users that later join the virtual room may not have access to the communication channel associated with the bubble chat, despite having access to the communication channel associated with the virtual room.

Figure 29:
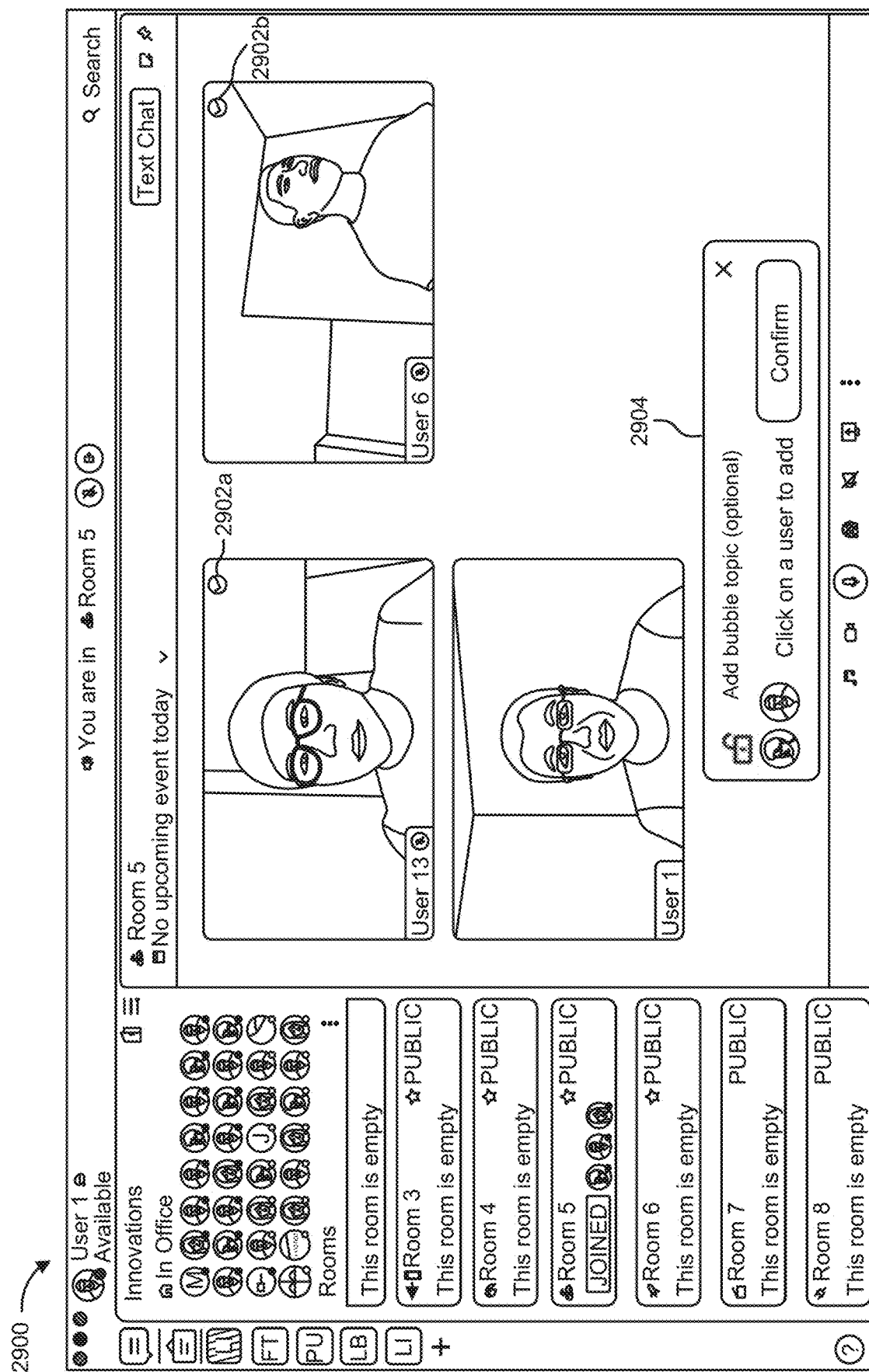
FIG. 29 shows another example user interface for facilitating communication in accordance with the present disclosure.

FIG. 29 illustrates a UI 2900 depicting the user associated with the thumbnail 1702c creating a bubble chat. The user can create a bubble chat on the same user interface depicting the real-time communication. The user may select one or more of the boxes 2902a-b to indicate which other users should be added to the bubble chat. If the user selects the box 2902a, the user indicates that he or she wants the user associated with the thumbnail 2002a added to the bubble. Likewise, if the user selects the box 2902b, the user indicates that he or she wants the user associated with the thumbnail 202b added to the bubble. After the user has selected the appropriate users to be added to the bubble, the user may assign a name and/or a topic to the bubble in the box 2904. The user can set the bubble either a locked or an unlocked state. If the user sets the bubble to a locked state, people outside the bubble need permission to enter the bubble. Conversely, of the user sets the bubble to an unlocked state (as indicated by the unlocked lock in the UI 2900), people outside of the bubble (and even users outside of the virtual room) can freely enter and leave the bubble without gaining permission to do so. After the user has added users to the bubble, named the bubble, and set the locked/unlocked state of the bubble, the user can confirm this and create the bubble by selecting the confirm button within the box 2904.

Figure 30:
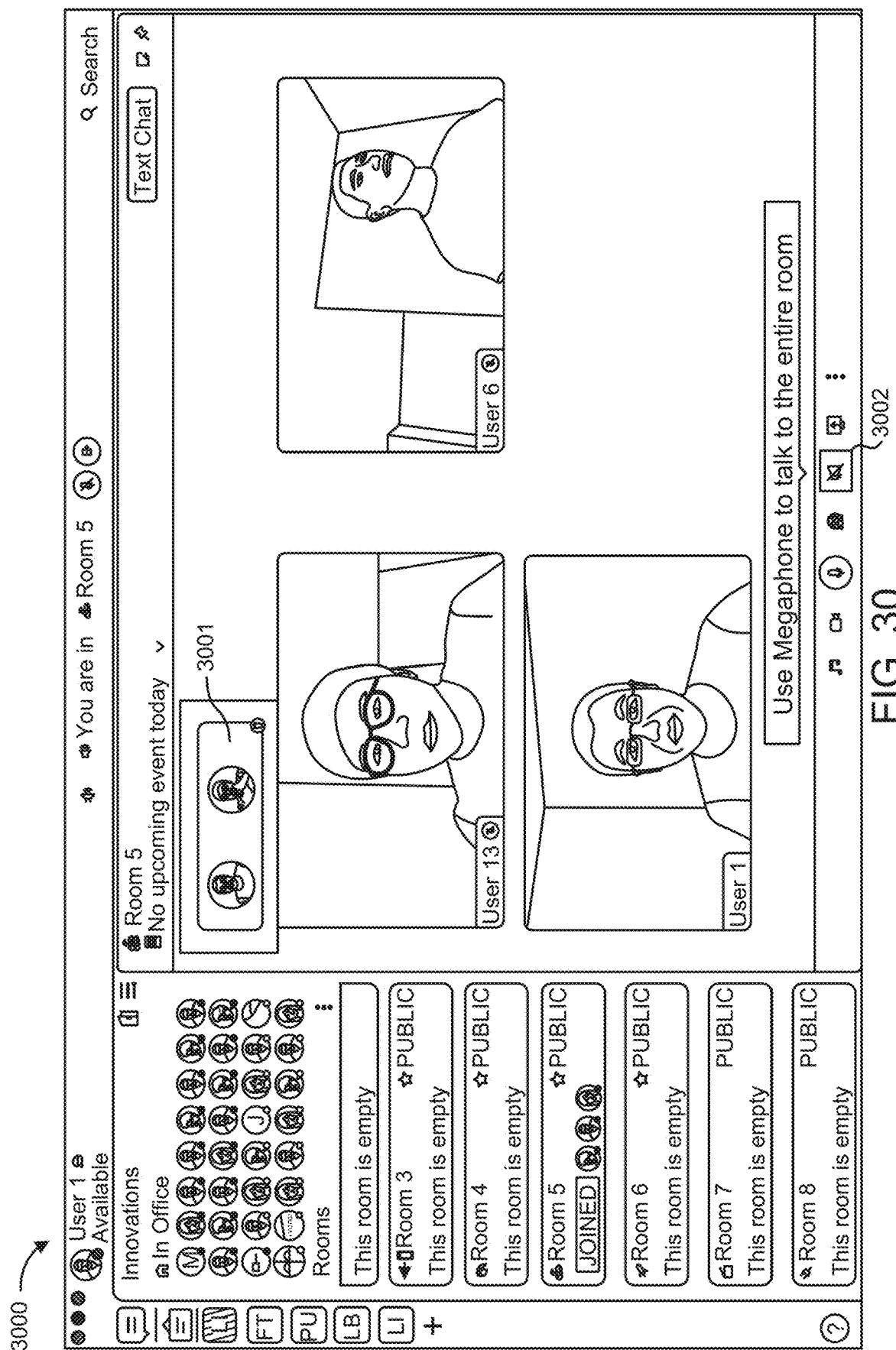
FIG. 30 shows another example user interface for facilitating communication in accordance with the present disclosure.

After the bubble is created, the users within the bubble may participate in real-time communication (video and/or audio chat) with one another. One or more of the users that have been invited to join the bubble may actually join the bubble. FIG. 30 illustrates a UI 3000 depicting a bubble chat 3001 occurring in a virtual room. Any of the three participants in the bubble chat 3001 can send and/or receive real-time voice communications to/from any of the other participants. Any of the three participants in the bubble chat 3001 can broadcast a real-time voice communication to other users in the virtual room (regardless of whether they are in the bubble chat 3001 or not) by selecting the button 3002. A participant in the bubble chat 3001 may want to broadcast to users in the virtual room, but not in the bubble-chat, for example, if the participants in the bubble chat begin discussing a topic that is important to or of interest to the users that are in the virtual room but not in the bubble-chat 3001. After the participant selects the button 3002 to broadcast, the participant may select the button 3002 again to stop broadcasting. For example, the participant may want to return to the private chat in the bubble chat 3001. In one example, a user with the authority in the virtual room can use the button 3002 to broadcast a real-time voice communication to all users in the virtual room. In another example, anyone in the virtual room, including those in any bubble chat, can use the button 3002 to broadcast a real-time voice communication to all users in the virtual room.

Figure 31:
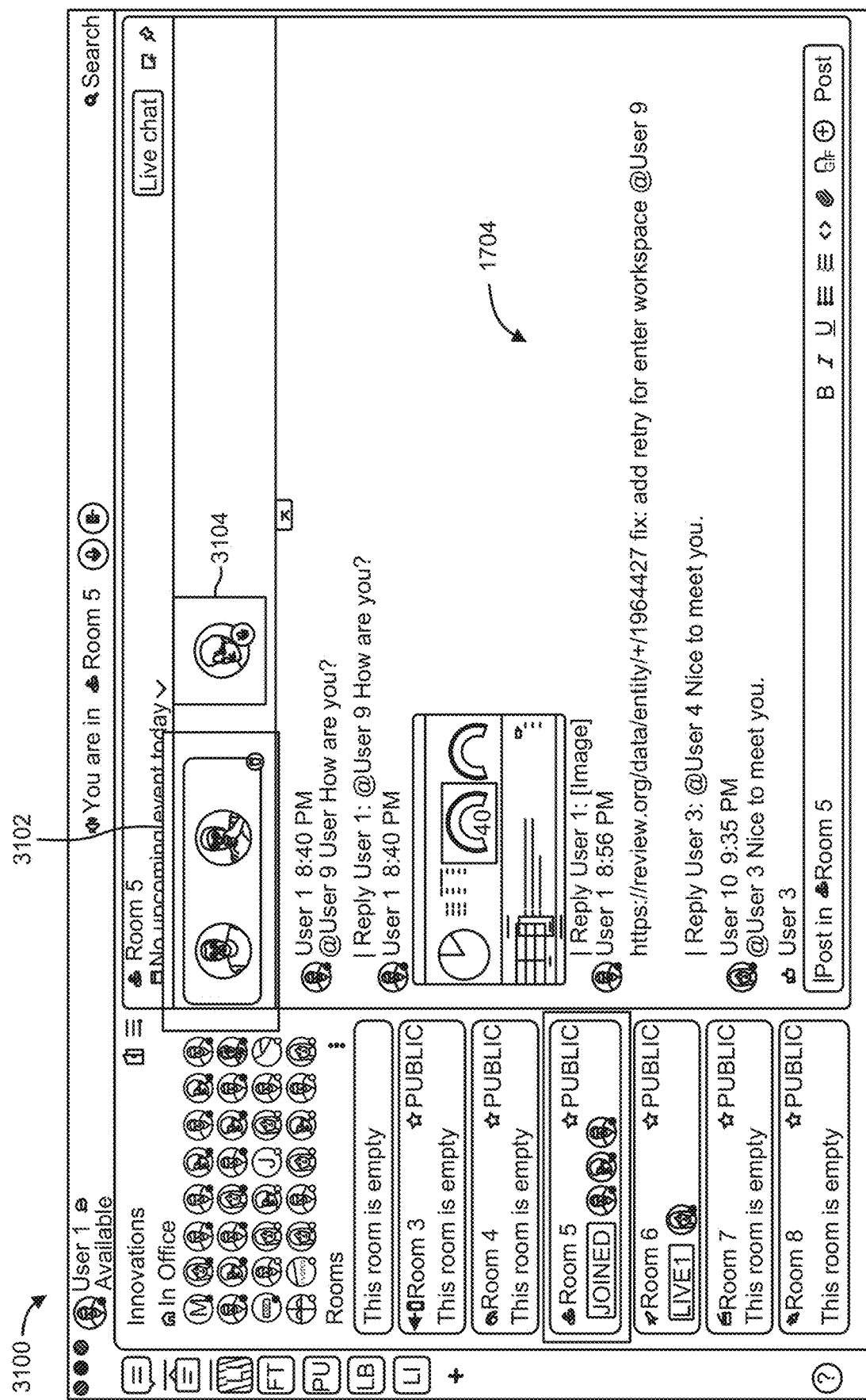
FIG. 31 shows another example user interface for facilitating communication in accordance with the present disclosure.

FIG. 31 illustrates a UI 3100 depicting a bubble chat occurring in a virtual room. A window 3102 associated with the bubble chat displays the users within the virtual room that are participating in the live bubble chat. The window 3104 indicates the users within the virtual room that are not participating in the live bubble chat. Any of the users (whether or not they are participating in the live bubble chat) may send messages to the text chat 1704 and/or view messages that are present in the text chat 1704.

The two users that are in the bubble chat may be communicating with each other via a first communication channel that is not accessible to the third user that is not in the bubble chat. For example, the two users that are in the bubble chat can hear and/or see each other during the real-time communication, but the third user cannot hear and/or see the other two users in the bubble chat. Meanwhile, because all three users remain in the same virtual room, all three users do still share a second communication channel (they are all able to communicate via the text chat 1704). The second communication channel is different than the first communication channel. The first communication channel is a sub-channel of the second communication channel.

Figure 32:
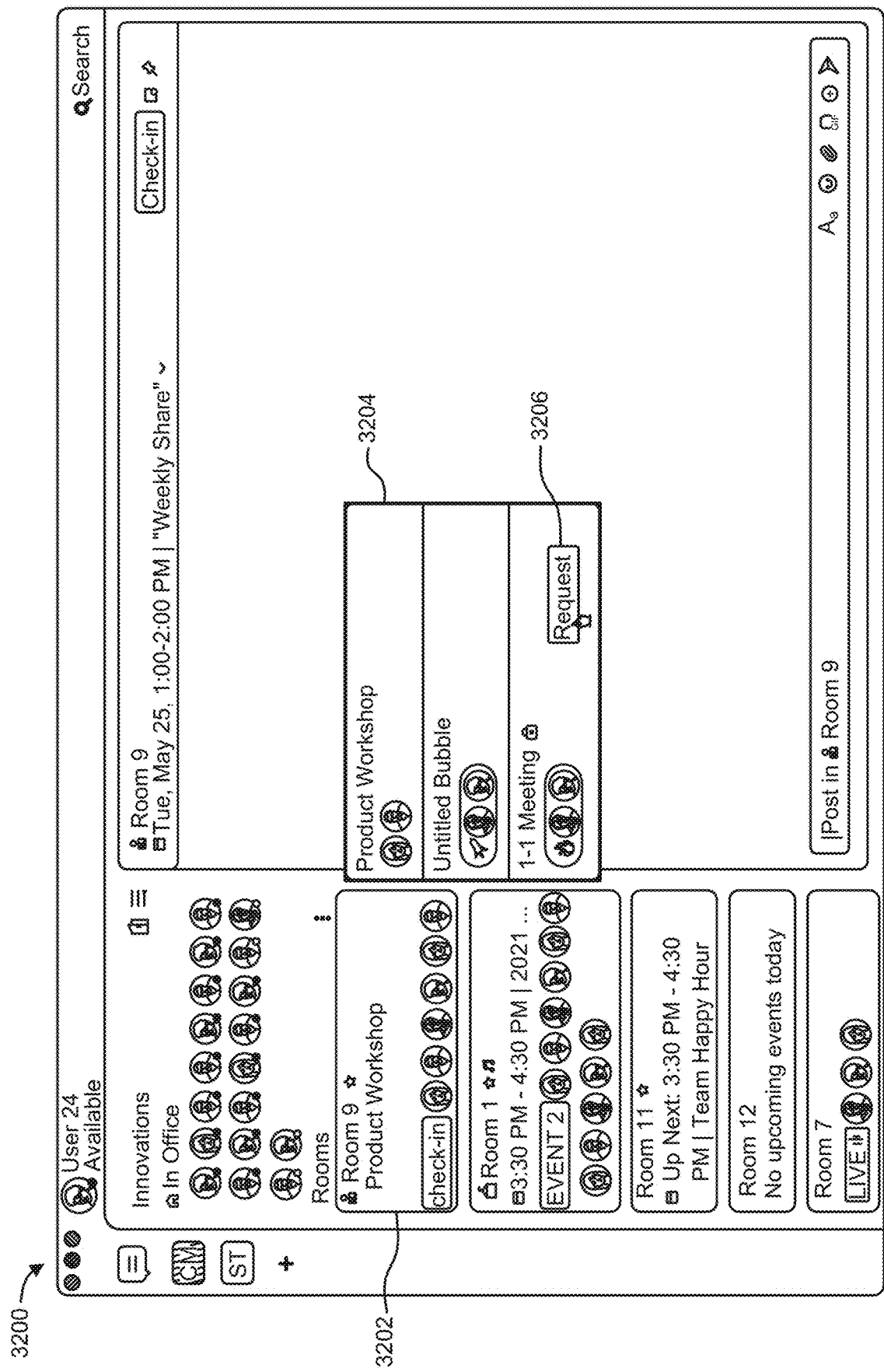
FIG. 32 shows another example user interface for facilitating communication in accordance with the present disclosure.

If a virtual room includes at least one bubble chat, the at least one bubble chat may be indicated by the virtual room card associated with the virtual room. FIG. 32 shows a UI 3200 depicting a virtual room card 3202 associated with a virtual room entitled "Product Hunt." If a user hovers over the virtual room card 3202, a box 3204 may be displayed. The box 3204 indicates the bubble chats that currently exist within the virtual room entitled "Product Hunt." The user may be able to join one of the bubble chats directly from the UI 3200. For example, the user can request to join the bubble chat entitled "1-on-1 meeting" by selecting a button 3206. The user may need to request to join bubble chats that are private (e.g., locked), while the user may be able to join public (e.g., unlocked) bubble chats without first requesting permission to do so.

In an embodiment, a first user on a team may want to initiate a real-time communication with a second user on the team. The first and second user may not have a scheduled real-time communication (e.g., the first and second users may not have a scheduled meeting). However, the first user may not be aware of the second user's availability, or the first user may be unsure as to whether the second user wants to participate in the real-time communication. Because a real-time communication is not scheduled, there is a chance that the second user is busy, in another real-time communication, or not interested in a real-time communication with the first user at this time.

Traditionally, such a scenario may have resulted in a game of "phone tag," in which the first user calls the second user and leaves a voicemail. The second user may eventually call the first user back, but then the first user may be unavailable, etc. This is inefficient and does not facilitate effective communication between the first and second user. The communication system 112 enables more efficient and effective communication between the first and second user by enabling the first user to "shoulder tap" the second user. A shoulder tap is a request, from the first user to the second user, to participate in a real-time communication.

The second user may see the shoulder tap, and may either accept, deny, or ignore the shoulder tap. If the second user accepts the shoulder tap, a communication channel between the second user and the first user may be initiated. Conversely, if the second user denies the shoulder tap, a communication channel between the second user and the first user may not be initiated. The first user may be notified that the second user has denied the shoulder tap. If the second user ignores the shoulder tap, the second user can accept or deny the shoulder tap at a later time. Alternatively, the shoulder tap may expire after a predetermined amount of time or if the first user eventually becomes unavailable.

Figure 33:
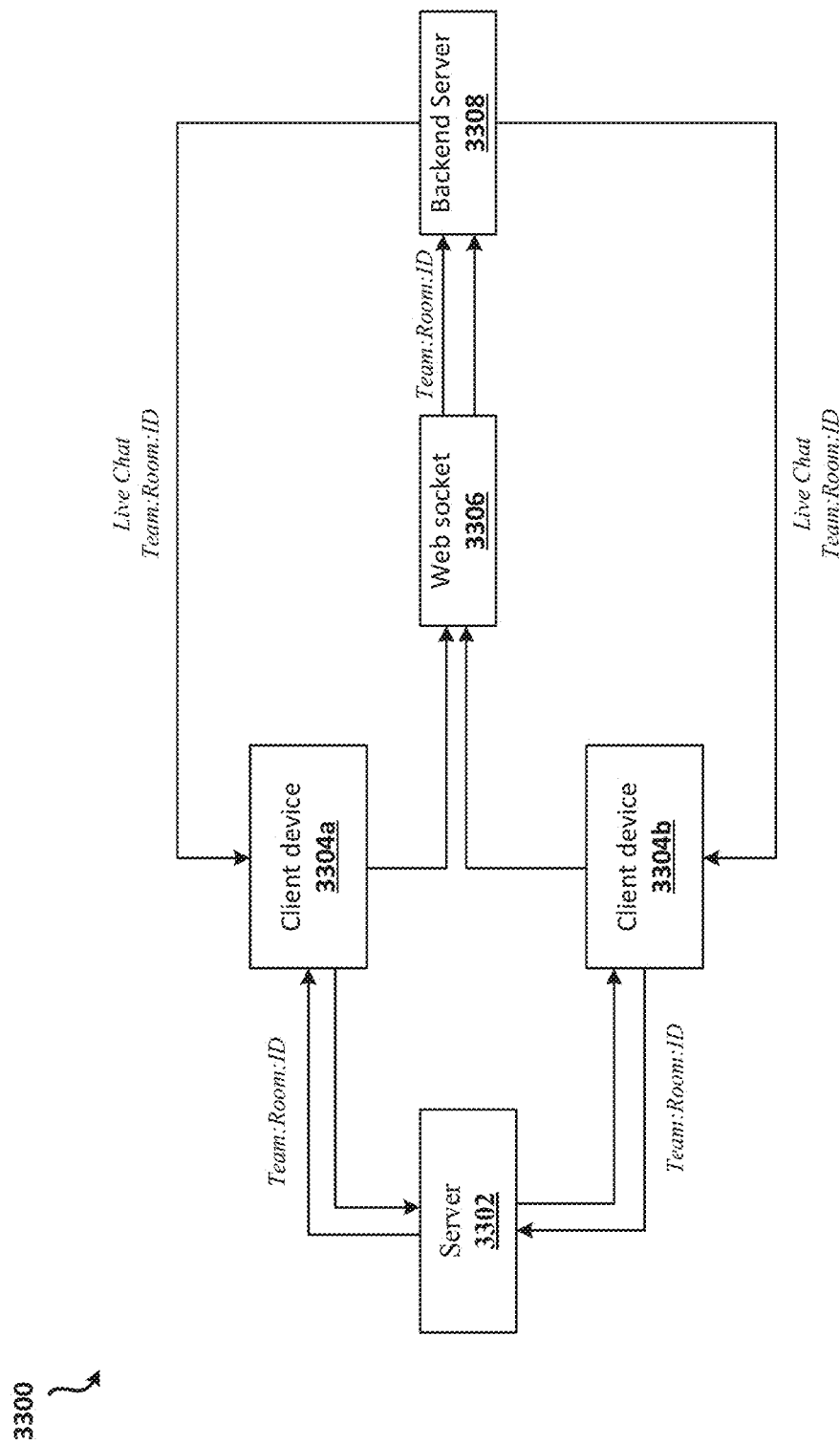
FIG. 33 shows an example system for facilitating communication in accordance with the present disclosure.

FIG. 33 is a system block diagram 3300 depicting two users of a communication service (e.g., communication service 112) being connected to a communication channel associated with a shoulder tap. As discussed above, each of the users of the communication service may be associated with (e.g., belong to, be assigned to) one or more teams (e.g., offices). A team may comprise a group of users of the communication service that share one or more common features and/or frequently communicate with each other regarding one or more topics. For example, a team may comprise a group of co-workers assigned to the same project. The co-workers may need to frequently communicate with each other regarding the project. A particular user may belong to more than one team. Such a user may be able to connect to each of the teams that the user belongs to. In an embodiment, a user may be able to connect to only one team at a time.

Each team may comprise one or more virtual rooms (e.g., groups, etc.). Each virtual room may be associated with a particular topic of conversation or a particular type of conversation. For example, if a team is associated with a group of co-workers, each virtual room in the team may be associated with a different project or conversational topic related to that group of co-workers. A user that is connected to a team may join a virtual room associated with that team if that virtual room is associated with a project/conversational topic of interest. A user may join (e.g., become connected to) one virtual room at a time, or multiple virtual rooms at a time. At any given time, zero, one, or multiple users that belong to a team may be present in any given virtual room. A user that is connected to a virtual room may join a bubble within that virtual room. When a user joins a bubble within the virtual room, the user may communicate with other users that are also in the bubble. Users that are in the virtual room, but not in the bubble, may not be able to participate in such communication.

Two user devices 3304a-b may send a request, to a server 3308, to join a particular virtual room. The two user devices 3304a-b may both be associated with users associated with a particular team. That team may be associated with that virtual room that the users want to join. The server 3308 may receive the requests. In response to receiving the requests, the server 3308 may, in response to receiving the request, prepare an identification number and/or a token associated with that particular virtual room within that particular team. The server 3308 may send the identification number and/or token back to the user devices 3304a-b. The user devices 3304a-b may utilize such identification number(s) or tokens to connect to the virtual room.

For example, the user devices 3304a-b may send, to a server 3302, the identification number and/or token. The server 3302 may utilize the identification number and/or token to connect the two user devices 3304a-b to the virtual room. For example, a web socket 3306 may receive, from each of the user devices 3304a-b, a web socket request. The web socket requests may comprise the identification number and/or token associated with that particular virtual room within that particular team. The web socket 3306 may, in response to receiving the web socket requests, send back to each of the user devices 3304a-b a web socket response. In this manner, the user devices 3304*a-b* may both be connected to the server 3302 associated with the communication service.

The web socket 3306 may forward, to the server 3302, the identification number and/or token associated with that particular virtual room within that particular team. In response, the server 3302 may initiate a communication channel associated with that virtual room. The user devices 3304*a-b* may utilize the communication channel to communicate with one another, such as in real-time or non-real time (and any other users already connected to that communication channel within that virtual room).

One of user devices 3304*a-b* may send, to the backend server 3308, a request to initiate a shoulder tap with the other user. For example, the user device 3304*a* may send a request to initiate a shoulder tap with the other user device 3304*b*. The user device 3304*a* may send such a request if the user associated with the user device 3304*a* wants to communicate with the user associated with the user device 3304*b* but does not want the other users within the virtual room to participate in the communication and/or does not have a scheduled meeting with the user associated with the user device 3304*b*. It should be appreciated that in other embodiments, the two users do not need to be in the same virtual room as each other to shoulder tap each other.

The other user device 3304*b* may send an indication that the user associated with the user device 3304*b* has accepted the shoulder tap. In response to receiving the acceptance, the backend server 3308 may prepare an identification number and/or a token associated with a communication channel for the shoulder tap. The server 3308 may send the identification number and/or token back to the user devices 3304*a-b*. The user devices 3304*a-b* may utilize such identification number (s) or tokens to connect to the sub-communication channel within the virtual room. For example, the user devices 3304*a-b* may send, to the server 3302, the identification number and/or token to connect to the communication channel for the shoulder tap. The server 3302 may utilize the identification number and/or token to connect the two user devices 3304*a-b* to the communication channel for the shoulder tap. The user devices 3304*a-b* may utilize the communication channel to communicate with one another (such as for the expected amount of time).

FIG. 34 illustrates an example process 3400 for facilitating communication, which may be performed by a communication service (e.g., communication service 112) in accordance with the present disclosure. For example, the process 3400 may be utilized to facilitate a collaborative and/or a group-based communication environment. Although depicted as a sequence of operations in FIG. 34, those of ordinary skill in the art will appreciate that various embodiments may add, remove, reorder, or modify the depicted operations.

As discussed above, the users of the communication service may be associated with a status. The status may indicate the availability of the users. For example, other users may see the status of a particular user and may gain an understanding of that user's availability. Status information indicating availability of each of a plurality of users to communicate with another in a plurality of users may be provided.

A user's status may indicate that they are available, idle/away, busy, or do not want to be disturbed. Each user may set his or her own status. Additionally, or alternatively, the user's status may be automatically determined/adjusted, such as after a particular period of time. In an embodiment, in addition to indicating whether a user is available, idle/ away, busy, or does not want to be disturbed, the user's status may indicate a period of time for which that status is applicable. For example, a user's status may indicate that they are busy for the next two hours, or a user's status may indicate that they are available for the next 20 minutes, etc. Each user may adjust this time period manually. Additionally, or alternatively, this time period may be automatically determined/populated based on, for example, a calendar associated with the user.

In an embodiment, in addition to indicating whether a user is available, idle/away, busy, or does not want to be disturbed, the user's status may indicate a location associated with that user. As discussed above, a user may be in a virtual room. For example, a user may be in a virtual room associated with a particular project. That user's status may indicate that they are available to communicate and that they are in that virtual room. Likewise, a user's status may indicate that they are in a meeting in a particular virtual room, etc. Other users may see this location indication and may use it to initiate communication with that user.

A first user may want to initiate a shoulder tap with a second user. For example, a first user may, upon viewing the status information associated with the second user, see that the second user is available to communicate with another in the plurality of users, such as for a certain period of time. The first user may not have a meeting scheduled with the second user but may nevertheless need or want to communicate with the second user. Accordingly, the first user may initiate a shoulder tap by sending a request. At 3402, a request may be received from a first client computing device associated with a first user in the plurality of users. The request may be a request to establish a communication (e.g., a shoulder tap) with a second user in the plurality of users.

The request may specify information associated with the communication. In an embodiment, the request specifies an expected communication time length. The first user may indicate an expected communication time associated with the shoulder tap. The expected communication time may be the amount of time that the first user anticipates/estimates that the communication with the second user should take. For example, if the first user only needs to ask the second user a quick question, then the expected communication time may be relatively short (e.g., 5 minutes). Conversely, if the first user needs to have a more in-depth conversation with the second user, the expected communication time may be longer (e.g., 30 minutes or more). The expected communication time may be any amount of time. The expected communication time may be utilized by the second user in determining whether or not to accept the shoulder tap. For example, the second user may be okay with a brief chat but may not feel up to/may not have time to have a long conversation with the first user.

In an embodiment, the request specifies a purpose for the communication. purpose for the real-time communication. For example, the first user may select/indicate that the first user wants to ask the second user a quick question, wants to provide the second user with a brief update, wants to simply chat with the second user, or any other reason. The purpose for the communication may be selected from a predefined set of reasons. Optionally, the first user may leave any other notes that the first user wants to leave, such as notes that the second user may utilize when determining whether or not to accept the shoulder tap.

After the first user has finished providing the information associated with the shoulder tap, the first user may send the shoulder tap to the second user. The second user may receive the request. At 3406, data may be generated and transmitted to a second client computing device associated with the second user for display of a user interface on the second client computing device. The user interface may indicate an invite of communication from the first user. The user interface may include one or more of information about the first user, the expected communication time length, the purpose for the communication, and/or selectable interface elements (e.g., buttons) for accepting or declining the invite.

The second user may view, via the user interface, the indication of the invite of communication. The second user may utilize the information included on the user interface to determine whether or not to accept the request. For example, the second user may choose to accept or decline the invitation based on one of more of information about the first user, the expected communication time length, and/or the purpose for the communication.

If the second user decides to accept the invitation, the second user may select the selectable interface element for accepting the invitation. Conversely, if the second user decides to decline the invitation, the second user may select the selectable interface element for declining the invitation. Alternatively, the second user may choose to ignore the invitation. At a later time, the second user may decide to accept or decline the invitation. Alternatively, the invitation may expire after a predetermined amount of time and/or if the first user becomes no longer available to communicate.

If the second user accepts the request, then a communication channel may be established between the first user and the second user. At 3408, in response to receiving an indication of acceptance by the second user, a communication channel may be established between the first user and the second user. The first user and the second user may communicate via real-time video and/or audio. The first and second user may continue the real-time communication, such as for the expected communication time. At least part of the communication may be related to the purpose for the communication.

Figure 35:
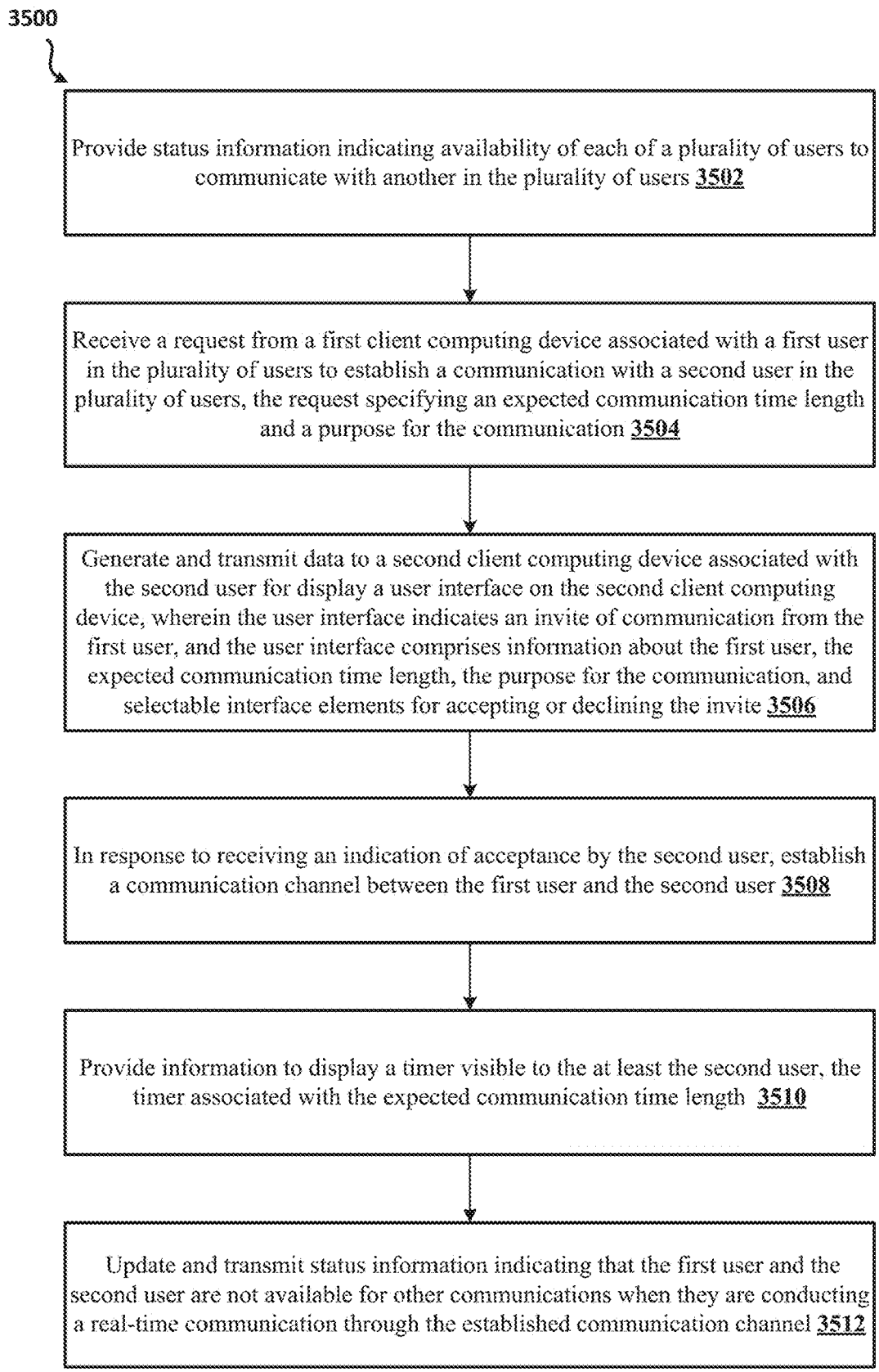
FIG. 35 shows an example process for facilitating communication, which may be performed by a communication system in accordance with the present disclosure.

FIG. 35 illustrates an example process 3500 for facilitating communication, which may be performed by a communication service (e.g., communication service 112) in accordance with the present disclosure. For example, the process 3500 may be utilized to facilitate a collaborative and/or a group-based communication environment. Although depicted as a sequence of operations in FIG. 35, those of ordinary skill in the art will appreciate that various embodiments may add, remove, reorder, or modify the depicted operations.

As discussed above, the users of the communication service may be associated with a status. The status may indicate the availability of the users. For example, other users may see the status of a particular user and may gain an understanding of that user's availability. At 3502, status information indicating availability of each of a plurality of users to communicate with another in a plurality of users may be provided.

A user's status may indicate that they are available, idle/away, busy, or do not want to be disturbed. Each user may set his or her own status. Additionally, or alternatively, the user's status may be automatically determined/adjusted, such as after a particular period of time. In an embodiment, in addition to indicating whether a user is available, idle/away, busy, or does not want to be disturbed, the user's status may indicate a period of time for which that status is applicable. For example, a user's status may indicate that they are busy for the next two hours, or a user's status may indicate that they are available for the next 20 minutes, etc. Each user may adjust this time period manually. Additionally, or alternatively, this time period may be automatically determined/populated based on, for example, a calendar associated with the user.

In an embodiment, in addition to indicating whether a user is available, idle/away, busy, or does not want to be disturbed, the user's status may indicate a location associated with that user. As discussed above, a user may be in a virtual room. For example, a user may be in a virtual room associated with a particular project. That user's status may indicate that they are available to communicate and that they are in that virtual room. Likewise, a user's status may indicate that they are in a meeting in a particular virtual room, etc. Other users may see this location indication and may use it to initiate communication with that user.

A first user may want to initiate a shoulder tap with a second user. For example, a first user may, upon viewing the status information associated with the second user, see that the second user is available to communicate with another in the plurality of users, such as for a certain period of time. The first user may not have a meeting scheduled with the second user but may nevertheless need or want to communicate with the second user. Accordingly, the first user may initiate a shoulder tap by sending a request. At 3504, a request may be received from a first client computing device associated with a first user in the plurality of users. The request may be a request to establish a communication (e.g., a shoulder tap) with a second user in the plurality of users.

In an embodiment, the request specifies an expected communication time length. The first user may indicate an expected communication time associated with the shoulder tap. The expected communication time may be the amount of time that the first user anticipates/estimates that the communication with the second user should take. For example, if the first user only needs to ask the second user a quick question, then the expected communication time may be relatively short (e.g., 5 minutes). Conversely, if the first user needs to have a more in-depth conversation with the second user, the expected communication time may be longer (e.g., 30 minutes or more). The expected communication time may be any amount of time. The expected communication time may be utilized by the second user in determining whether or not to accept the shoulder tap. For example, the second user may be okay with a brief chat but may not feel up to/may not have time to have a long conversation with the first user.

In an embodiment, the request specifies a purpose for the communication. purpose for the real-time communication. For example, the first user may select/indicate that the first user wants to ask the second user a quick question, wants to provide the second user with a brief update, wants to simply chat with the second user, or any other reason. The purpose for the communication may be selected from a predefined set of reasons. Optionally, the first user may leave any other notes that the first user wants to leave, such as notes that the second user may utilize when determining whether or not to accept the shoulder tap.

After the first user has finished providing the information associated with the shoulder tap, the first user may send the shoulder tap to the second user. The second user may receive the request. At 3506, data may be generated and transmitted to a second client computing device associated with the second user for display of a user interface on the second client computing device. The user interface may indicate an invite of communication from the first user. The user interface may include one or more of information about the first user, the expected communication time length, the purpose for the communication, and/or selectable interface elements (e.g., buttons) for accepting or declining the invite.

The second user may view, via the user interface, the indication of the invite of communication. The second user may utilize the information included on the user interface to determine whether or not to accept the request. For example, the second user may choose to accept or decline the invitation based on one of more of information about the first user, the expected communication time length, and/or the purpose for the communication.

If the second user decides to accept the invitation, the second user may select the selectable interface element for accepting the invitation. Conversely, if the second user decides to decline the invitation, the second user may select the selectable interface element for declining the invitation. Alternatively, the second user may choose to ignore the invitation. At a later time, the second user may decide to accept or decline the invitation. Alternatively, the invitation may expire after a predetermined amount of time and/or if the first user becomes no longer available to communicate.

If the second user accepts the request, then a communication channel may be established between the first user and the second user. At 3508, in response to receiving an indication of acceptance by the second user, a communication channel may be established between the first user and the second user. The first user and the second user may communicate via real-time video and/or audio. The first and second user may continue the real-time communication, such as for the expected communication time. At least part of the communication may be related to the purpose for the communication.

In an embodiment, during the communication, an indication on an interface of the first and/or second computing device may depict the time remaining in the real-time communication. At 3510, information may be provided to display a timer visible to the at least the second user. The timer may count down time from the expected communication time length. For example, if the expected communication time was fifteen minutes, and 39 seconds have elapsed, then the timer may depict that there are fourteen minutes and 21 seconds remaining in the real-time communication. Because the timer may be provided on the screens of both the first user and the second user, both users are aware of the remaining time in the real-time communication. If the users see that only a minute or a few seconds is remaining, the users may wrap up the real-time communication. In this manner, the real-time communication will not consume any more of the second user's time than the second user agreed to when the second user accepted the shoulder tap. In an embodiment, the communication channel may be automatically terminated when the expected communication time has elapsed. Alternatively, the communication channel may not be automatically terminated, and the two users may be free to continue the real-time communication despite the time elapsing.

In an embodiment, during the communication, other users may be made aware that the first and second user are unavailable for other communication. At 3512, status information indicating that the first user and the second user are not available for other communications may be updated and transmitted when they are conducting a real-time communication through the established communication channel. The status information may be updated again to reflect that the users are now available when the real-time communication through the established communication channel is terminated.

FIG. 36 illustrates an example process 3600 for facilitating communication, which may be performed by a communication service (e.g., communication service 112) in accordance with the present disclosure. For example, the process 3600 may be utilized to facilitate a collaborative and/or a group-based communication environment. Although depicted as a sequence of operations in FIG. 36, those of ordinary skill in the art will appreciate that various embodiments may add, remove, reorder, or modify the depicted operations.

As discussed above, the users of the communication service may be associated with a status. The status may indicate the availability of the users. For example, other users may see the status of a particular user and may gain an understanding of that user's availability. At 3602, status information indicating availability of each of a plurality of users to communicate with another in a plurality of users may be provided.

A user's status may indicate that they are available, idle/away, busy, or do not want to be disturbed. Each user may set his or her own status. Additionally, or alternatively, the user's status may be automatically determined/adjusted, such as after a particular period of time. In an embodiment, in addition to indicating whether a user is available, idle/away, busy, or does not want to be disturbed, the user's status may indicate a period of time for which that status is applicable. For example, a user's status may indicate that they are busy for the next two hours, or a user's status may indicate that they are available for the next 20 minutes, etc. Each user may adjust this time period manually. Additionally, or alternatively, this time period may be automatically determined/populated based on, for example, a calendar associated with the user.

In an embodiment, in addition to indicating whether a user is available, idle/away, busy, or does not want to be disturbed, the user's status may indicate a location associated with that user. As discussed above, a user may be in a virtual room. For example, a user may be in a virtual room associated with a particular project. That user's status may indicate that they are available to communicate and that they are in that virtual room. Likewise, a user's status may indicate that they are in a meeting in a particular virtual room, etc. Other users may see this location indication and may use it to initiate communication with that user.

A first user may want to initiate a shoulder tap with a second user. For example, a first user may, upon viewing the status information associated with the second user, see that the second user is available to communicate with another in the plurality of users, such as for a certain period of time. The first user may not have a meeting scheduled with the second user but may nevertheless need or want to communicate with the second user. Accordingly, the first user may initiate a shoulder tap by sending a request. At 3604, a request may be received from a first client computing device associated with a first user in the plurality of users. The request may be a request to establish a communication (e.g., a shoulder tap) with a second user in the plurality of users.

In an embodiment, the request specifies an expected communication time length. The first user may indicate an expected communication time associated with the shoulder tap. The expected communication time may be the amount of time that the first user anticipates/estimates that the communication with the second user should take. For example, if the first user only needs to ask the second user a quick question, then the expected communication time may be relatively short (e.g., 5 minutes). Conversely, if the first user needs to have a more in-depth conversation with the second user, the expected communication time may be longer (e.g., 30 minutes or more). The expected communication time may be any amount of time. The expected communication time may be utilized by the second user in determining whether or not to accept the shoulder tap. For example, the second user may be okay with a brief chat but may not feel up to/may not have time to have a long conversation with the first user.

In an embodiment, the request specifies a purpose for the communication. purpose for the real-time communication. For example, the first user may select/indicate that the first user wants to ask the second user a quick question, wants to provide the second user with a brief update, wants to simply chat with the second user, or any other reason. The purpose for the communication may be selected from a predefined set of reasons. Optionally, the first user may leave any other notes that the first user wants to leave, such as notes that the second user may utilize when determining whether or not to accept the shoulder tap.

After the first user has finished providing the information associated with the shoulder tap, the first user may send the shoulder tap to the second user. The second user may receive the request. At 3606, data may be generated and transmitted to a second client computing device associated with the second user for display of a user interface on the second client computing device. The user interface may indicate an invite of communication from the first user. The user interface may include one or more of information about the first user, the expected communication time length, the purpose for the communication, and/or selectable interface elements (e.g., buttons) for accepting or declining the invite.

The second user may view, via the user interface, the indication of the invite of communication. The second user may utilize the information included on the user interface to determine whether or not to accept the request. For example, the second user may choose to accept or decline the invitation based on one of more of information about the first user, the expected communication time length, and/or the purpose for the communication.

If the second user decides to accept the invitation, the second user may select the selectable interface element for accepting the invitation. Conversely, if the second user decides to decline the invitation, the second user may select the selectable interface element for declining the invitation. Alternatively, the second user may choose to ignore the invitation. At a later time, the second user may decide to accept or decline the invitation. Alternatively, the invitation may expire after a predetermined amount of time and/or if the first user becomes no longer available to communicate.

In an embodiment, the second user may be able to indicate a type of communication that the second user wants to engage in with the first user. At 3608, information indicative of a communicable state may be received from the second computing device associated with the second user. The indication of the communicable state may comprise an indication of at least one form of communication accepted by the second user. For example, the at least one form of communication may include at least one of live audio, video, or text messaging.

If the second user accepts the request, then a communication channel may be established between the first user and the second user. At 3610, a communication channel may be established between the first user and the second user in response to receiving an indication of acceptance and the information indicative of the communicable state from the second user. The communication channel may comprise at least one web-socket. The first user and the second user may communicate via real-time video and/or audio. The first and second user may continue the real-time communication, such as for the expected communication time. At least part of the communication may be related to the purpose for the communication.

Figure 37:
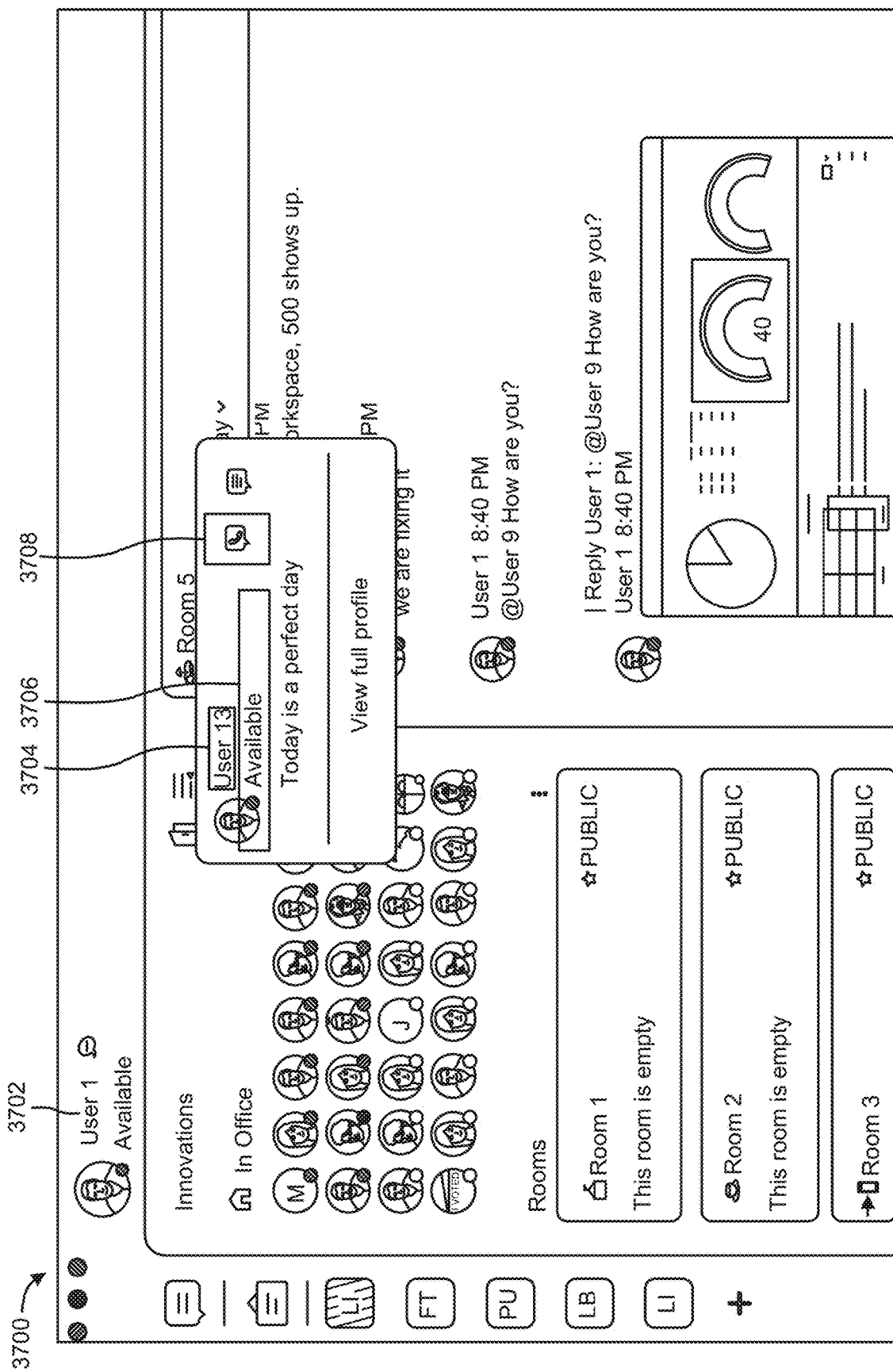
FIG. 37 shows another example user interface for facilitating communication in accordance with the present disclosure.

FIG. 37 illustrates a UI 3700 depicting a shoulder tap being initiated. The user 3702 may want to initiate a real-time communication with a second user 3704. The first user 3702 and the second user 3704 may be associated with the same team. The first user 3702 and the second user 3704 may not have a scheduled real-time communication (e.g., the first and second users may not have a scheduled meeting). Because a real-time communication is not scheduled, there is a chance that the second user 3704 is busy, in another real-time communication, or not interested in a real-time communication with the first user 3702 at this time.

The first user 3702 may view a status 3706 associated with the second user 3704. For example, the first user 3702 may hover his or her mouse over the icon/profile picture associated with the second user 3704 in order to view a contact card associated with the second user 3704. The contact card may indicate the status 3706 associated with the second user 3704. The first user 3703 may utilize the status 3706 in determining whether or not to initiate a shoulder tap with the second user 3704. For example, if the first user 3702 sees that the second user 3704 is busy or unavailable, the first user 3702 may decide not to initiate a shoulder tap at this time, at the shoulder tap is likely to be denied and/or ignored by the second user 3704. Conversely, if the first user 3702 sees that the second user 3704 is available, the second user 3704 may decide to initiate the shoulder tap. To initiate the shoulder tap, the first user 3702 may select the button 3708 on the contact card.

Figure 38:
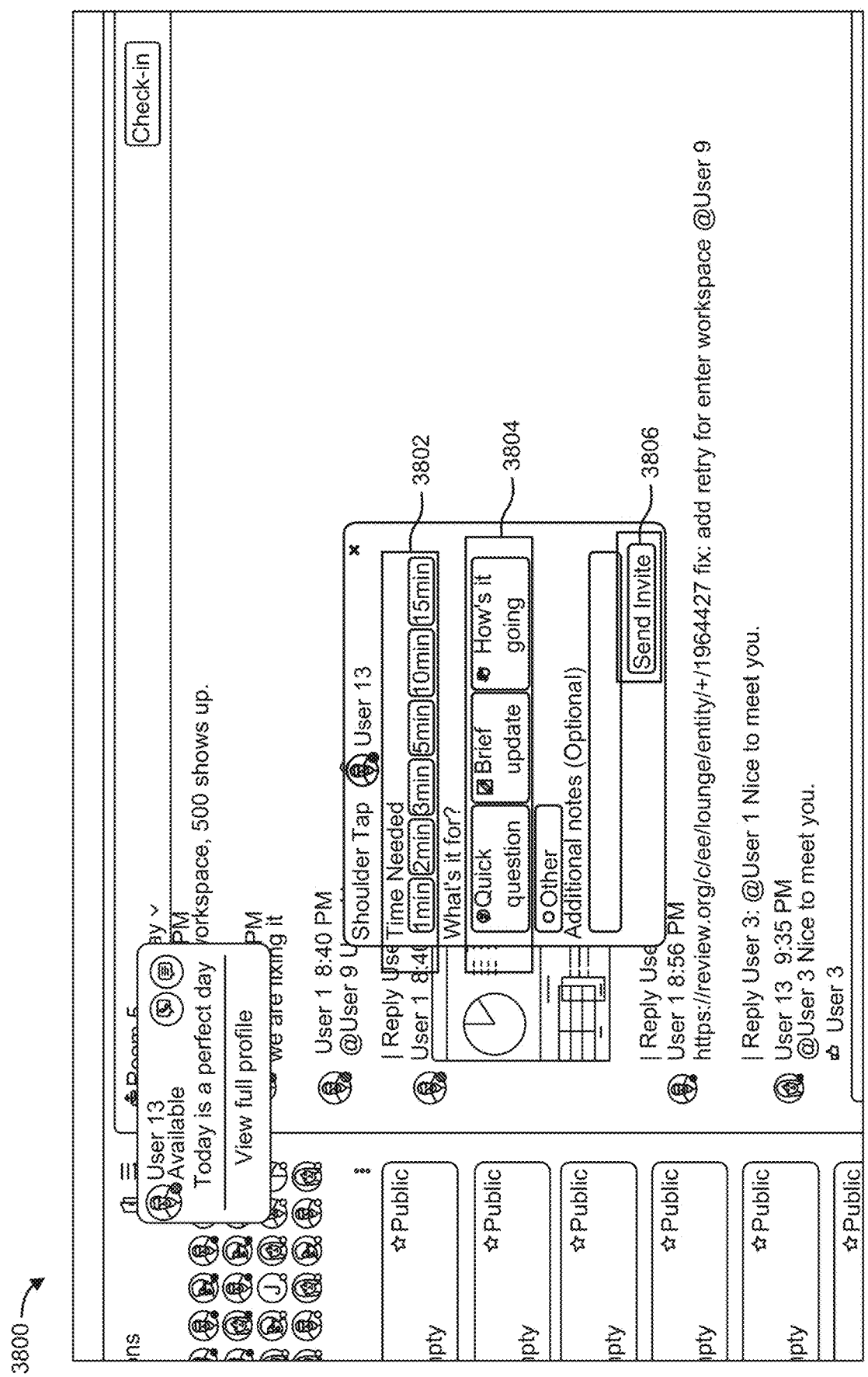
FIG. 38 shows another example user interface for facilitating communication in accordance with the present disclosure.

After the first user 3702 selects the button 3704, the first user 3702 may provide information associated with the shoulder tap. FIG. 38 illustrates a UI 3800 depicting information associated with a shoulder tap being populated. The first user 3702 may indicate an expected communication time associated with the shoulder tap. For example, the first user 3702 may indicate in a box 3802, an expected communication time associated with the shoulder tap. The expected communication time may be the amount of time that the first user 3702 anticipates/estimates that the communication with the second user 3704 should take. For example, if the first user 3702 only needs to ask the second user 3704 a quick question, then the expected communication time may be relatively short (e.g., 5 minutes). Conversely, if the first user 3702 needs to have a more in-depth conversation with the second user 3704, the expected communication time may be longer (e.g., 38 minutes or more). The expected communication time may be any amount of time. The expected communication time may be utilized by the second user 3704 in determining whether or not to accept the shoulder tap. For example, the second user 3704 may be okay with a brief chat but may not feel up to/may not have time to have a long conversation with the first user 3702.

The first user 3702 may additionally, or alternatively, indicate in a box 3806, a purpose for the real-time communication. For example, the first user 3702 may indicate in the box 3804, that the first user 3702 wants to ask the second user 3704 a quick question, wants to provide the second user 3704 with a brief update, wants to simply chat with the second user 3704, or any other reason. Optionally, the first user 3702 may leave any other notes that the first user 3702 wants to leave, such as notes that the second user 3704 may utilize when determining whether or not to accept the shoulder tap.

Figure 39:
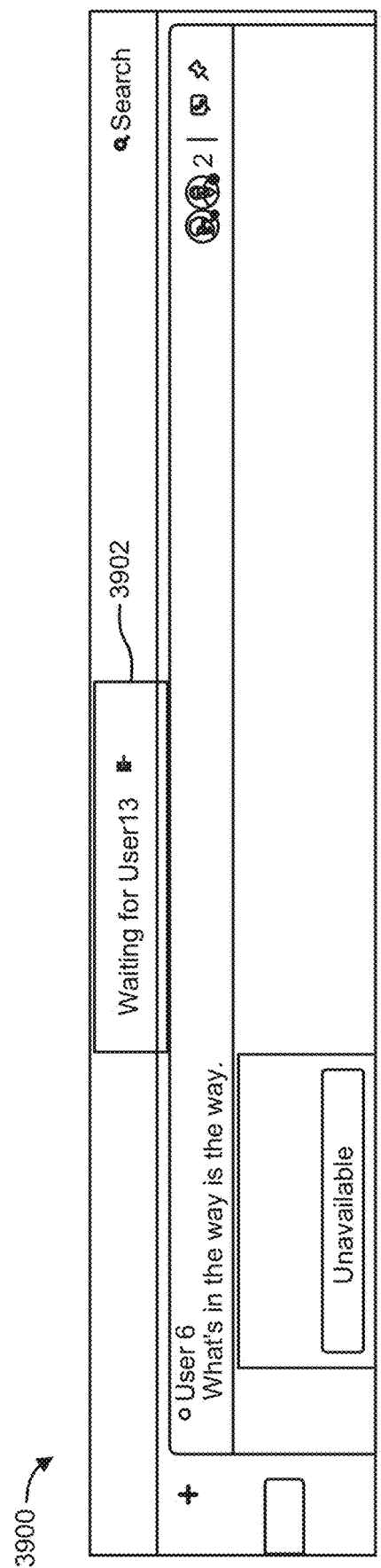
FIG. 39 shows another example user interface for facilitating communication in accordance with the present disclosure.

After the first user 3702 has finished providing the information associated with the shoulder tap, the first user 3702 may send the shoulder tap to the second user 3704 by selecting the button 3806. The second user 3704 may receive the request. The first user 3702 may wait on a response from the second user 3704. FIG. 39 illustrates a UI 3900 depicting an indication 3902 that the first user 3702 may see when waiting on a response from the second user 3704.

Figure 40:
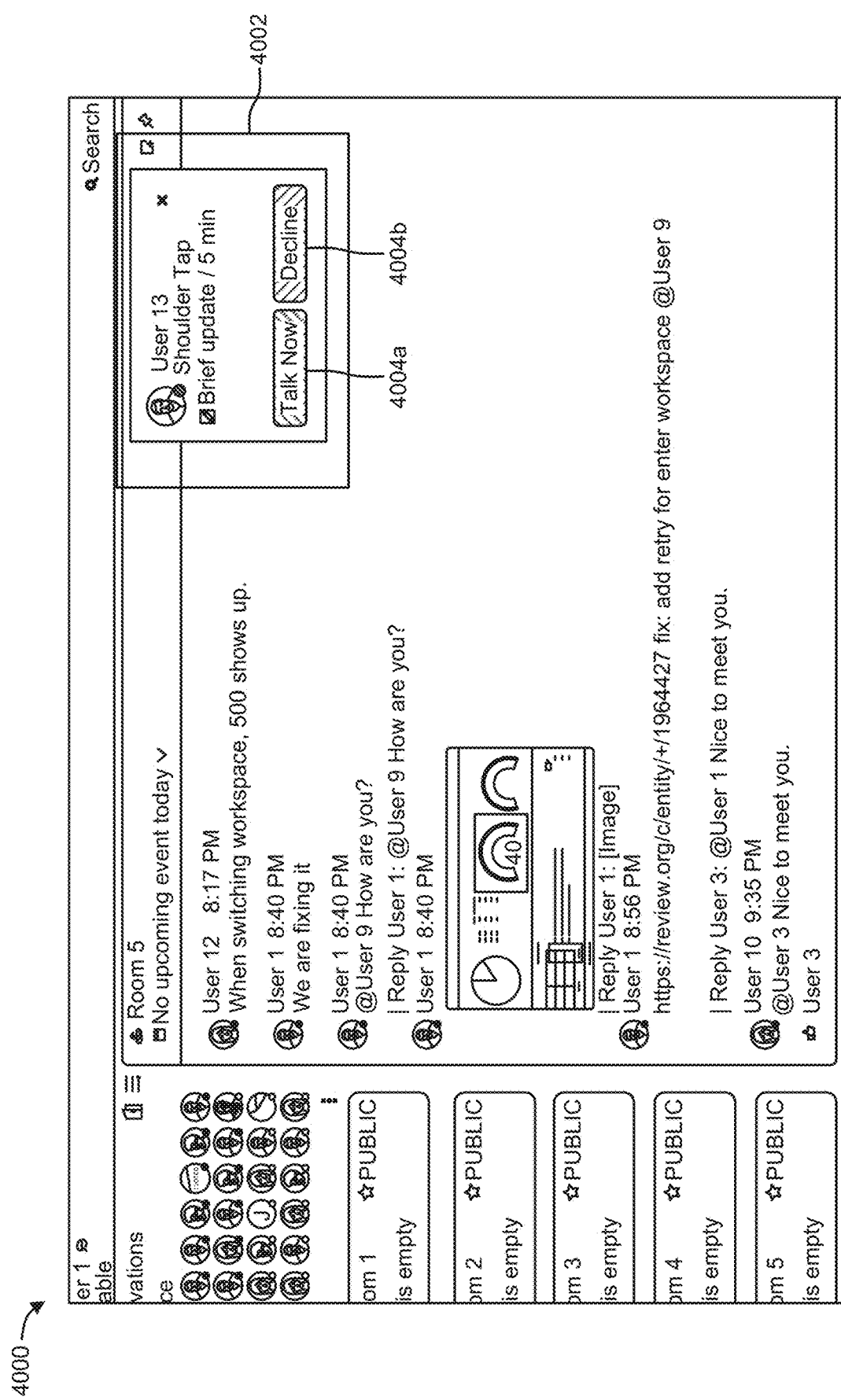
FIG. 40 shows another example user interface for facilitating communication in accordance with the present disclosure.

Meanwhile, the second user 3704 may see an indication of the request. FIG. 40 illustrates a UI 4000 depicting an indication 4002 of the request from the first user 3702. The indication 4002 of the request may depict the expected communication time associated with the request. The indication 4002 of the request may additionally, or alternatively, depict the reason/topic of conversation associated with the request. The second user 3704 may utilize this information to determine whether or not to accept the request. If the second user 3704 decides to accept the request, the second user 3704 may select the button 4004*a*. Conversely, if the second user 3704 decides to deny the request, the second user 3704 may select the button 4004*b*. Alternatively, the second user 3704 may choose to ignore the request. At a later time, the second user 3704 may decide to accept or deny the request. Alternatively, the request may expire after a predetermined amount of time and/or if the first user 3702 is no longer available to communicate.

If the second user 3704 accepts the request (e.g., if the second user 3704 selects the button 4004*a*), then a communication channel may be established between the first user 3702 and the second user 3704. If the first user 3702 is currently checked in to a certain virtual room, and the first user 3702 initiates a shoulder tap to the second user 3704 and the second user 3704 accepts the request, the status of the first user 3702 may be replaced with a 1V1 live communication state.

Figure 41:
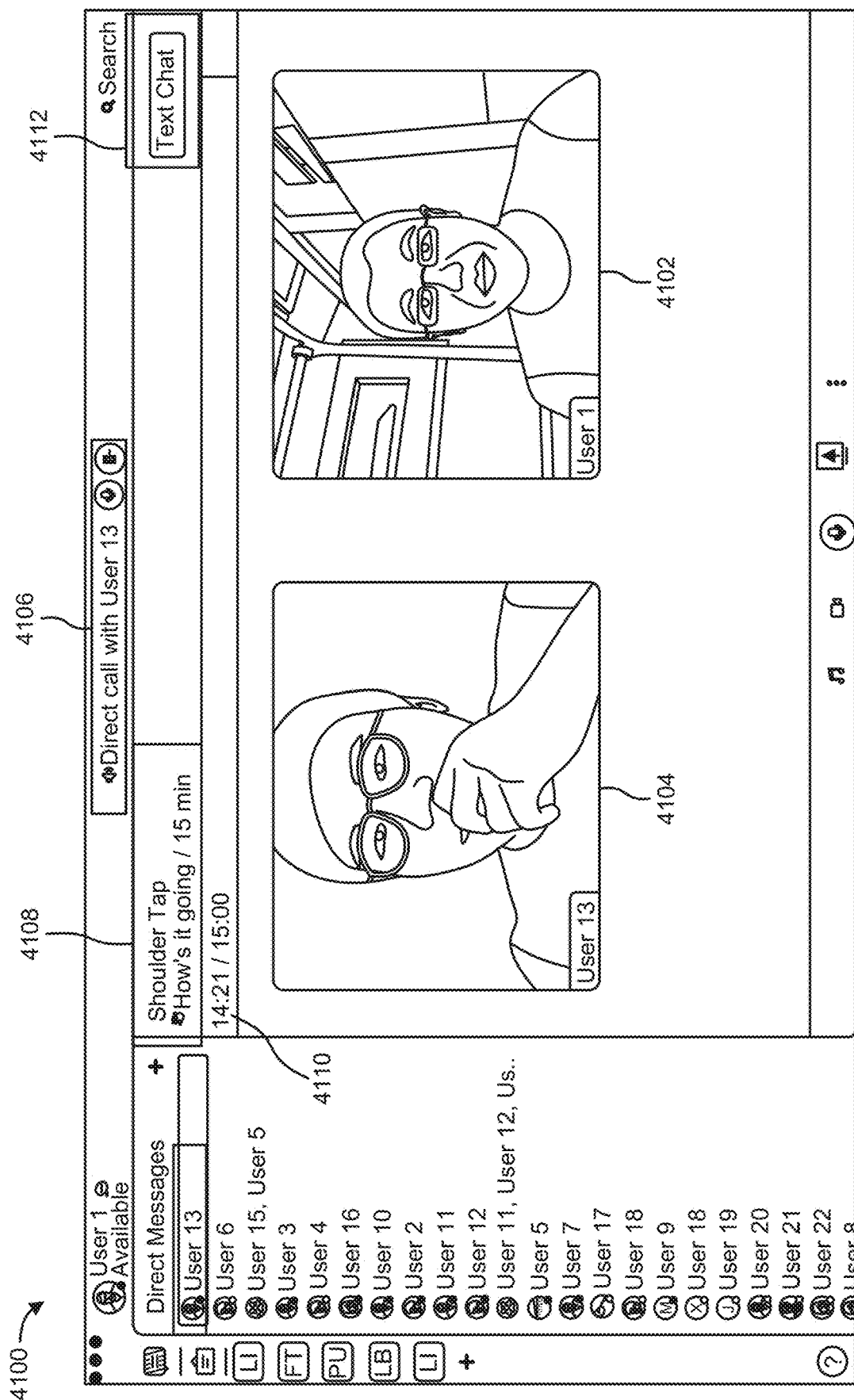
FIG. 41 shows another example user interface for facilitating communication in accordance with the present disclosure.

FIG. 41 depicts a real-time communication between the first user 3702 and the second user 3704 via the communication channel. A first live video thumbnail 4102 is associated with the first user 3702 and a second live video thumbnail 4104 is associated with the second user 3704. The first user 3702 and the second user 3704 may both be able to see both thumbnails 4102, 4104 on their respective devices. The first user 3702 and the second user 3704 may additionally, or alternatively, communicate via audio. A header 4106 at the top of the UI 4100 indicates that the two users are in a real-time communication with each other. A header 4108 indicates that the real-time communication is a shoulder-tap communication. Additionally, the header 4108 may indicate the expected communication time associated with the shoulder-tap and/or may indicate the reason for the shoulder tap.

An indication 4110 depicts the time remaining in the real-time communication. For example, if the expected communication time was fifteen minutes, and 39 seconds have elapsed, then the indication 4110 may depict that there are fourteen minutes and 21 seconds remaining in the real-time communication. Because the indication 4110 is provided on the screens of both the first user 3702 and the second user 3704, both users are aware of the remaining time in the real-time communication. If the users see that only a minute or a few seconds is remaining, the users may wrap up the real-time communication. In this manner, the real-time communication will not consume any more of the second user 3704's time than the second user 3704 agreed to when the second user 3704 accepted the shoulder tap. In an embodiment, the communication channel may be automatically terminated when the expected communication time has elapsed. Alternatively, the communication channel may not be automatically terminated, and the two users may be free to continue the real-time communication despite the time elapsing.

Figure 42:
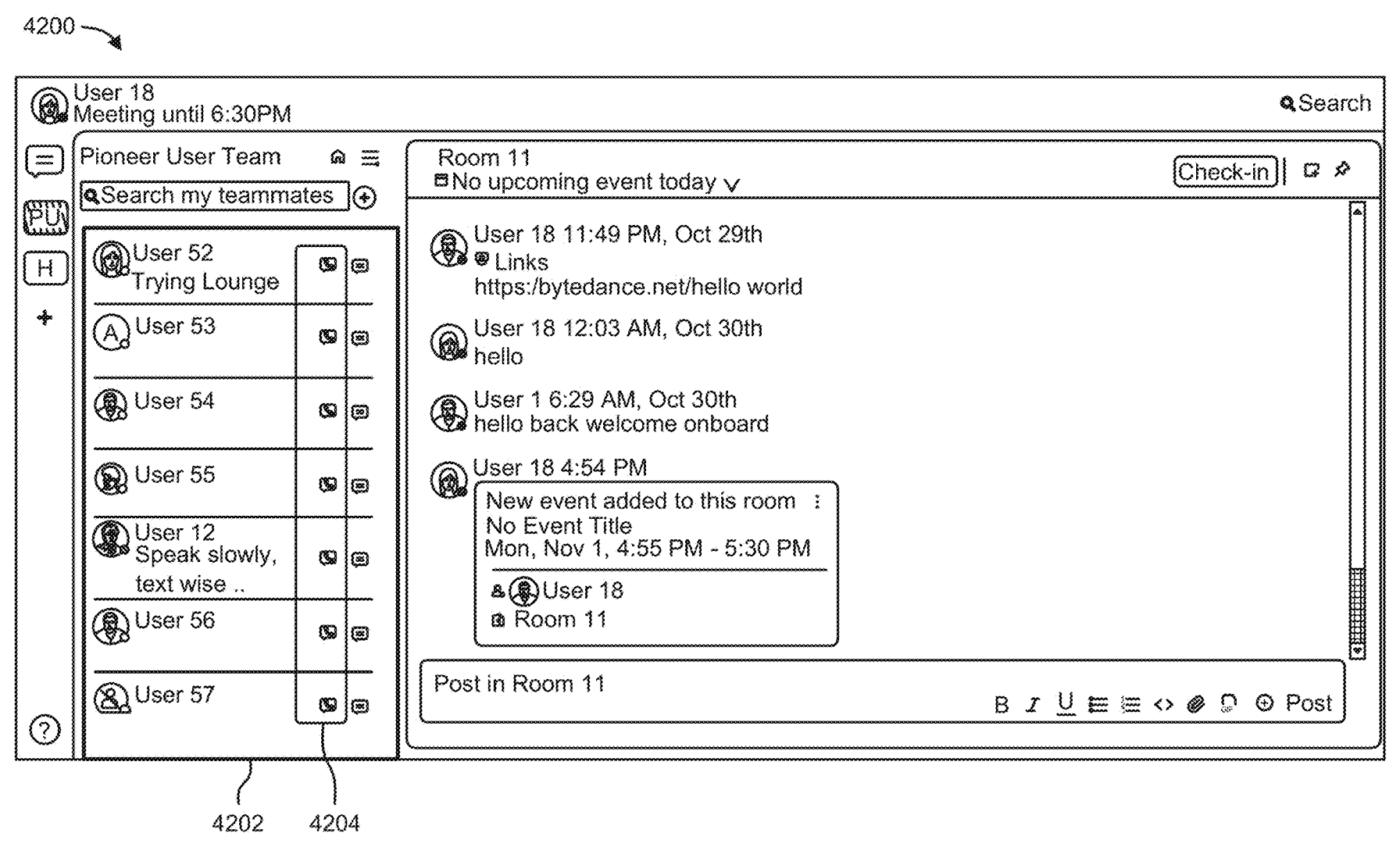
Figure 43:
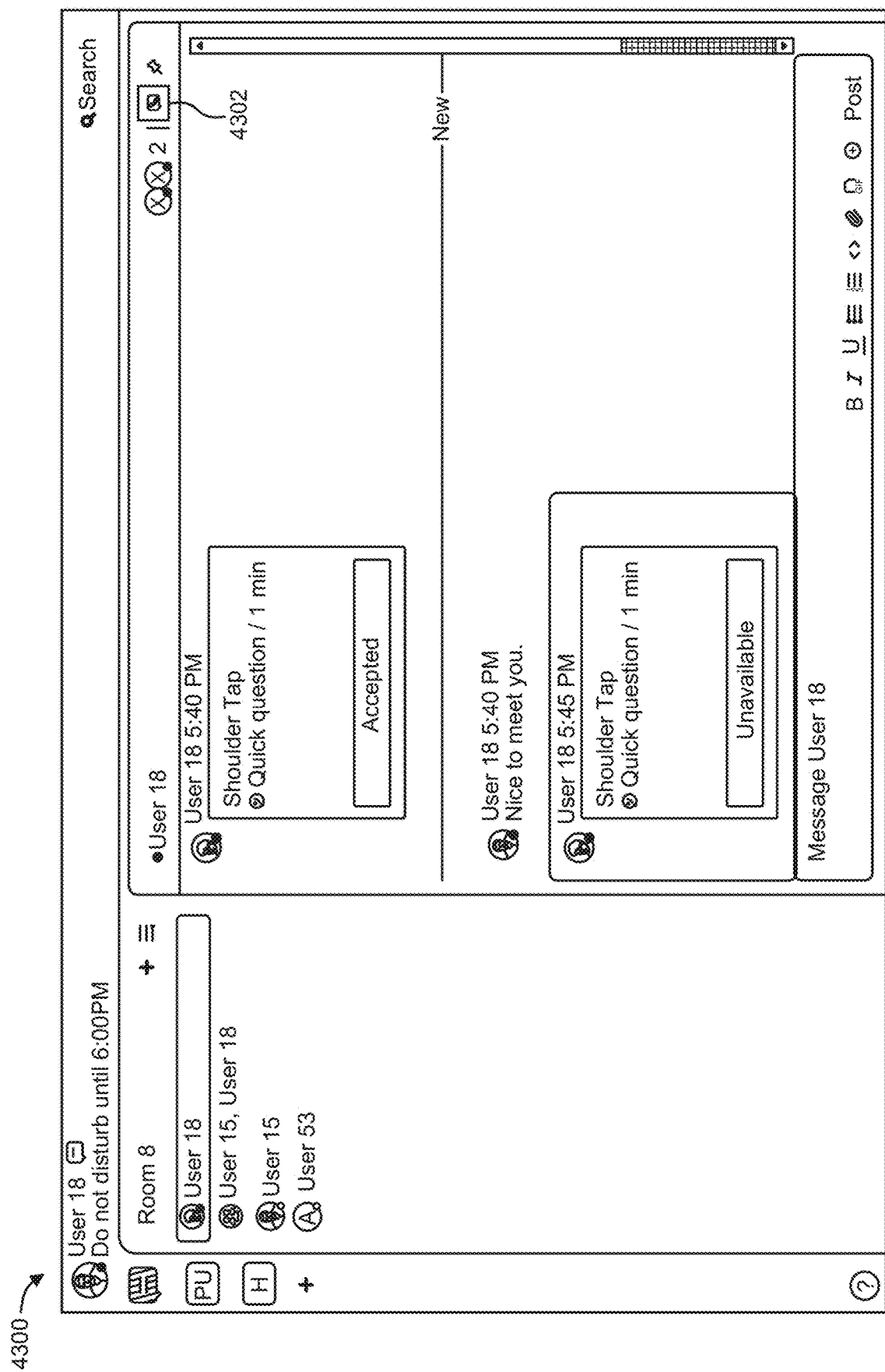
FIG. 43 shows another example user interface for facilitating communication in accordance with the present disclosure.

As described above, to initiate the shoulder tap, the first user 3702 may select the button 3708 on the contact card. In other embodiments, the first user 3702 may initiate the shoulder tap directly from a UI 4200 depicted in FIG. 42. The UI 4200 depicts, in a box 4202, a list of users that belong to a particular team. The box 4202 includes, next to each user in the list, an icon 4204. If the first user 3702 selects the icon 4204 next to a particular user, the first user 3702 can initiate a shoulder tap with that particular user. In other embodiments, the first user 3702 may initiate the shoulder tap directly from a UI 4300 depicted in FIG. 43. The UI 4300 depicts a direct message between the first user 3702 and the second user 3704. For example, the UI 4300 may be displayed on a user device of the first user 3702. If a different user tries to send a shoulder tap to the first user 3702 when the first user 3702 is in "do not disturb" status, the request for the shoulder tap may be automatically refused and the different user may receive a notification indicative of a failure of the request. The first user 3702 may receive a message informing him/her that someone has just sent him/her a shoulder tap. For example, an indication 4301 may be displayed on the UI 4300. The indication 4301 may inform the first user 3702 that someone has just sent him/her a shoulder tap when the first user 3702 is in "do not disturb" status. To initiate a shoulder tap with the second user 3704 from the direct message UI, the first user 3702 can select a button 4302 included on the UI 4300.

Figure 44:
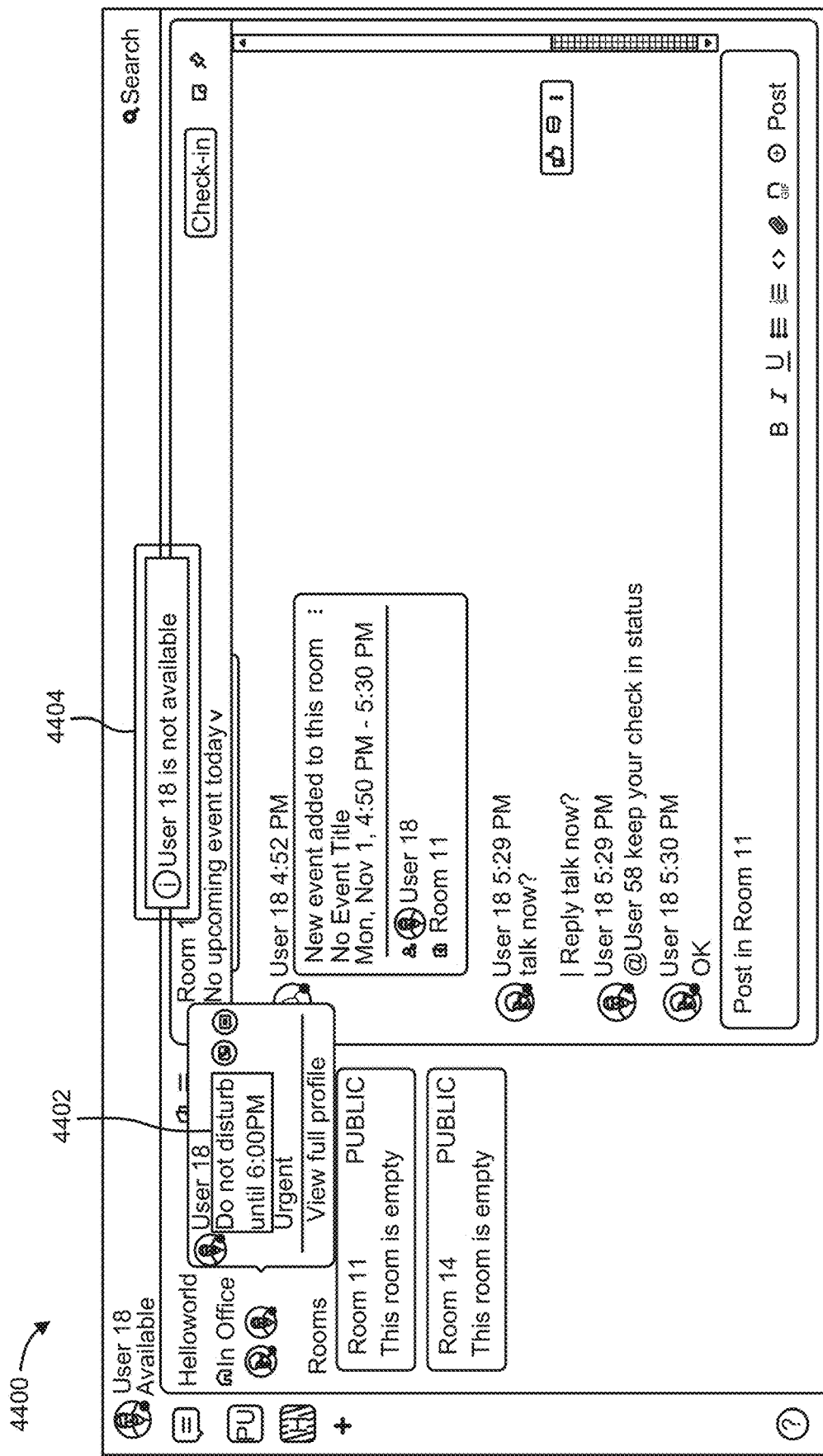
FIG. 44 shows another example user interface for facilitating communication in accordance with the present disclosure.

In embodiments, if the status of a recipient of a shoulder tap is "do not disturb," another user cannot send a shoulder tap to the recipient. For example, if the second user 3704 has a status of "do not disturb," the first user 3702 cannot send a shoulder tap to the recipient. FIG. 44 shows a UI 4400 depicting a notification 4404 indicating that the recipient of a shoulder tap has a status 4402 of "do not disturb." Because the recipient of the shoulder tap has a status of "do not disturb," another user cannot send a shoulder tap to the recipient.

Figure 45:
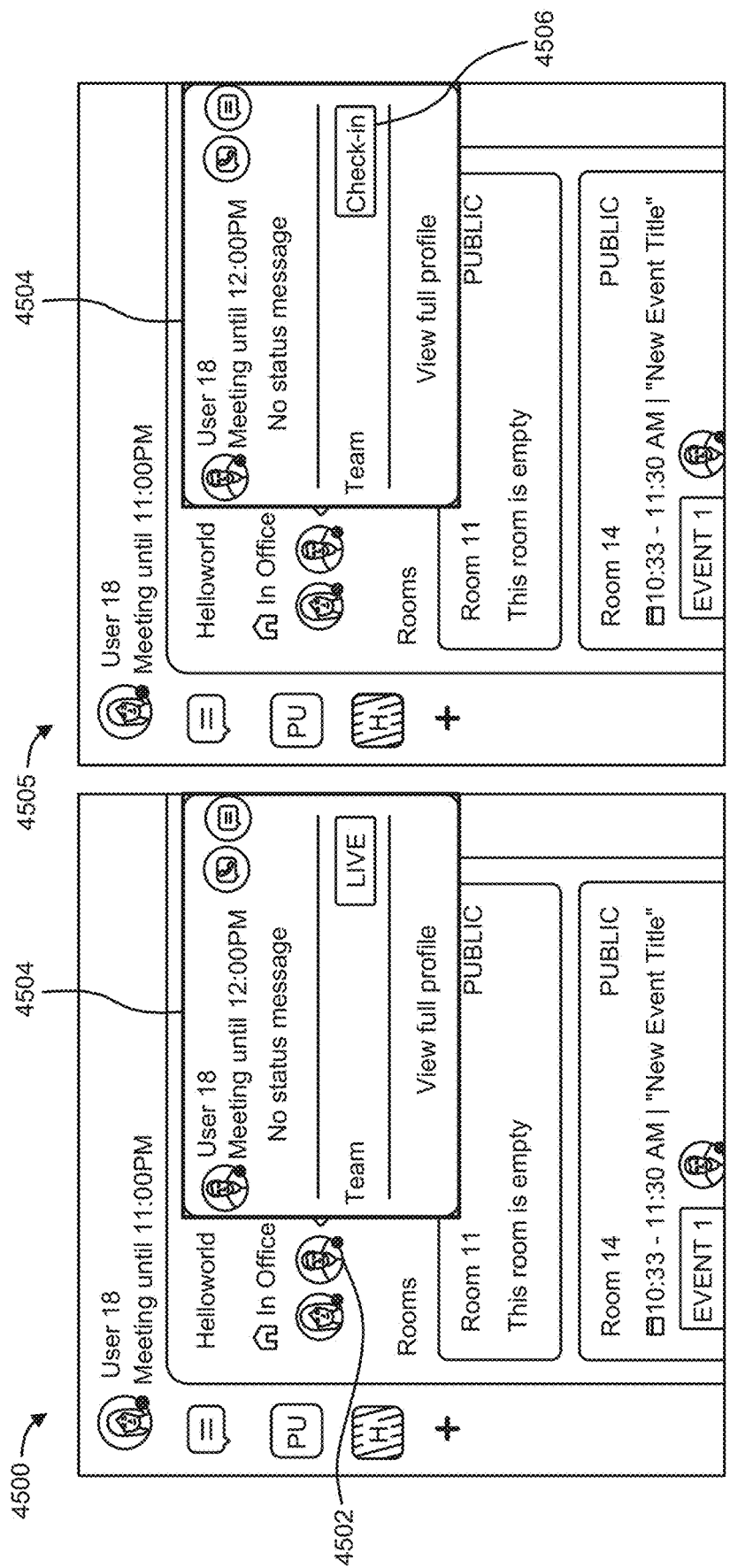
FIG. 45 shows another example user interface for facilitating communication in accordance with the present disclosure.

In embodiments, a first user can hover over and/or click a profile icon associated with a second user that is associated with the same team as the first user to see which virtual room the second user is in. FIG. 45 shows a UI 4500 depicting a profile icon 4502 associated with a second user. The first user can hover over or click the profile icon 4502 to see which virtual room the second user is in. The UI 4500 includes an indication 4504 that the second user is in a real-time (e.g., live) communication in the virtual room entitled "Team." If the first user hovers over or clicks on the indication 4504, the "live" icon will change to a "check in" button 4506 depicted in the UI 4505. The first user may select the check-in button 4506 to join or check-into the same virtual room that the first user is in. For example, the first user may select the check-in button 4506 to join or check-into the virtual room entitled "Team." In other embodiments, if the second user is participating in a bubble communication when the first user hovers over or clicks the profile icon 4502, the first user may select the "check in" button to enter the same bubble chat as the second user.

Figure 46:
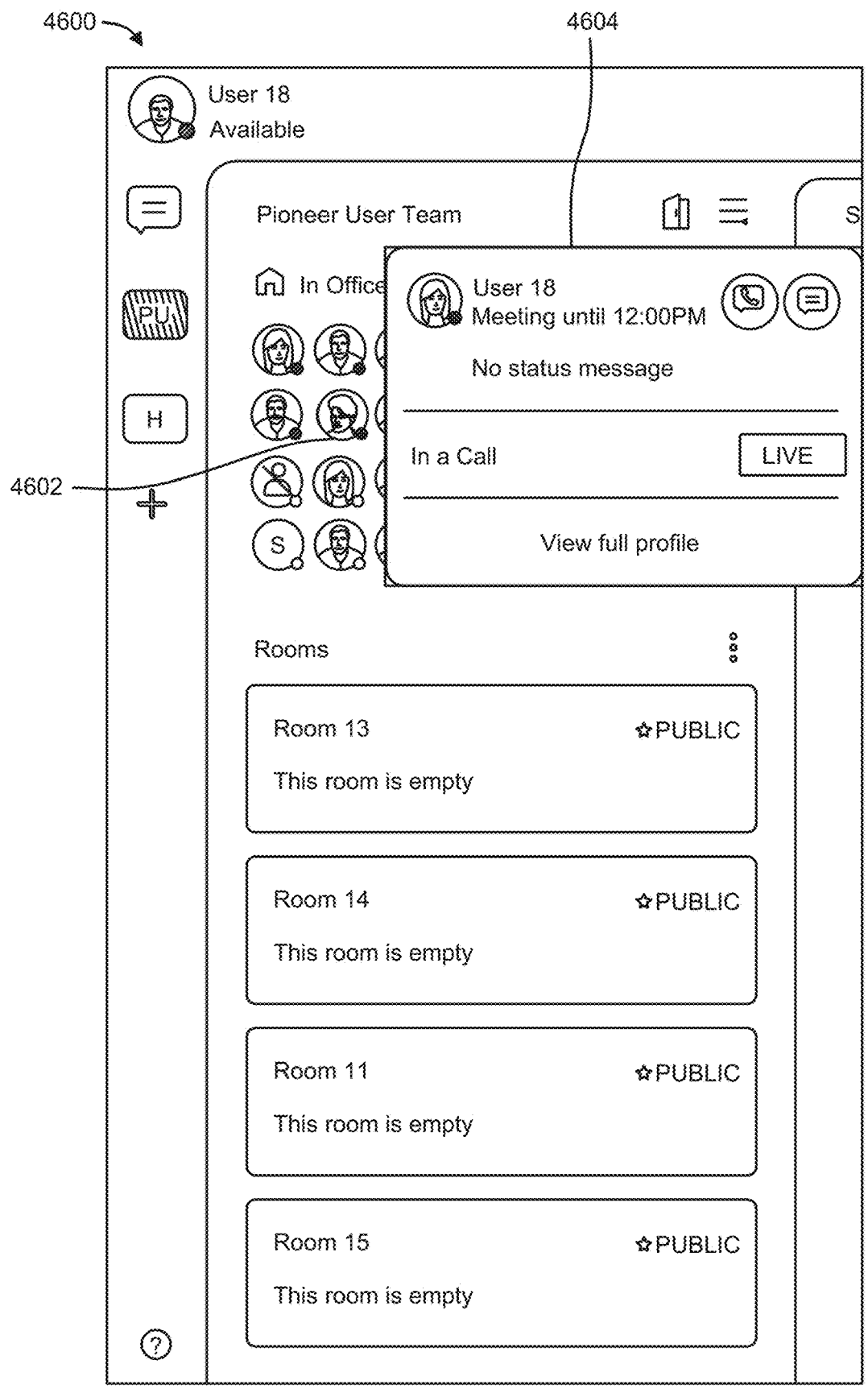
FIG. 46 shows another example user interface for facilitating communication in accordance with the present disclosure.

As discussed above, in embodiments, a first user can hover over and/or click a profile icon associated with a second user that is associated with the same team as the first user to see which virtual room the second user is in (and, if desired, join the same virtual room). However, if the first user and the second user are not connected to the same team at the same time, the first user may not be able to see which virtual room the second user is in. FIG. 46 shows a UI 4600 that depicts a profile icon 4602 associated with a second user. The first user can hover over or click the profile icon 4602. Because the first user is not currently connected to the same team as the second user, the first user may not be able to see which virtual room the second user is in. Instead, the UI 4600 includes an indication 4604 that is "in a call' instead of showing the name of the virtual room that the second user is in (such as is shown in FIG. 45). In embodiments, if the first user has permission to access the team that the second user is currently connected to, the first user may hover over or click on the "live" icon in the UI 4600, and the "live" icon will change to a "check in" icon. If the first user selects the "check in" icon, this may cause the first user to automatically become connected to the team that the second user is currently connected to and automatically become disconnected from the team that the first user previously was connected to. If the first user selects the "check-in" icon, this may automatically cause the first user to be checked in to the same room and/or bubble communication as the second user.

Figure 47:
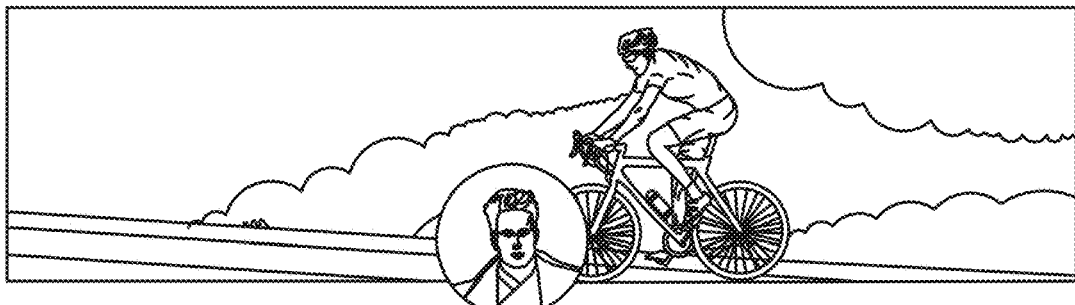
FIG. 47 shows another example user interface for facilitating communication in accordance with the present disclosure.

In an embodiment, each user of the communication service 112 or some users of the communication service 112 may each be associated with a profile. FIG. 47 illustrates a UI 4700 depicting a profile associated with a user of the communication service 112. For example, when an individual becomes a registered user of the communication service 112, the individual may provide, to the communication service 112, information associated with the individual. Some or all of this information may be used to generate and/or populate a profile associated with the individual. For example, the profile may indicate one or more of a name associated with the user, a profile and/or cover photo associated with the user, biographical information associated with the user, movies/books/television shows liked by and/or consumed by the user, photos/video posted by the user, and/or photos/videos including the user posted by other users. If the profile includes biographical information, the biographical information may indicate a hometown, current city, job title, and/or personality traits of the user.

The profile may include past work experiences associated with the user. In an embodiment, the profile includes links (e.g., links to documents, videos, photos) associated with past work experiences of the user. Other users of the communication service 112 may be able to view the user's profile and view the user's past work product. If the profile includes links associated with the past work experiences of the user, then the other users may be able to select (e.g., click on) those links to view the past work product of the user. The profile may include kudos from other users of the communication service 112. The kudos may indicate compliments from the other users, such as compliments regarding the user's work product or ethic.

As discussed above, existing communication tools focus simply on facilitating communication, but do not foster deep or meaningful relationships between the users of the communication tool. For example, existing communication tools may be utilized by co-workers to video conference and/or to chat. However, such existing communication tools do not provide the users with any insight into their co-workers—the users are not provided with insight regarding what their co-worker what they are working on, how busy their co-workers are, relevant past experiences of their co-workers, or personal details about their co-workers. Such tools that do not provide the users with any insight into their co-workers fail to foster integrated, tightly knit teams.

The users of the communication service 112 may be coworkers or colleagues. The profiles of the users of the communication service 112 may be viewable by the other users of the communication service 112. In this manner, the communication service 112 fosters deep and meaningful relationships between the users of the communication tool by providing insight into what each user is working on, relevant past work experiences of each user, and personal details about each user.

Figure 48:
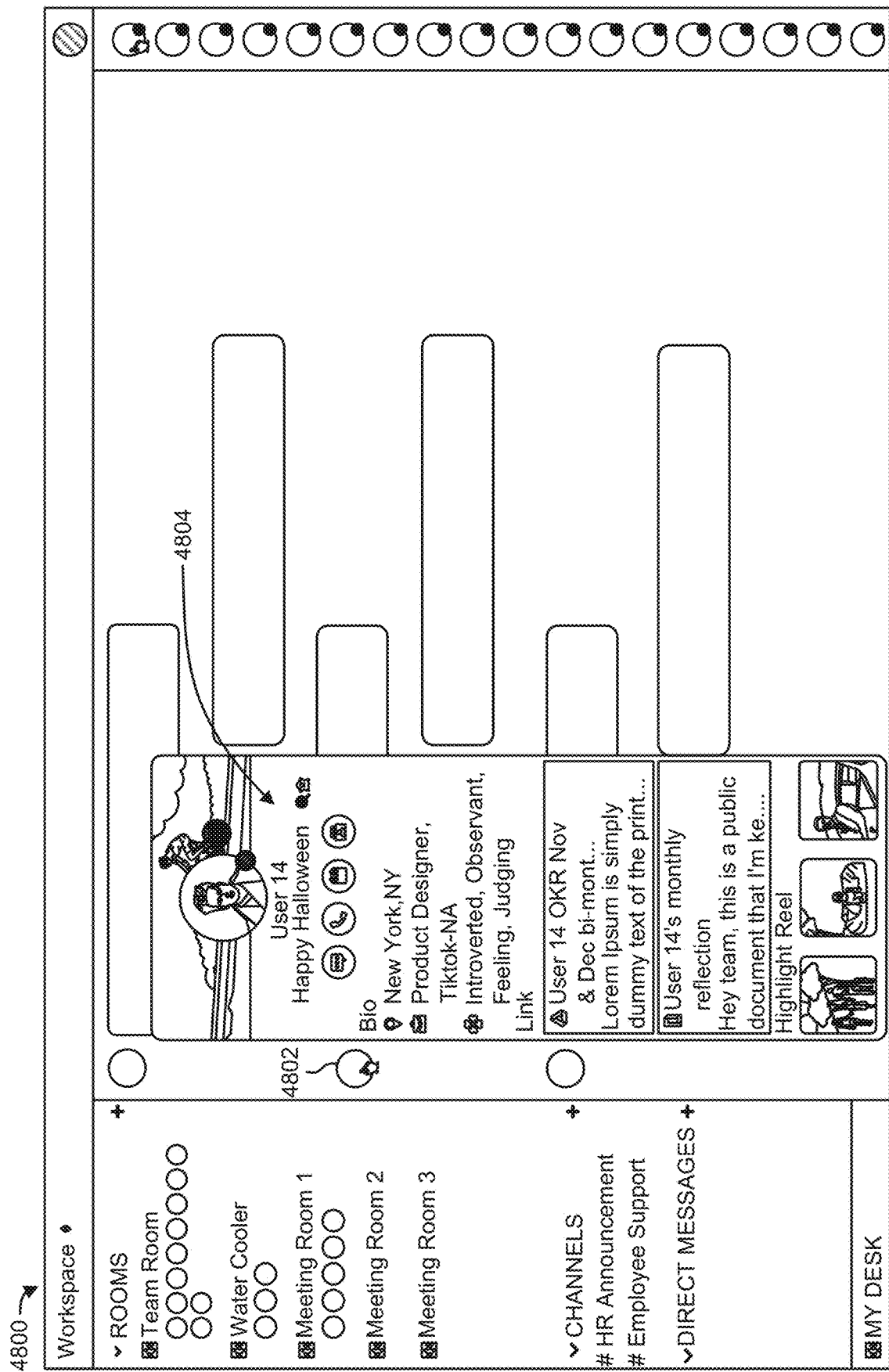
FIG. 48 shows another example user interface for facilitating communication in accordance with the present disclosure.

A condensed version of a user's profile may be displayed if another user scrolls over an icon associated with that user. FIG. 48 illustrates a UI 4800 that depicts a condensed version 4804 of the user's profile that is depicted in FIG. 46. The version 4804 of the profile may be displayed when another user scrolls over an icon 4802 associated with the user to which the profile belongs. The icon 4802 may, for example, be displayed within the text chat in a virtual room in order to indicate which user sent which text to the chat. As another example, the icon 4802 may be displayed within a live chat (video or audio) in which the user is participating. It should be appreciated that the icon 4802 may appear on any of the UIs described above. By scrolling over the icon 4802, the another user may be able to view the version 4804 of the profile and gain a quick, comprehensive understanding of that user. For example, the another user may utilize this understanding to determine if the another user wants to initiate a communication with the user.

Figure 49:
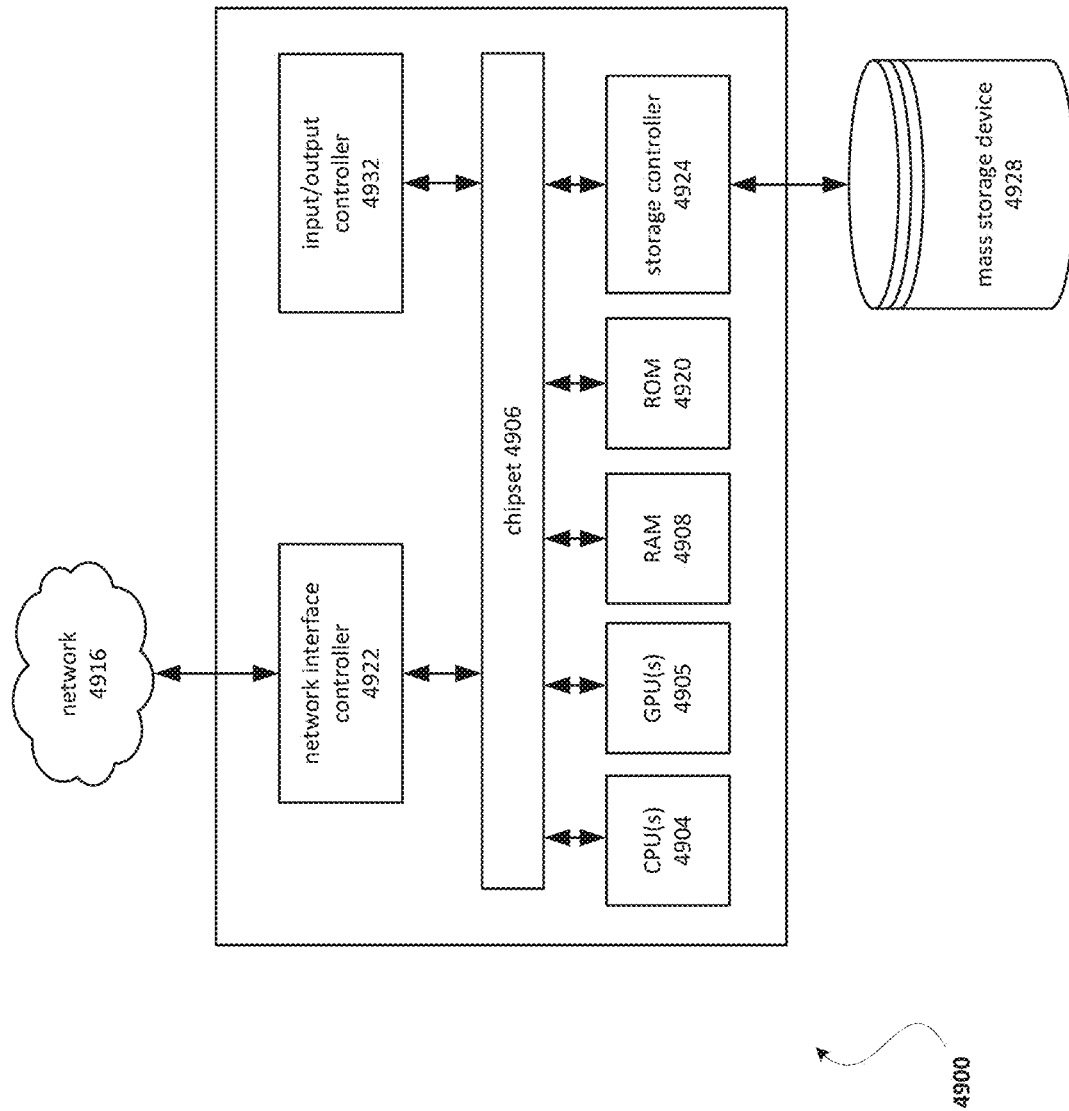
FIG. 49 shows an example computing device which may be used to perform any of the techniques disclosed herein.

FIG. 49 illustrates a computing device that may be used in various aspects, such as the services, networks, modules, and/or devices depicted in FIG. 1. With regard to the example architecture of FIG. 1, the cloud network 102, user device 104a-d (collectively user device 104), communication service 112, database(s) 113, and/or network 120 may each be implemented by one or more instance of a computing device 4900 of FIG. 49. Likewise, with regard to the example architecture of FIG. 2, the authentications service 226, the management service 223 (and any of its components), the chat service 222, and/or the video conference service 253 may each be implemented by one or more instance of a computing device 4900 of FIG. 49.

The computer architecture shown in FIG. 49 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 4900 may include a baseboard, or "motherboard," which is a printed circuit board to which a multitude of components or devices may be connected by way of a system bus or other electrical communication paths. One or more central processing units (CPUs) 4904 may operate in conjunction with a chipset 4906. The CPU(s) 4904 may be standard programmable processors that perform arithmetic and logical operations necessary for the operation of the computing device 4900.

The CPU(s) 4904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 4904 may be augmented with or replaced by other processing units, such as GPU(s) 4905. The GPU(s) 4905 may comprise processing units specialized for but not necessarily limited to highly parallel computations, such as graphics and other visualization-related processing.

A chipset 4906 may provide an interface between the CPU(s) 4904 and the remainder of the components and devices on the baseboard. The chipset 4906 may provide an interface to a random-access memory (RAM) 4908 used as the main memory in the computing device 4900. The chipset 4906 may further provide an interface to a computer-readable storage medium, such as a read-only memory (ROM) 4920 or non-volatile RAM (NVRAM) (not shown), for storing basic routines that may help to start up the computing device 4900 and to transfer information between the various components and devices. ROM 4920 or NVRAM may also store other software components necessary for the operation of the computing device 4900 in accordance with the aspects described herein.

The computing device 4900 may operate in a networked environment using logical connections to remote computing nodes and computer systems through local area network (LAN). The chipset 4906 may include functionality for providing network connectivity through a network interface controller (NIC) 4922, such as a gigabit Ethernet adapter. A NIC 4922 may be capable of connecting the computing device 4900 to other computing nodes over a network 4916. It should be appreciated that multiple NICs 4922 may be present in the computing device 4900, connecting the computing device to other types of networks and remote computer systems.

The computing device 4900 may be connected to a mass storage device 4928 that provides non-volatile storage for the computer. The mass storage device 4928 may store system programs, application programs, other program modules, and data, which have been described in greater detail herein. The mass storage device 4928 may be connected to the computing device 4900 through a storage controller 4924 connected to the chipset 4906. The mass storage device 4928 may consist of one or more physical storage units. The mass storage device 4928 may comprise a management component 4910. A storage controller 4924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 4900 may store data on the mass storage device 4928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 4928 is characterized as primary or secondary storage and the like.

For example, the computing device 4900 may store information to the mass storage device 4928 by issuing instructions through a storage controller 4924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 4900 may further read information from the mass storage device 4928 by detecting the physical states or characteristics of one or more particular locations within the physical storage units.

In addition to the mass storage device 4928 described above, the computing device 4900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 4900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 4928 depicted in FIG. 49, may store an operating system utilized to control the operation of the computing device 4900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 4928 may store other system or application programs and data utilized by the computing device 4900.

The mass storage device 4928 or other computer-readable storage media may also be encoded with computer-executable instructions, which, when loaded into the computing device 4900, transforms the computing device from a general-purpose computing system into a special-purpose computer capable of implementing the aspects described herein. These computer-executable instructions transform the computing device 4900 by specifying how the CPU(s) 4904 transition between states, as described above. The computing device 4900 may have access to computer-readable storage media storing computer-executable instructions, which, when executed by the computing device 4900, may perform the methods described herein.

A computing device, such as the computing device 4900 depicted in FIG. 49, may also include an input/output controller 4932 for receiving and processing input from a number of input devices, such as a keyboard, a mouse, a touchpad, a touch screen, an electronic stylus, or other type of input device. Similarly, an input/output controller 4932 may provide output to a display, such as a computer monitor, a flat-panel display, a digital projector, a printer, a plotter, or other type of output device. It will be appreciated that the computing device 4900 may not include all of the components shown in FIG. 49, may include other components that are not explicitly shown in FIG. 49, or may utilize an architecture completely different than that shown in FIG. 49.

As described herein, a computing device may be a physical computing device, such as the computing device 4900 of FIG. 49. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A system of facilitating a collaborative work environment, comprising:
    at least one database storing information for a plurality of users associated with the collaborative work environment;
    at least one processor in communication with at least one memory, wherein instructions stored in the at least one memory upon execution by the at least one processor cause the system to perform the operations comprising:
    creating at least one virtual room accessible by the plurality of users, wherein at least one subset of users among the plurality of users are associated with the at least one virtual room, the at least one virtual room enables real-time communications among the at least one subset of users, and the at least one subset of users communicate with each other in the at least one virtual room through a first communication channel, wherein the at least one virtual room comprises a plurality of virtual rooms, and each of the plurality of virtual rooms is associated with one or more sub-communication channels established in each of the plurality of virtual rooms;
    receiving a request from a first user in the at least one subset of users to communicate with at least a second user in the at least one subset of users separately from the first communication channel; and
    establishing a first sub-communication channel between the first user and the at least a second user while the first communication channel remains accessible to the first user and the at least a second user.

2. The system of claim 1, wherein the first sub-communication channel between the first user and the at least a second user is not accessible by other users in the at least one subset of users.

3. The system of claim 1, wherein the instructions stored in the at least one memory upon execution by the at least one processor cause the system to perform the operations further comprising:
    receiving a request from any other user in the at least one subset of users to access the first sub-communication channel; and
    permitting the any other user to access the first sub-communication channel.

4. The system of claim 1, wherein the instructions stored in the at least one memory upon execution by the at least one processor cause the system to perform the operations further comprising:
    providing an indication to other users in the at least one subset of users that the first user and the at least a second user have established the first sub-communication channel.

5. The system of claim 1, wherein the instructions stored in the at least one memory upon execution by the at least one processor cause the system to perform the operations further comprising:
    causing display of information associated with the at least one virtual room on a plurality of client computing device associated with the plurality of users, wherein the information comprises at least one of information indicative of whether any sub-communication channel has been established in the at least one virtual room, information indicative of a number of sub-communication channels in the at least one virtual room, or information indicative of any particular user in the at least one subset of users communicates with any other particular user in the at least one subset of users over any particular sub-communication channel.

6. The system of claim 1, wherein the first communication channel and the first sub-communication channel are associated with different channel identifiers.

7. The system of claim 1, wherein communication in the first communication channel between at least one of the first user or the at least a second user with others in the at least one subset of users remains enabled while communication is also enabled between the first user and the at least a second user in the first sub-communication channel.

8. The system of claim 1, wherein the instructions stored in the at least one memory upon execution by the at least one processor cause the system to perform the operations further comprising:
    enable the first sub-communication channel while causing to disable the first communication channel for the first user and the at least a second user; and
    automatically enable the first communication channel for the first user and the at least a second user when the first sub-communication channel is disabled.

9. The system of claim 1, wherein the instructions stored in the at least one memory upon execution by the at least one processor cause the system to perform the operations further comprising:

establishing a second sub-communication channel between a third user and at least a fourth user to communicate separately from the first communication channel and the first sub-communication channel.

10. The system of claim 1, wherein the instructions stored in the at least one memory upon execution by the at least one processor cause the system to perform the operations further comprising:

causing to enable the first user, the at least a second user, or any other user in the at least one subset of users to broadcast a real-time voice communication to the at least one subset of users in response to receiving user input via an interface element.

11. A method, comprising:

creating at least one virtual room accessible by a plurality of users, wherein at least one subset of users among the plurality of users are associated with the at least one virtual room, the at least one virtual room enables real-time communication among the at least one subset of users, and the at least one subset of users communicate with each other in the at least one virtual room through a first communication channel, wherein the at least one virtual room comprises a plurality of virtual rooms, and each of the plurality of virtual rooms is associated with one or more sub-communication channels established in each of the plurality of virtual rooms;

receiving a request from a first user in the at least one subset of users to communicate with at least a second user in the at least one subset of users separately from the first communication channel; and establishing a first sub-communication channel between the first user and the at least a second user while the first communication channel remains accessible to the first user and the at least a second user.

12. The method of claim 11, wherein the first sub-communication channel between the first user and the at least a second user is not accessible by other users in the at least one subset of users.

13. The method of claim 11, further comprising:

providing an indication to other users in the at least one subset of users that the first user and the at least a second user have established the first sub-communication channel.

14. The method of claim 11, further comprising:

causing display of information associated with the at least one virtual room on a plurality of client computing device associated with the plurality of users, wherein the information comprises at least one of information indicative of whether any sub-communication channel has been established in the at least one virtual room, information indicative of a number of sub-communication channels in the at least one virtual room, or information indicative of any particular user in the at least one subset of users communicates with any other particular user in the at least one subset of users over any particular sub-communication channel.

15. The method of claim 11, wherein communication in the first communication channel between at least one of the first user or the at least a second user with others in the subset of users remains enabled while communication is also enabled between the first user and the at least a second user in the first sub-communication channel.

16. The method of claim 11, further comprising:

establishing a second sub-communication channel between a third user and at least a fourth user to communicate separately from the first communication channel and the first sub-communication channel.

17. The method of claim 11, further comprising:

causing to enable the first user, the at least a second user, or any other user in the at least one subset of users to broadcast a real-time voice communication to the at least one subset of users in response to receiving user input via an interface element.

18. A non-transitory computer-readable storage medium, storing computer-readable instructions that upon execution by a computing device cause the computing device to perform operations comprising:

creating at least one virtual room accessible by a plurality of users, wherein at least one subset of users among the plurality of users are associated with the at least one virtual room, the at least one virtual room enables real-time communication among the at least one subset of users, and the at least one subset of users communicate with each other in the at least one virtual room through a first communication channel, wherein the at least one virtual room comprises a plurality of virtual rooms, and each of the plurality of virtual rooms is associated with one or more sub-communication channels established in each of the plurality of virtual rooms;

receiving a request from a first user in the at least one subset of users to communicate with at least a second user in the at least one subset of users separately from the first communication channel; and establishing a first sub-communication channel between the first user and the at least a second user while the first communication channel remains accessible to the first user and the at least a second user.

19. The non-transitory computer-readable storage medium of claim 18, wherein the first sub-communication channel between the first user and the at least a second user is not accessible by other users in the at least one subset of users.

* * * * *